US012001155B2

(12) United States Patent
Sato et al.

(10) Patent No.: US 12,001,155 B2
(45) Date of Patent: Jun. 4, 2024

(54) CONTAINER WITH SHIELD FOR SHIELDING A DISCHARGE OPENING THEREOF

(71) Applicant: CANON KABUSHIKI KAISHA, Tokyo (JP)

(72) Inventors: Mitsuhiro Sato, Tokyo (JP); Yukio Kubo, Tokyo (JP); Hiroyuki Munetsugu, Kanagawa (JP); Takashi Kimura, Tokyo (JP); Yuko Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/948,102

(22) Filed: Sep. 19, 2022

(65) Prior Publication Data

US 2023/0096298 A1 Mar. 30, 2023

(30) Foreign Application Priority Data

Sep. 28, 2021 (JP) ................................. 2021-158543
Dec. 20, 2021 (JP) ................................. 2021-205885

(51) Int. Cl.
*G03G 15/08* (2006.01)
*B41J 2/175* (2006.01)
(Continued)

(52) U.S. Cl.
CPC ........ *G03G 15/0886* (2013.01); *B41J 2/1754* (2013.01); *B65D 47/122* (2013.01); *B65D 83/0055* (2013.01); *G03G 21/1676* (2013.01)

(58) Field of Classification Search
CPC ........... G03G 15/0874; G03G 15/0886; G03G 21/1676; B41J 2/1752; B41J 2/17523; B41J 2/1754; B65D 47/122; B65D 83/0055
See application file for complete search history.

(56) References Cited

U.S. PATENT DOCUMENTS

| | | | | |
|---|---|---|---|---|
| 10,065,828 | B2 | 9/2018 | Takeuchi et al. | B65H 31/20 |
| 11,089,172 | B2 | 8/2021 | Yokota et al. | H04N 1/00 |
| 2019/0163091 | A1 * | 5/2019 | Koshikawa | G03G 15/0886 |

(Continued)

FOREIGN PATENT DOCUMENTS

| | | |
|---|---|---|
| JP | 2012-192589 | 10/2012 |
| JP | 2014-233909 | 12/2014 |

(Continued)

OTHER PUBLICATIONS

U.S. Appl. No. 17/983,973, filed Nov. 9, 2022.

*Primary Examiner* — Sophia S Chen
(74) *Attorney, Agent, or Firm* — Venable LLP

(57) ABSTRACT

A container for accommodating a content of powder or a liquid includes an accommodating portion for accommodating the content; a top end portion including a discharging portion and a shielding member, wherein the discharging portion includes a discharge opening for discharging the content to an outside of the container and a passage for permitting passing of the content toward the discharge opening, and the shielding member shields the discharge opening; and a cap detachably mounted to the top end portion, wherein the cap includes a main body portion covering at least a part of the top end portion and a fixing portion fixed to the top end portion and connected to the main body portion, and wherein the main body portion of the cap is separated from the fixing portion by being rotated about a rotational axis thereof relative to the top end portion.

27 Claims, 30 Drawing Sheets

(a)

(b)

(51) Int. Cl.

| | |
|---|---|
| ***B65D 47/12*** | (2006.01) |
| ***B65D 83/00*** | (2006.01) |
| ***G03G 21/16*** | (2006.01) |

(56) References Cited

U.S. PATENT DOCUMENTS

2021/0103246 A1 4/2021 Morihara et al. ...... G03G 21/12
2021/0314456 A1 10/2021 Yokota et al. ........... H04N 1/00
2022/0155708 A1 5/2022 Sato et al. ......... G03G 15/0886

FOREIGN PATENT DOCUMENTS

JP 2021-026199 2/2021
JP 2021-060510 4/2021

* cited by examiner (a)

(b)

(a)

(b)

(a)

(b)

(a)

(b)

(a)

(b)

(a)

(b)

CONTAINER WITH SHIELD FOR SHIELDING A DISCHARGE OPENING THEREOF

FIELD OF THE INVENTION AND RELATED ART

The present invention relates to a container for use with an image forming apparatus and for accommodating content of powder or a liquid.

In general, an image forming apparatus of an electrophotographic type forms an image by transferring a toner image, formed on a surface of a photosensitive drum, onto a transfer material as a transfer medium. Further, as a toner supplying type, for example, a process cartridge type or a toner supplying (replenishing) type has been known. The process cartridge type is a type in which the photosensitive drum and a developing (developer) container are integrally assembled as a process cartridge in which the process cartridge is exchanged with a new one when toner runs out.

On the other hand, the toner supplying type is a type in which when the toner runs out, toner is newly supplied (replenished) to a developing container. For example, in Japanese Laid-Open Patent Application (JP-A) 2021-26199, an image forming apparatus in which the toner is supplied to the developing container by using a toner pouch mountable to a mounting portion provided on the developing container is disclosed.

In recent years, the image forming apparatus has been required by a user to employ various using manners such as the above-described process cartridge type, the above-described toner supplying type, and the like.

SUMMARY OF THE INVENTION

According to an aspect of the present invention, there is provided a container for use with an image forming apparatus and for accommodating a content of powder or a liquid, the container comprising: an accommodating portion configured to accommodate the content; a top end portion including a discharging portion and a shielding member, wherein the discharging portion includes a discharge opening for discharging the content to an outside of the container and a passage for permitting passing of the content toward the discharge opening, and the shielding member shields the discharge opening; and a cap detachably mounted to the top end portion, wherein the cap includes a main body portion covering at least a part of the top end portion and a fixing portion fixed to the top end portion and connected to the main body portion, and wherein the main body portion of the cap is configured so as to be separated from the fixing portion by being rotated about a rotational axis thereof relative to the top end portion.

Further features of the present invention will become apparent from the following description of exemplary embodiments with reference to the attached drawings.

BRIEF DESCRIPTION OF THE DRAWINGS

Part (a) of FIG. 1 is a schematic view showing an image forming apparatus according to a first embodiment, and part (b) of FIG. 1 is a perspective view showing the image forming apparatus.

Figure 3:
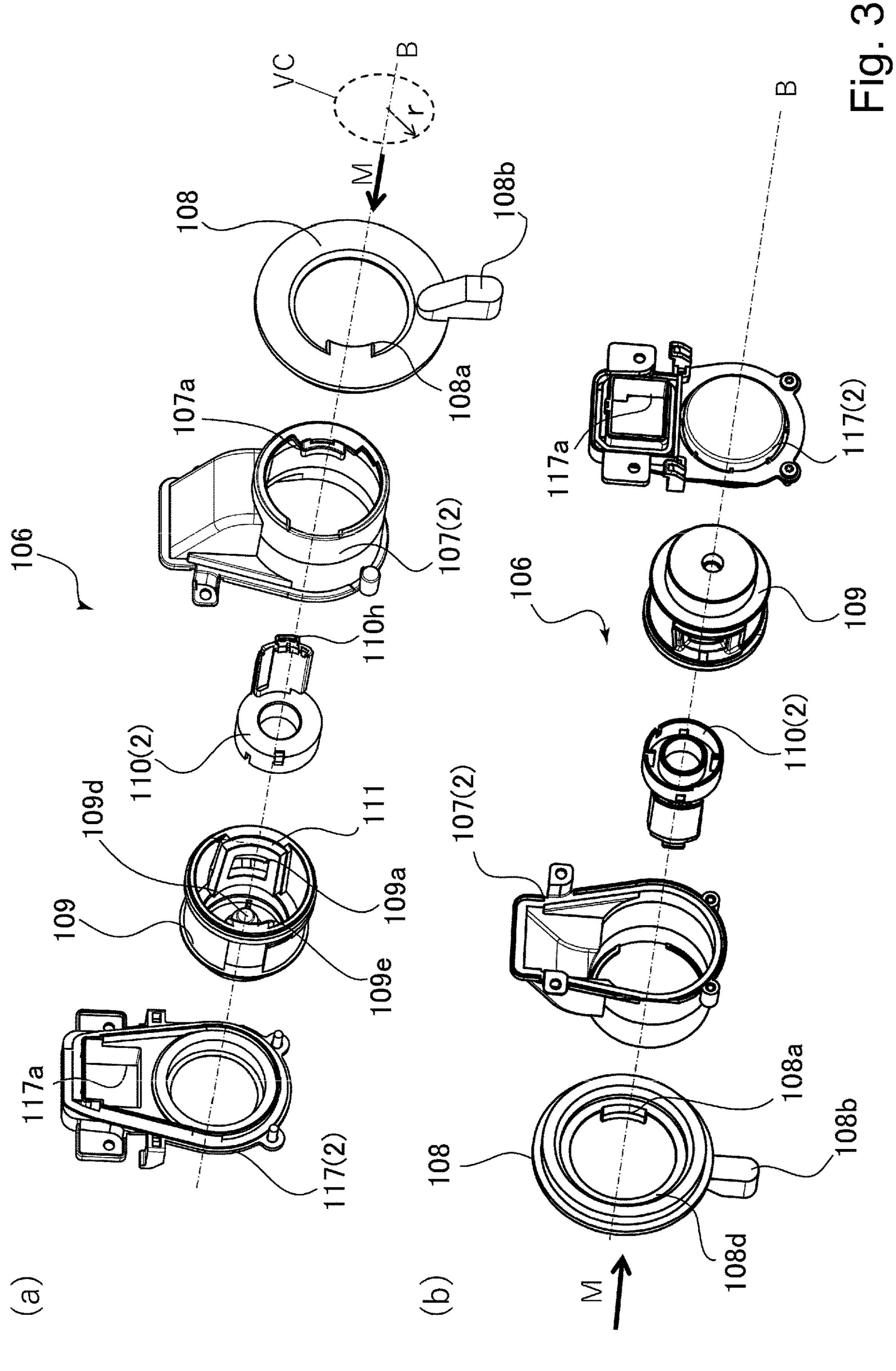

Part (a) of FIG. 3 is an exploded perspective view of a mounting portion, and part (b) of FIG. 3 is an exploded perspective view of the mounting portion as viewed in a direction different from the direction in part (a) of FIG. 3.

Figure 4:
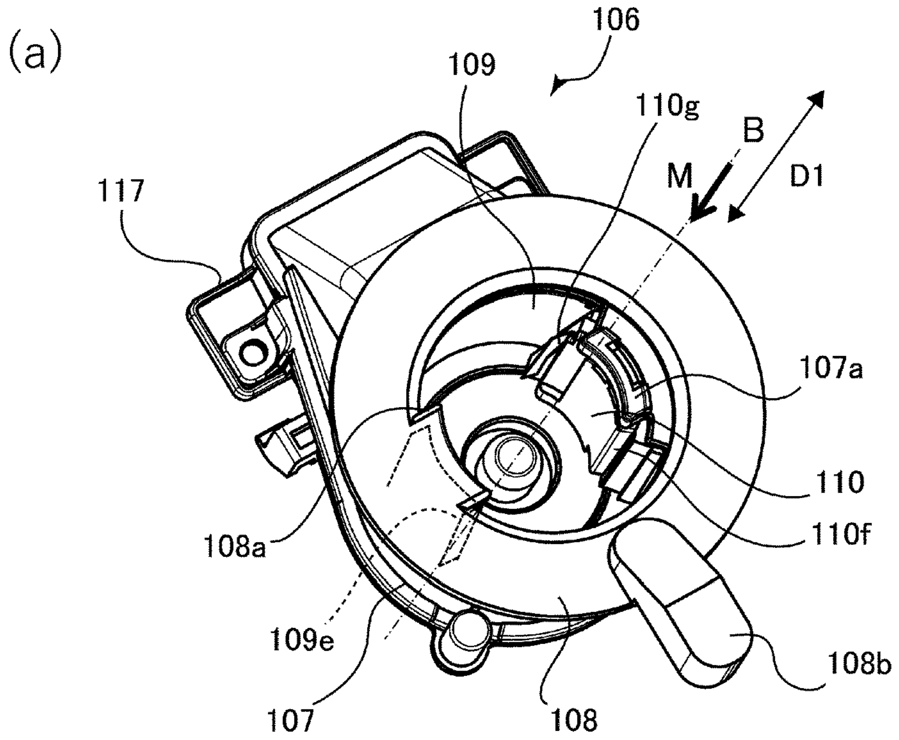
Figure 4:
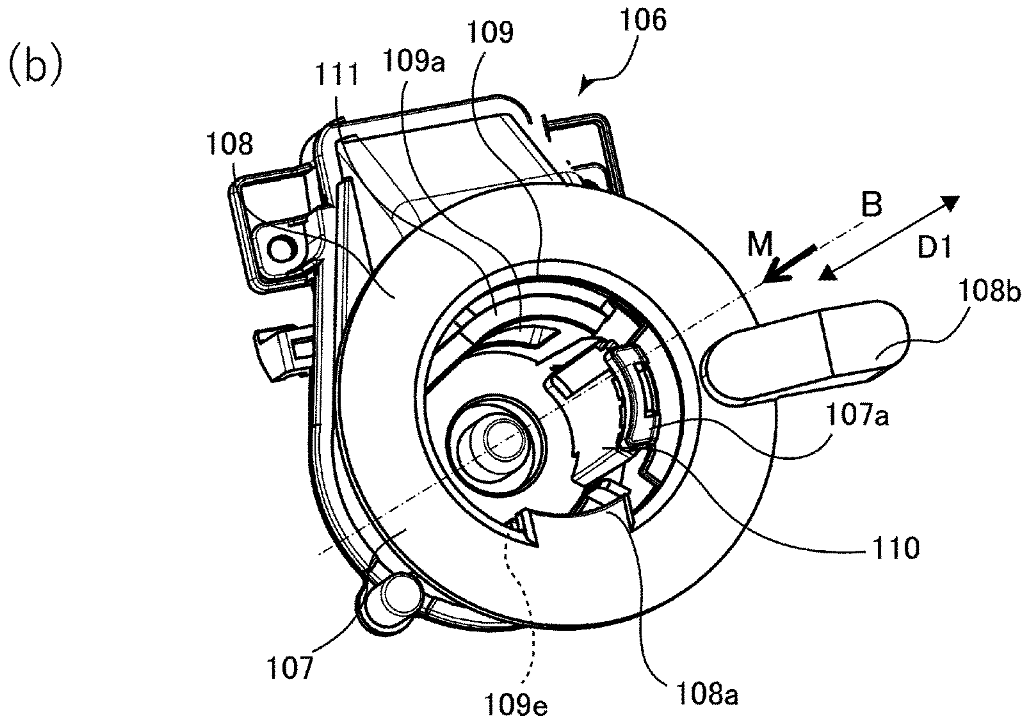

Part (a) of FIG. 4 is a perspective view showing an outer appearance of the mounting portion when an operating lever is in a closed position, and part (b) of FIG. 4 is a perspective view showing an outer appearance of the mounting portion when the operating lever is in an open position.

Figure 5:
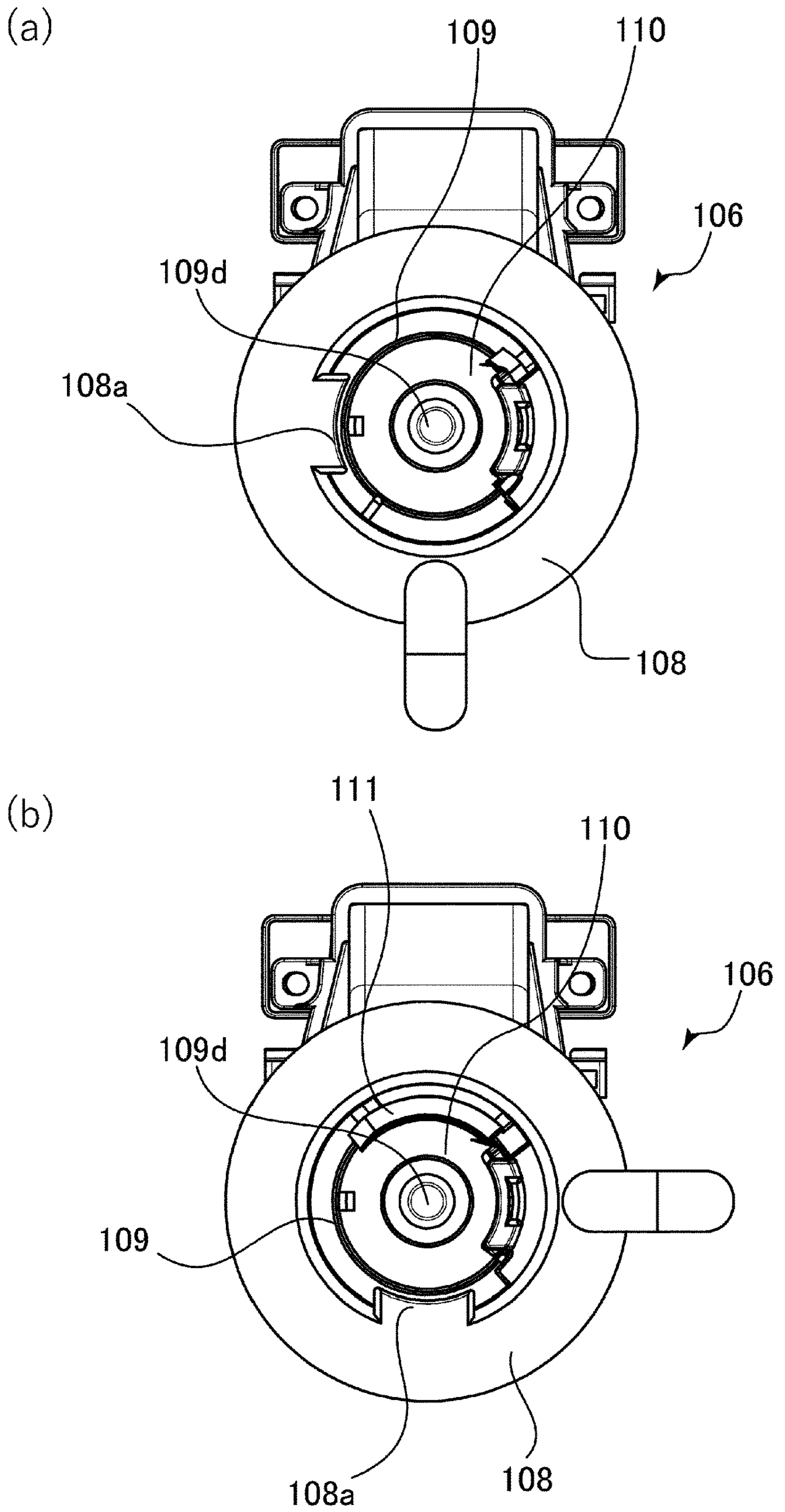

Part (a) of FIG. 5 is a plan view showing the outer appearance of the mounting portion when the operating lever is in the closed position, and part (b) of FIG. 5 is a plan view showing the outer appearance of the mounting portion when the operating lever is in the open position.

Figure 6:
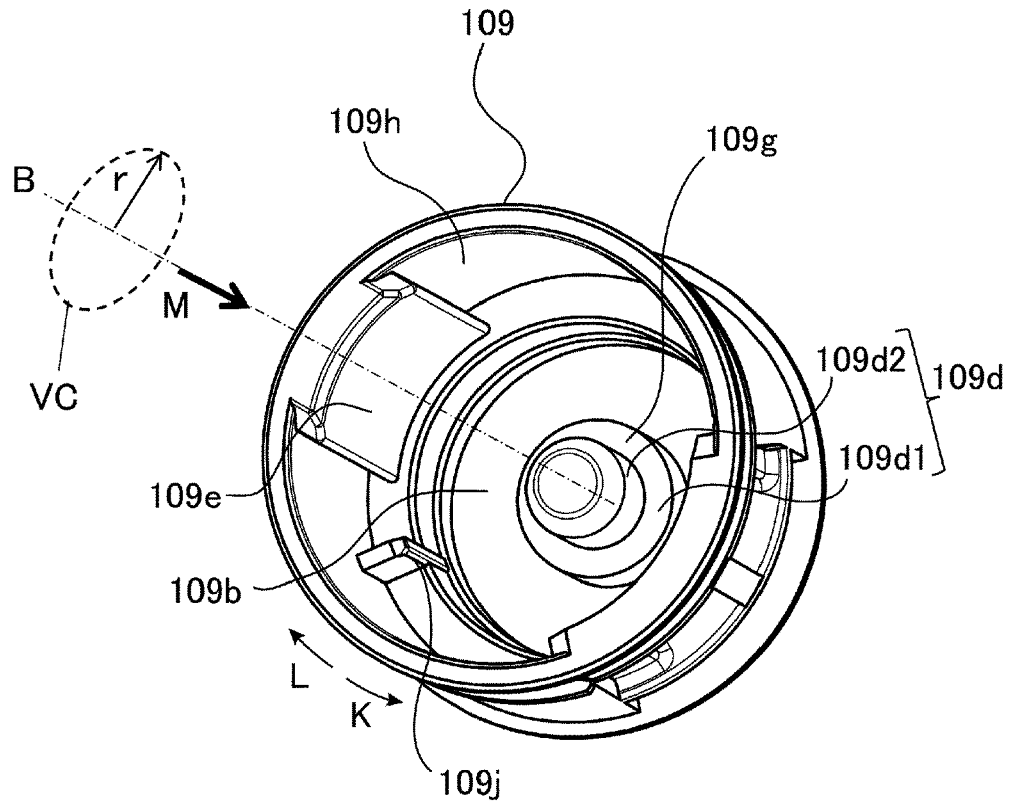
Figure 6:
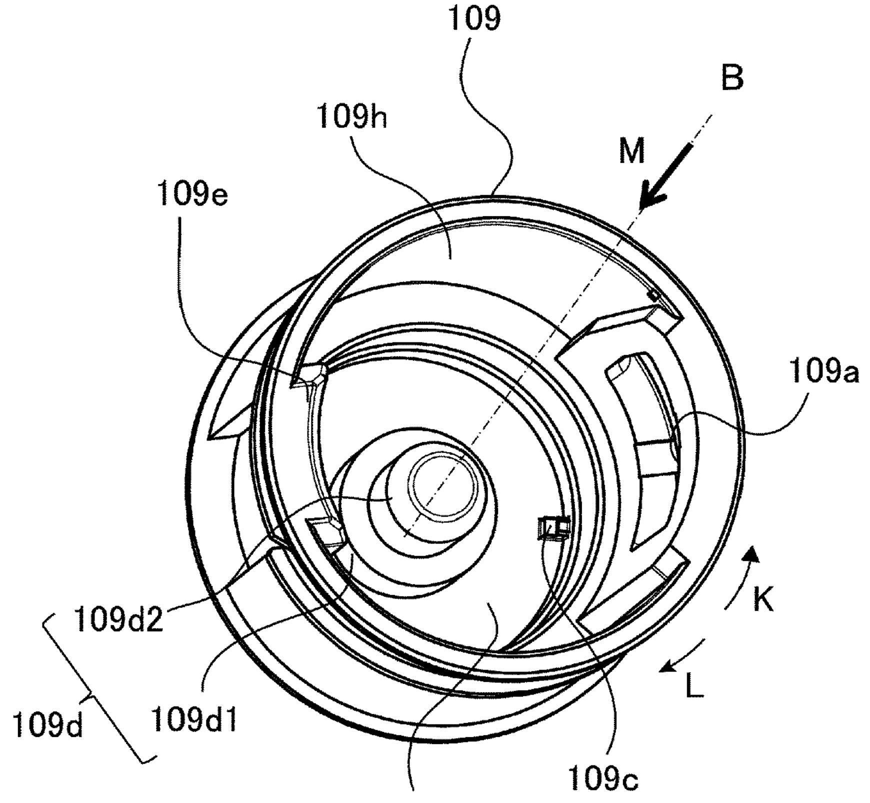

Part (a) of FIG. 6 is a perspective view of an apparatus-side shutter as viewed from an upstream side of a mounting direction, and part (b) of FIG. 6 is a perspective view of the apparatus-side shutter different in point of view from part (a) of FIG. 6.

Figure 7:
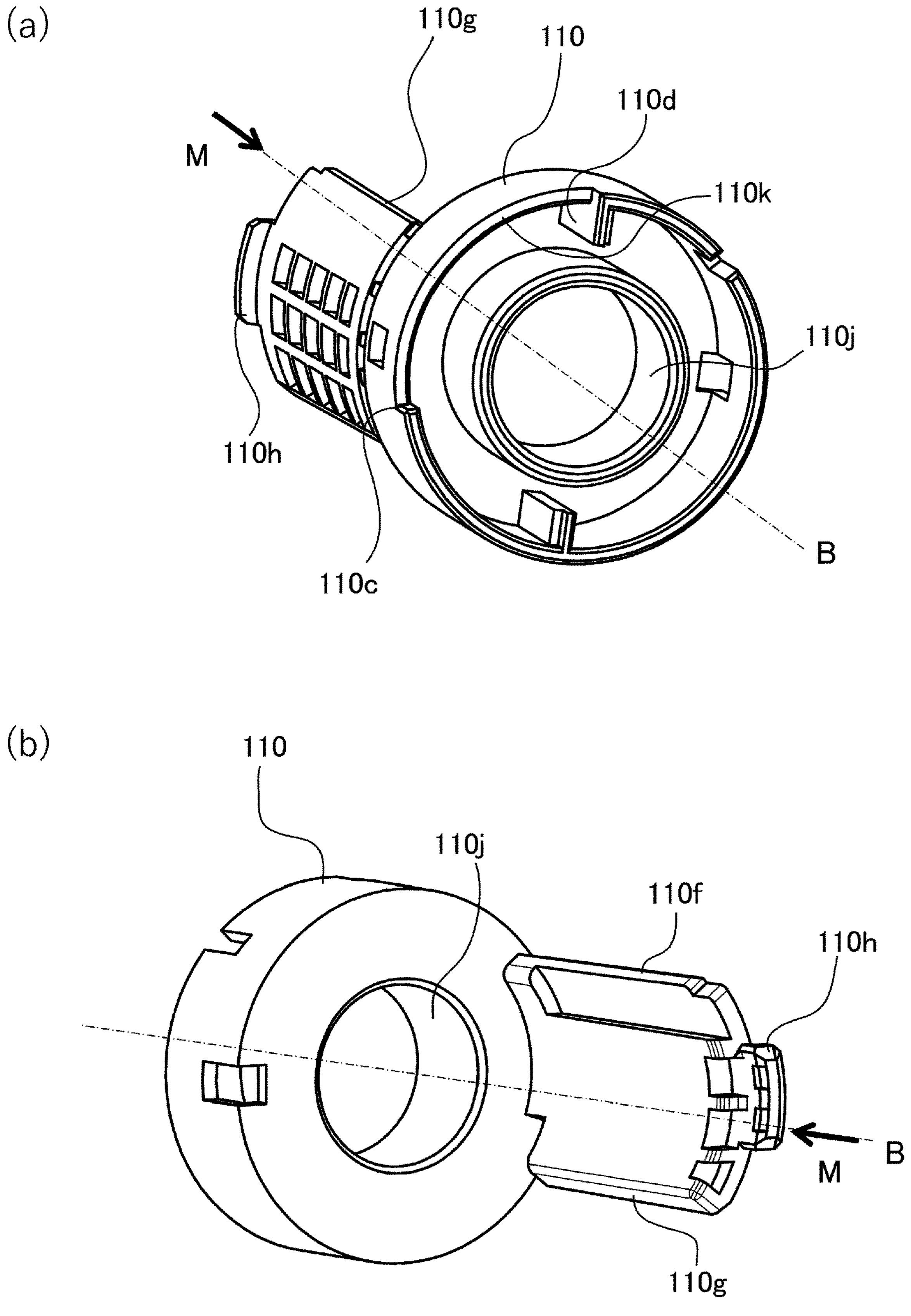

Part (a) of FIG. 7 is a perspective view of a cover as viewed from a downstream side of the mounting direction, and part (b) of FIG. 7 is a perspective view of the cover as viewed from the upstream side of the mounting direction.

Figure 8:
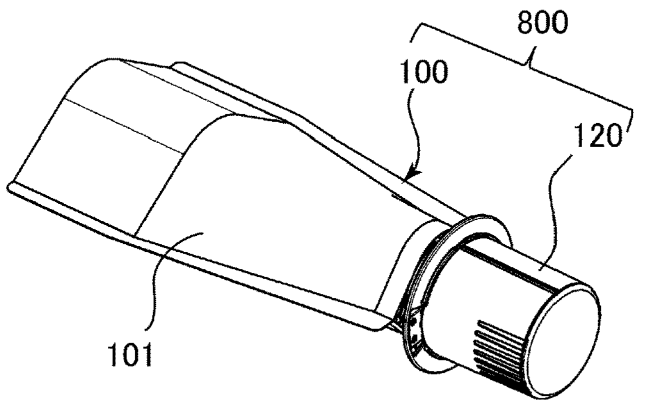
Figure 8:
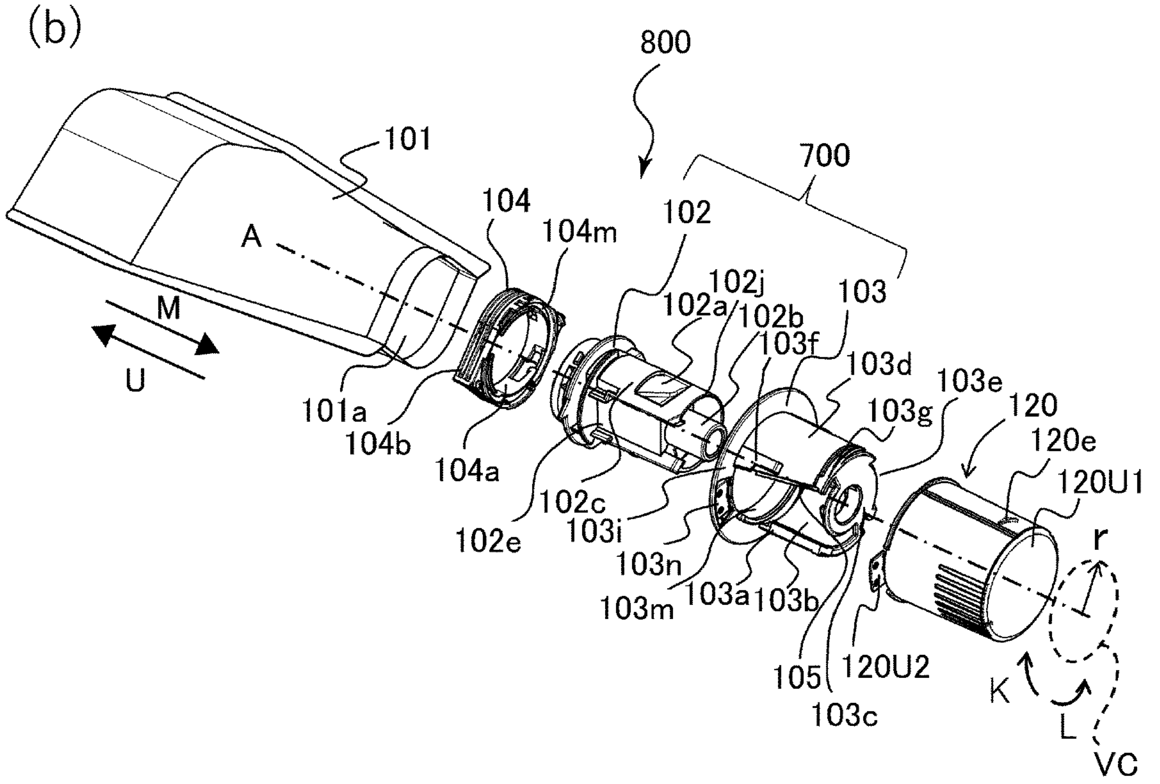

Part (a) of FIG. 8 is a perspective view showing an accommodating container, and part (b) of FIG. 8 is an exploded perspective view showing the accommodating container.

Figure 9:
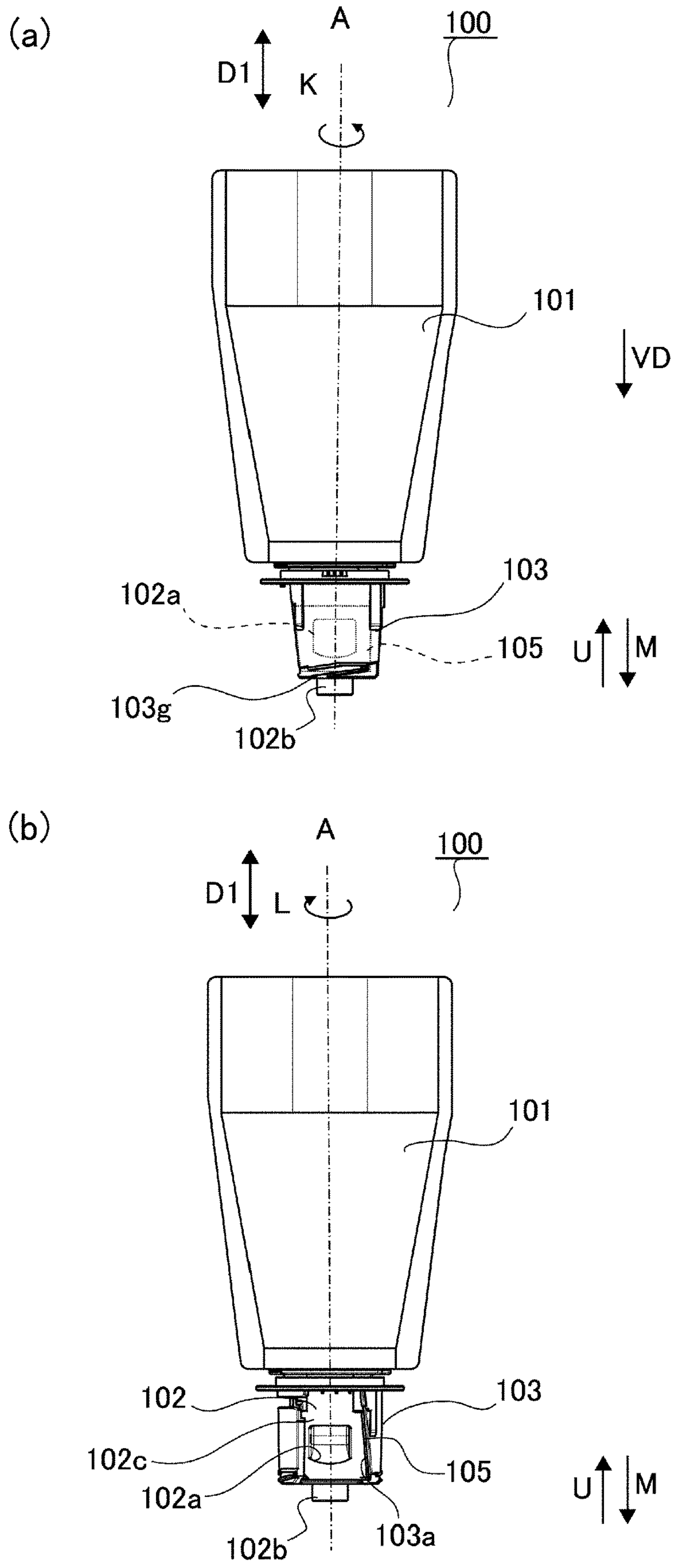

Part (a) of FIG. 9 is a side view of a toner pack when a pack-side shutter is in a shielding position and part (b) of FIG. 9 is a side view of the toner pack when the pack-side shutter is in an open position.

Figure 10:
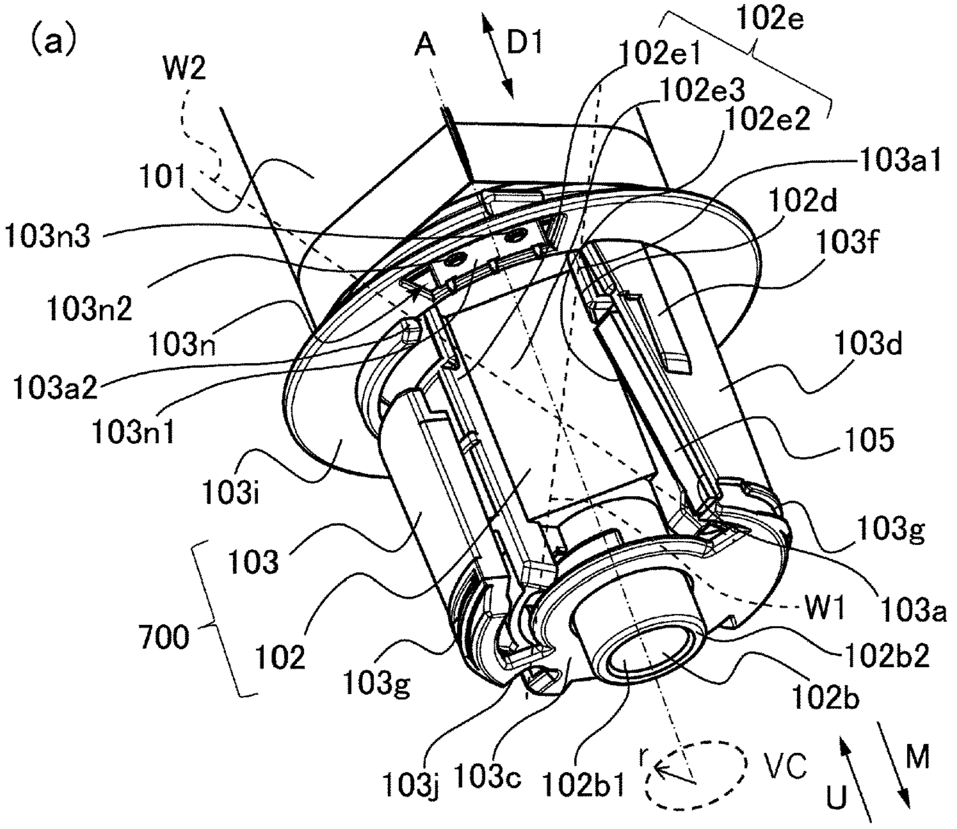
Figure 10:
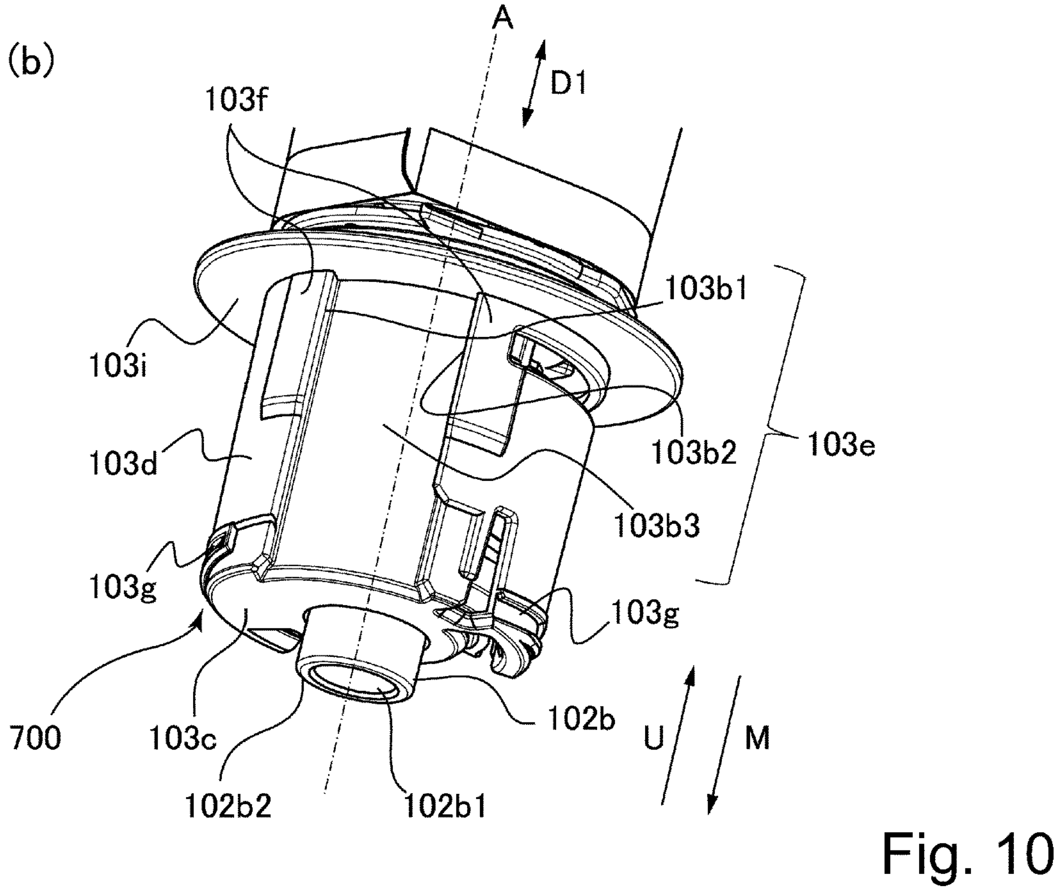

Part (a) of FIG. 10 is a perspective view showing a portion-to-be-mounted which the pack-side shutter is in the shielding position, and part (b) of FIG. 10 is another perspective view showing the portion-to-be-mounted when the pack-side shutter is in the shielding position.

Figure 11:
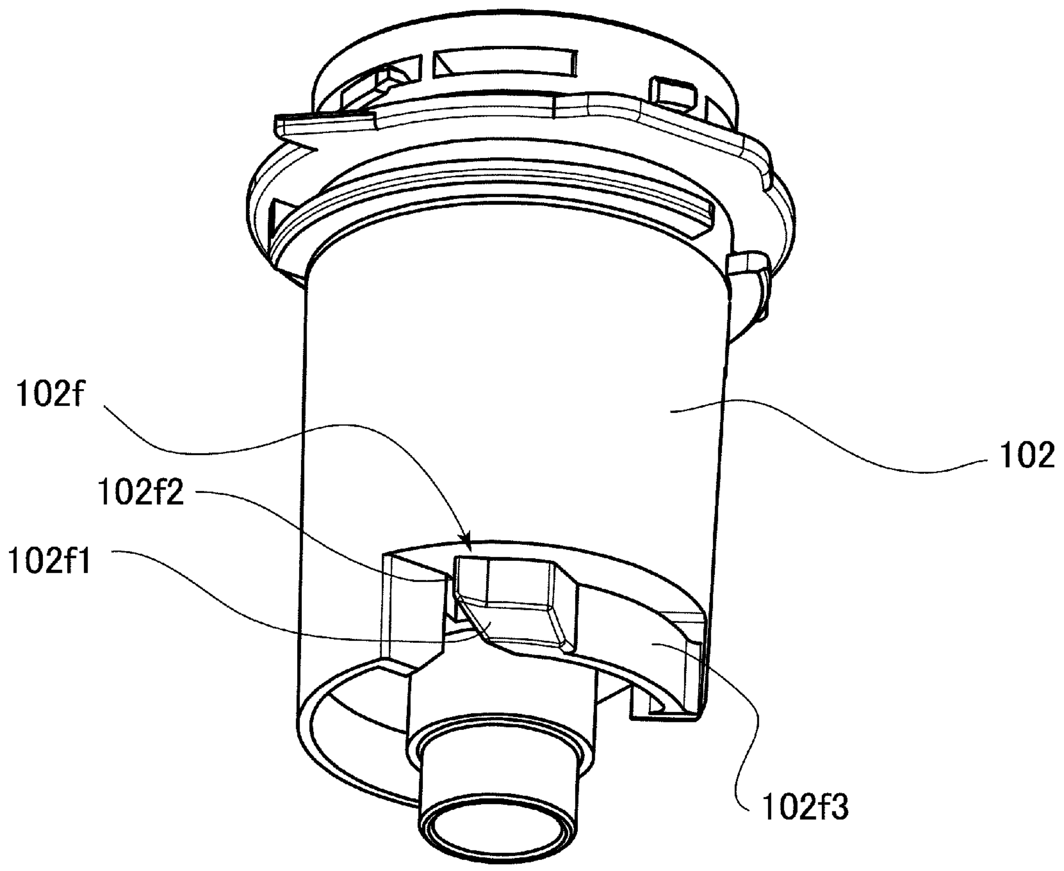

FIG. 11 is a perspective view showing a claw portion provided on a nozzle.

Figure 12:
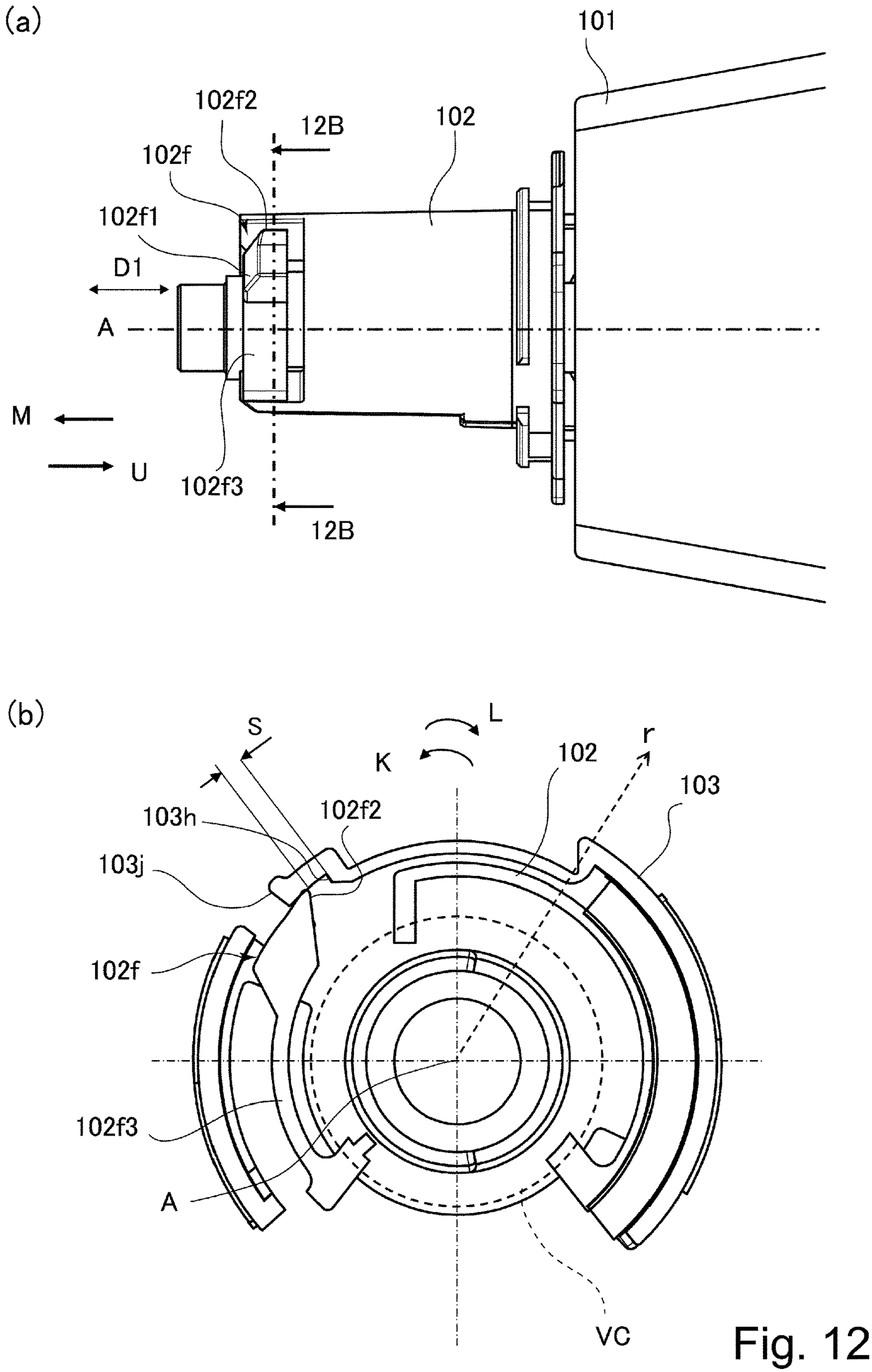

Part (a) of FIG. 12 is a front view showing the claw portion and part (b) of FIG. 12 is a sectional view showing a 12B-12B cross section of part (a) of FIG. 12.

Figure 13:
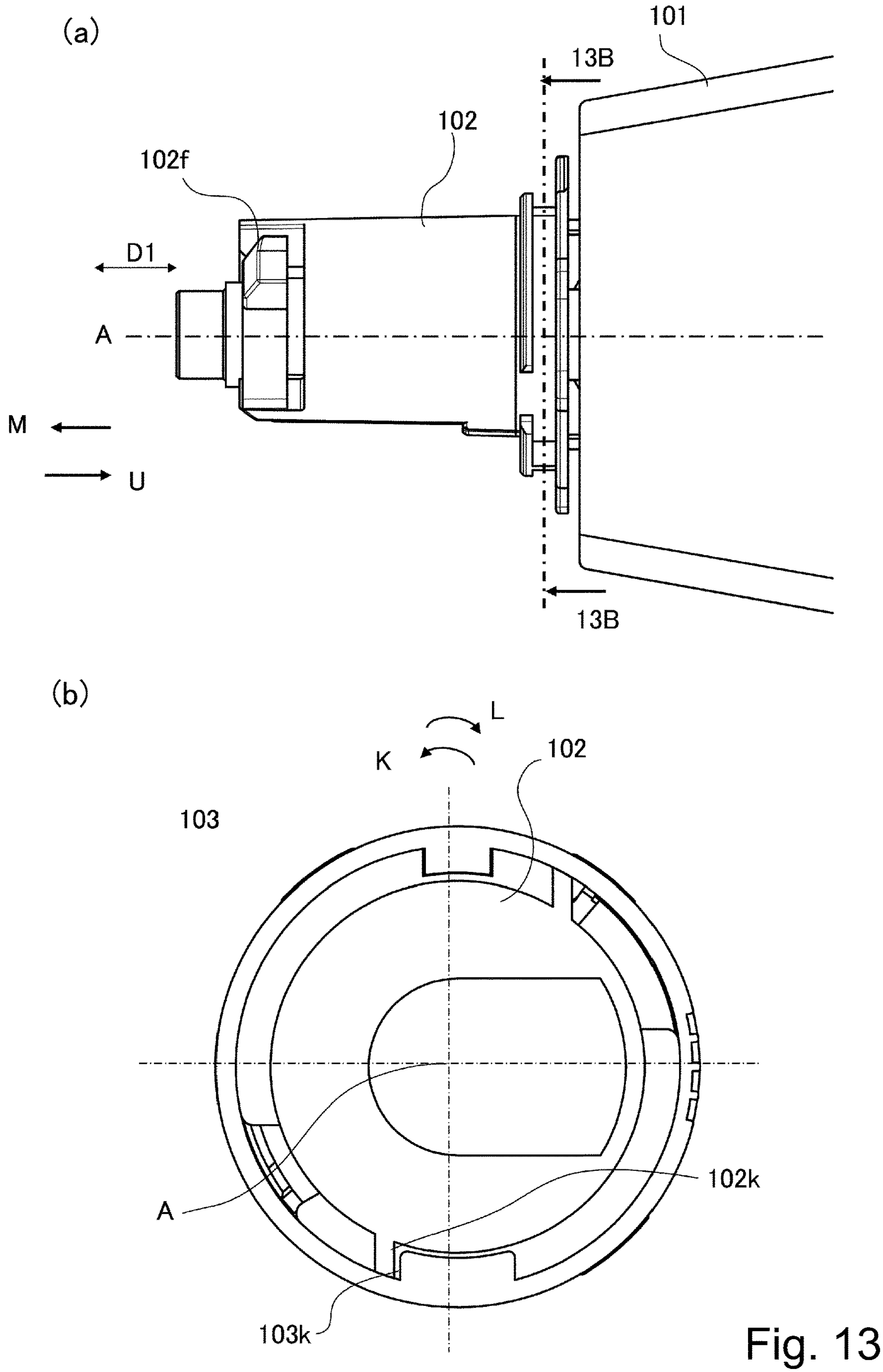

Part (a) of FIG. 13 is a front view showing the claw portion, and part (b) of FIG. 13 is a sectional view showing a 13B-13B cross section of part (a) of FIG. 13.

Figure 14:
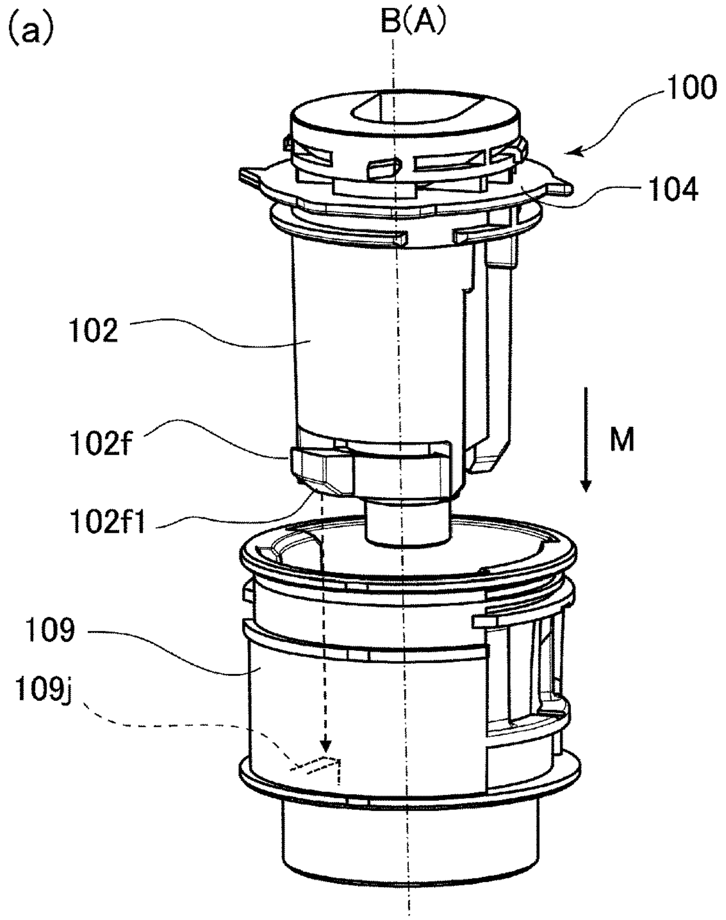
Figure 14:
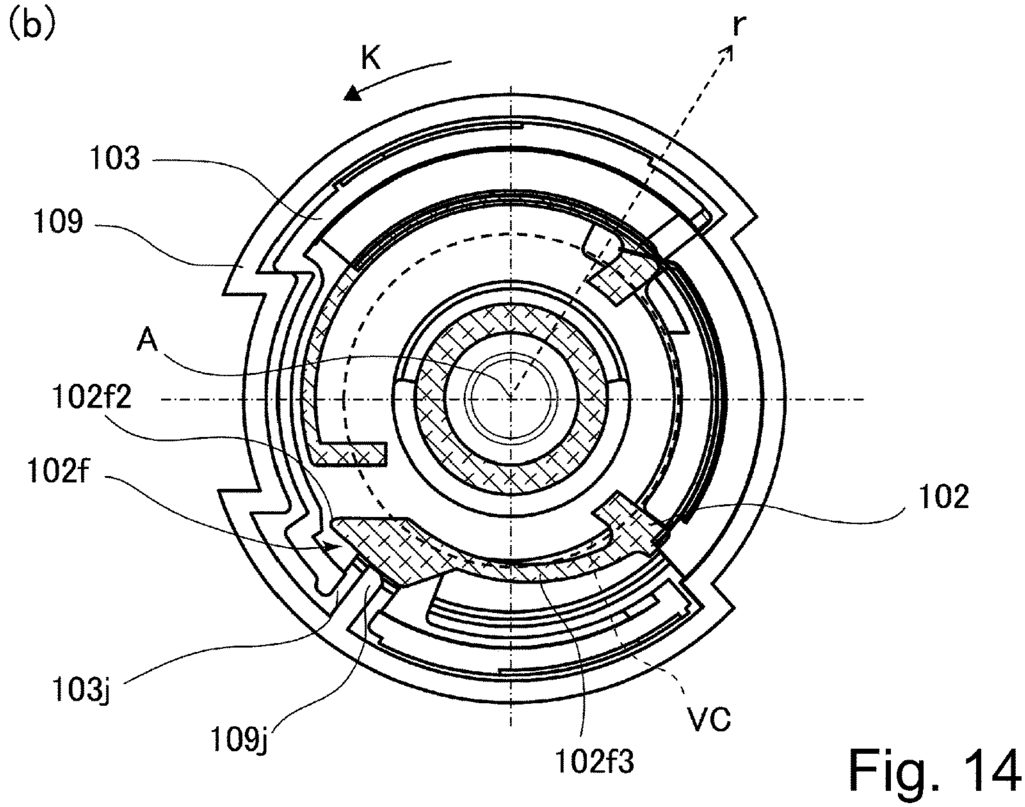

Part (a) of FIG. 14 is a perspective view showing a state in which the toner pack is mounted on the apparatus-side shutter, and part (b) of FIG. 14 is a sectional view showing the 13B-13B cross section of part (a) of FIG. 13 in a state in which mounting of the toner pack on the mounting portion is completed.

Figure 15:
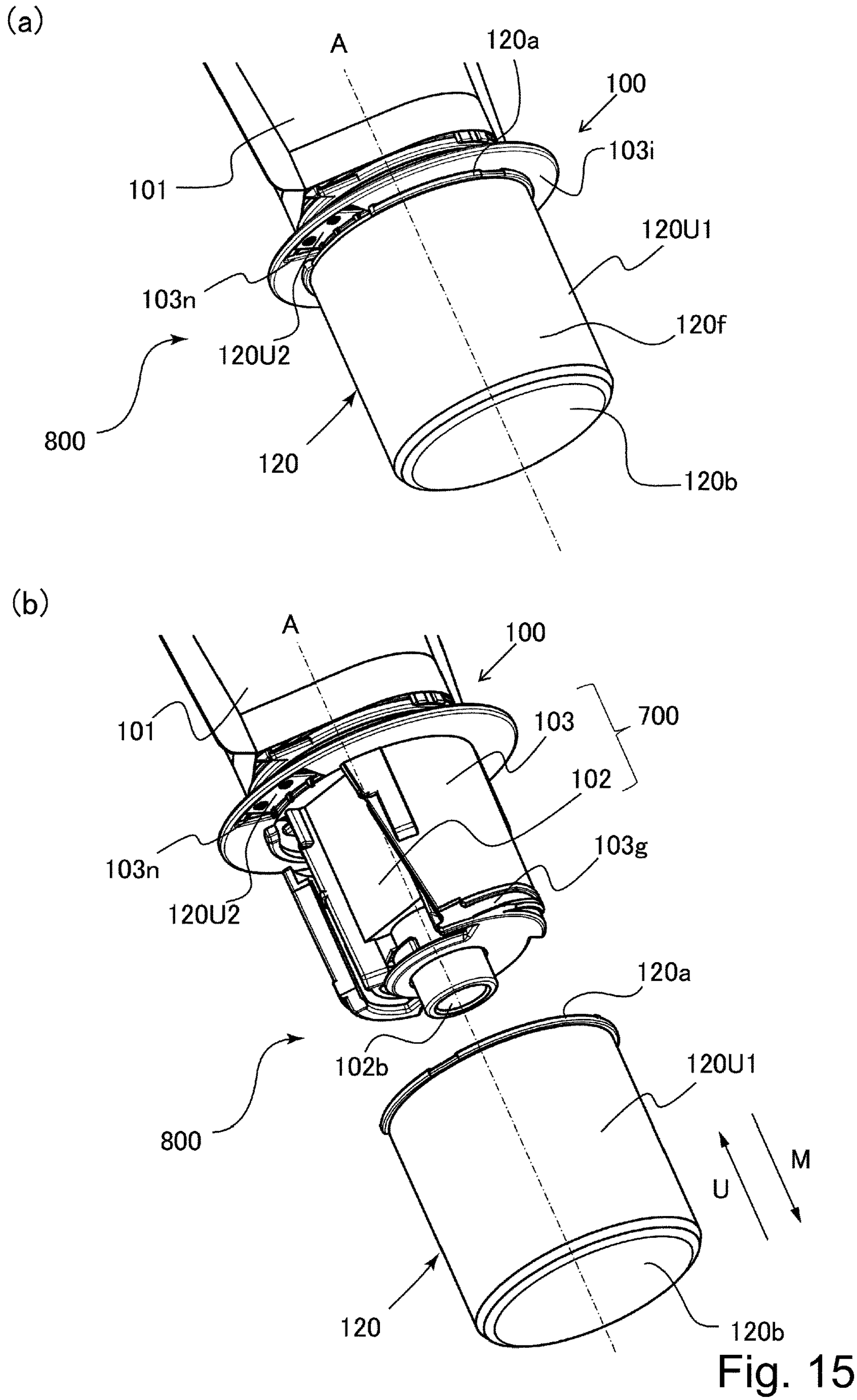

Part (a) of FIG. 15 is a perspective view showing the toner pack in a state in which a cap is mounted, and part (b) of FIG. 15 is a perspective view showing a state in which the cap is dismounted from the toner pack.

Figure 16:
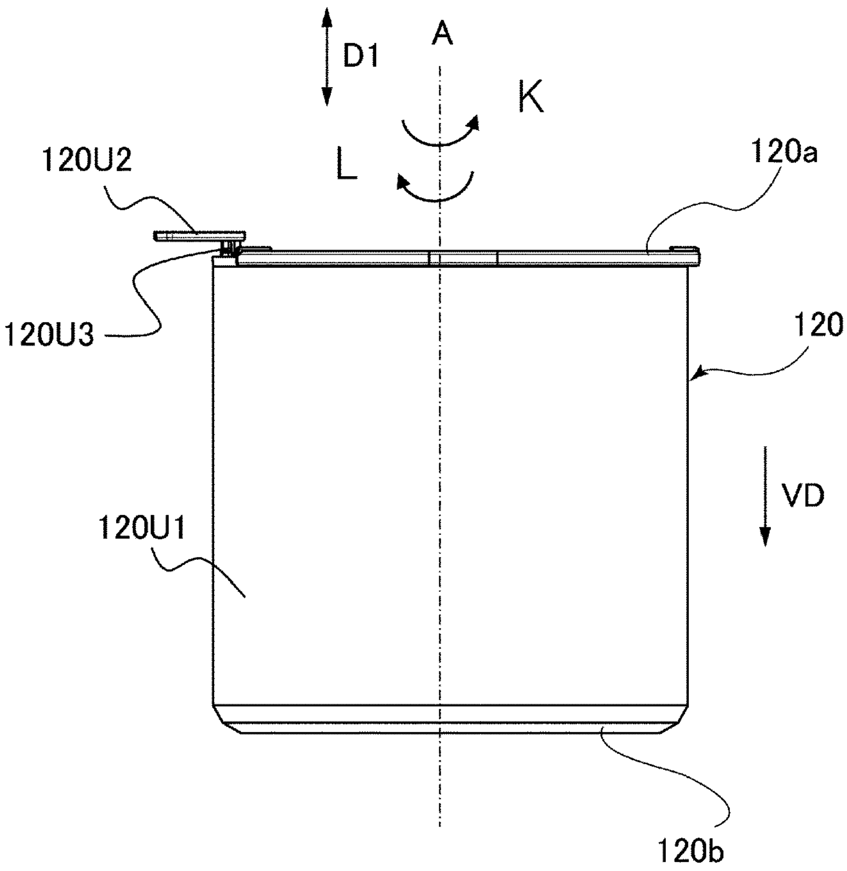
Figure 16:
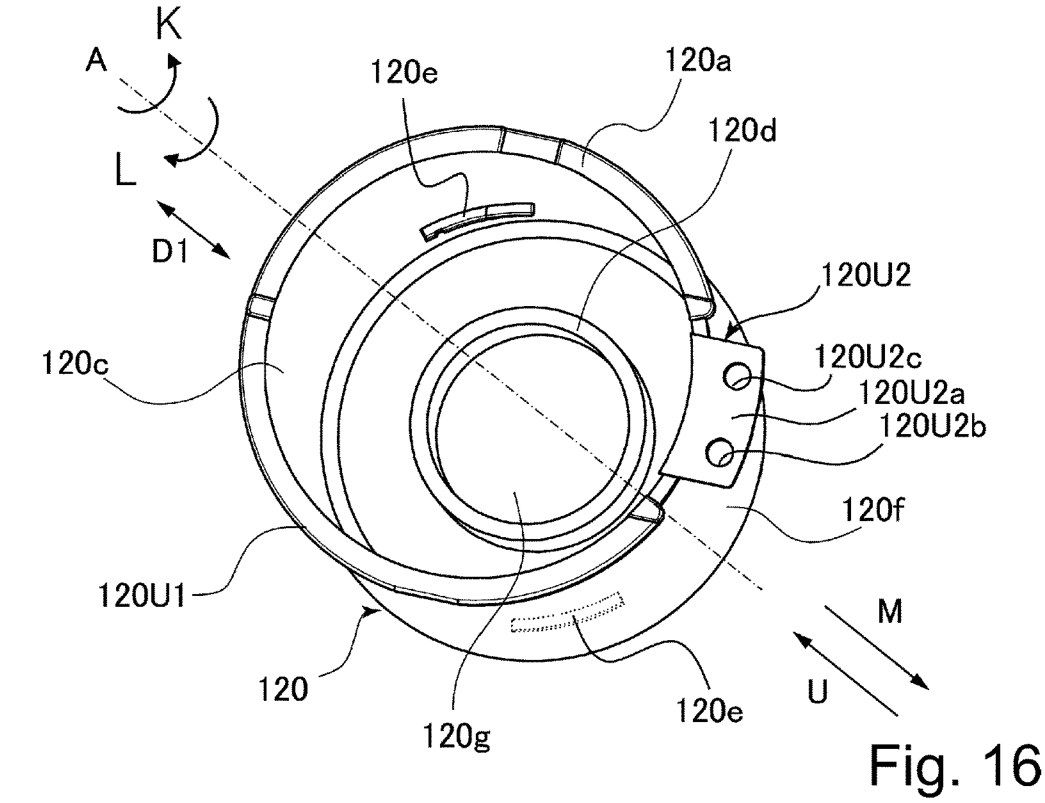

Part (a) of FIG. 16 is a front view showing the cap, and part (b) of FIG. 16 is a perspective view showing the cap.

Figure 17:
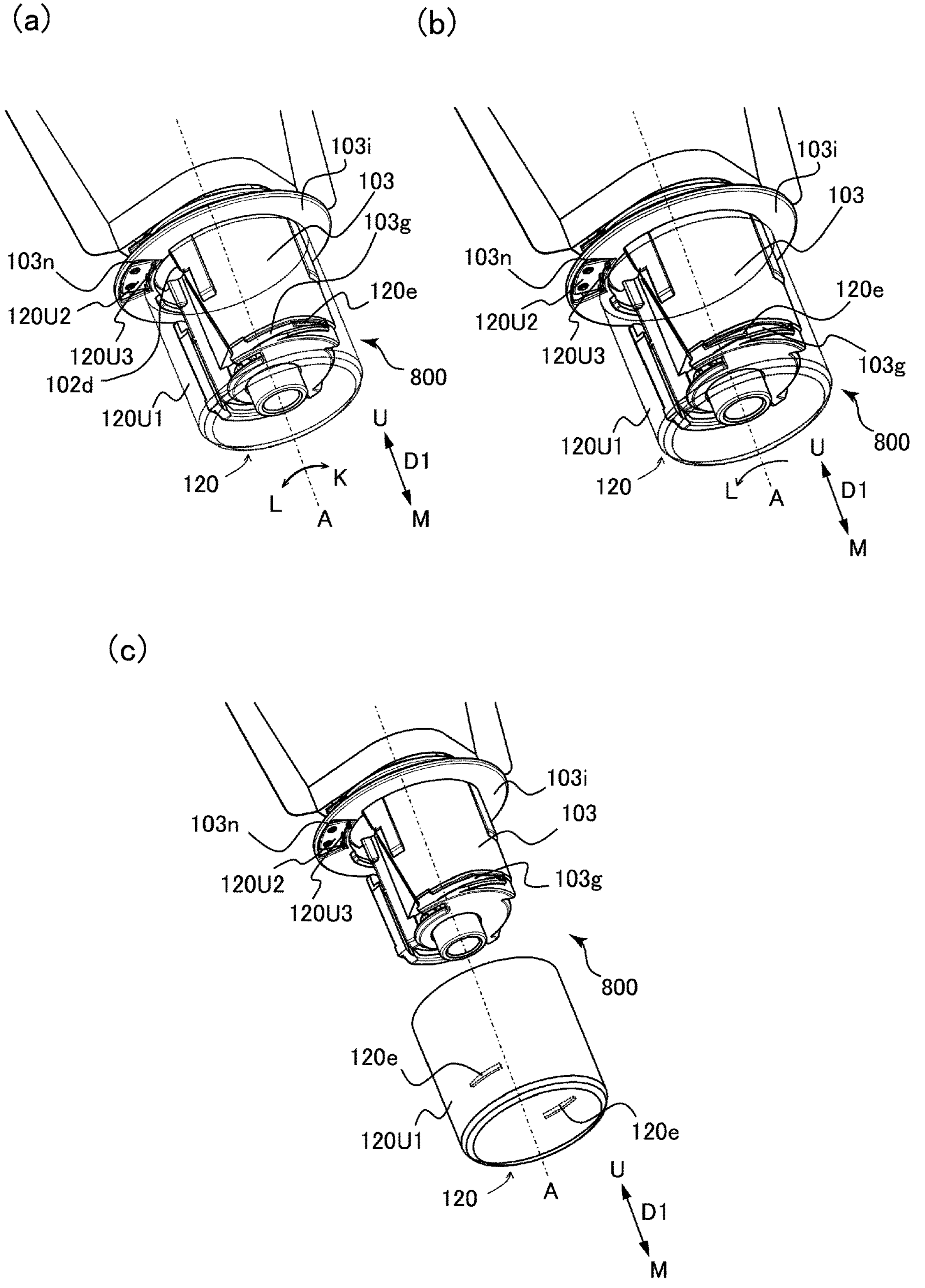

Part (a) of FIG. 17 is a sectional view showing a state in which the cap is mounted on the pack-side shutter, part (b) of FIG. 17 is a perspective view showing a process in which the cap is being dismounted from the pack-side shutter, and part (c) of FIG. 17 is a perspective view showing state in which the cap is dismounted from the pack-side shutter.

Figure 18:
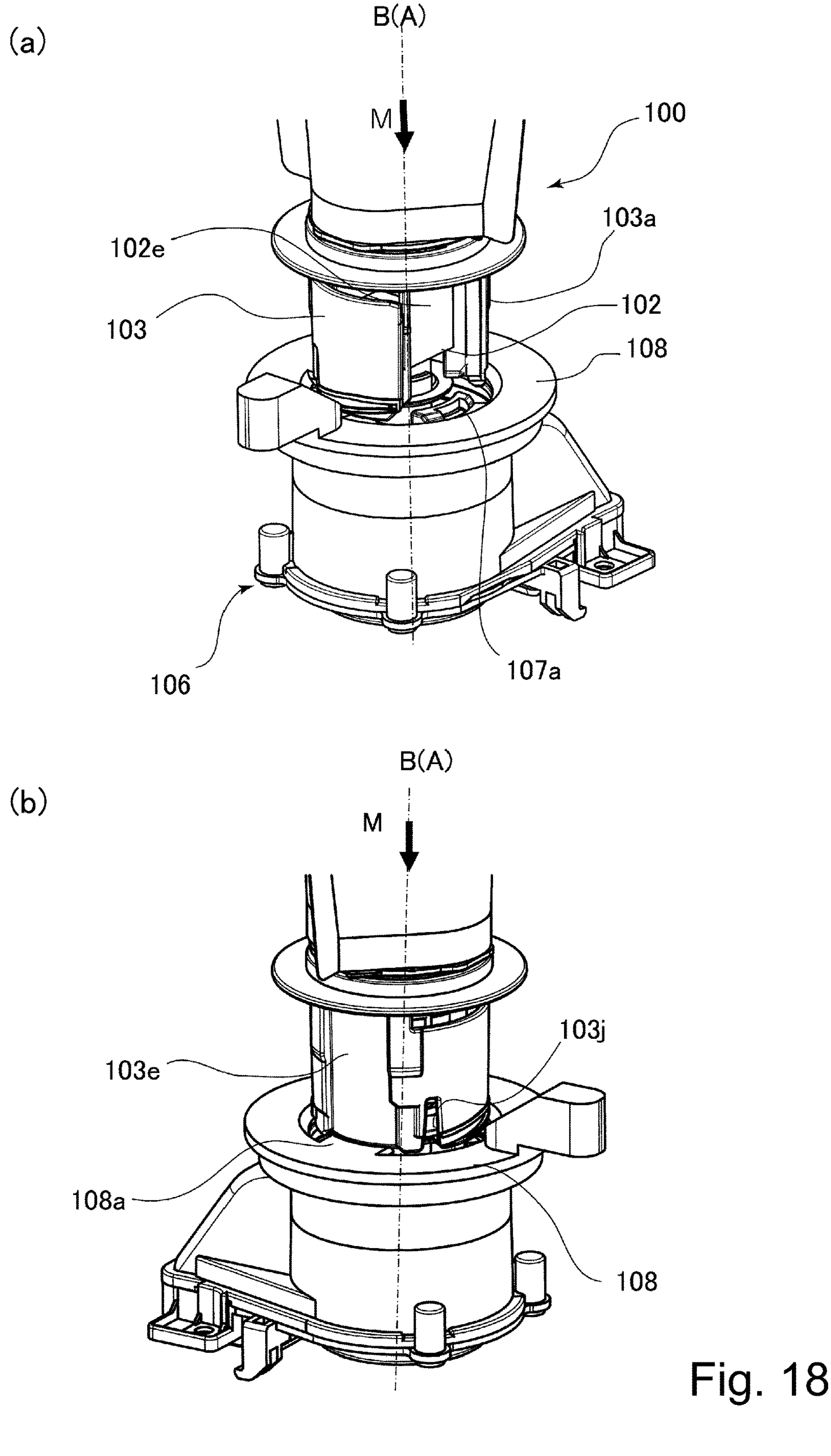

Part (a) of FIG. 18 is a perspective view showing a state in which the toner pack is being mounted toward the mounting portion, and part (b) of FIG. 18 is a perspective view showing the state in which the toner pack is being mounted toward the mounting portion as viewed from another angle.

Figure 19:
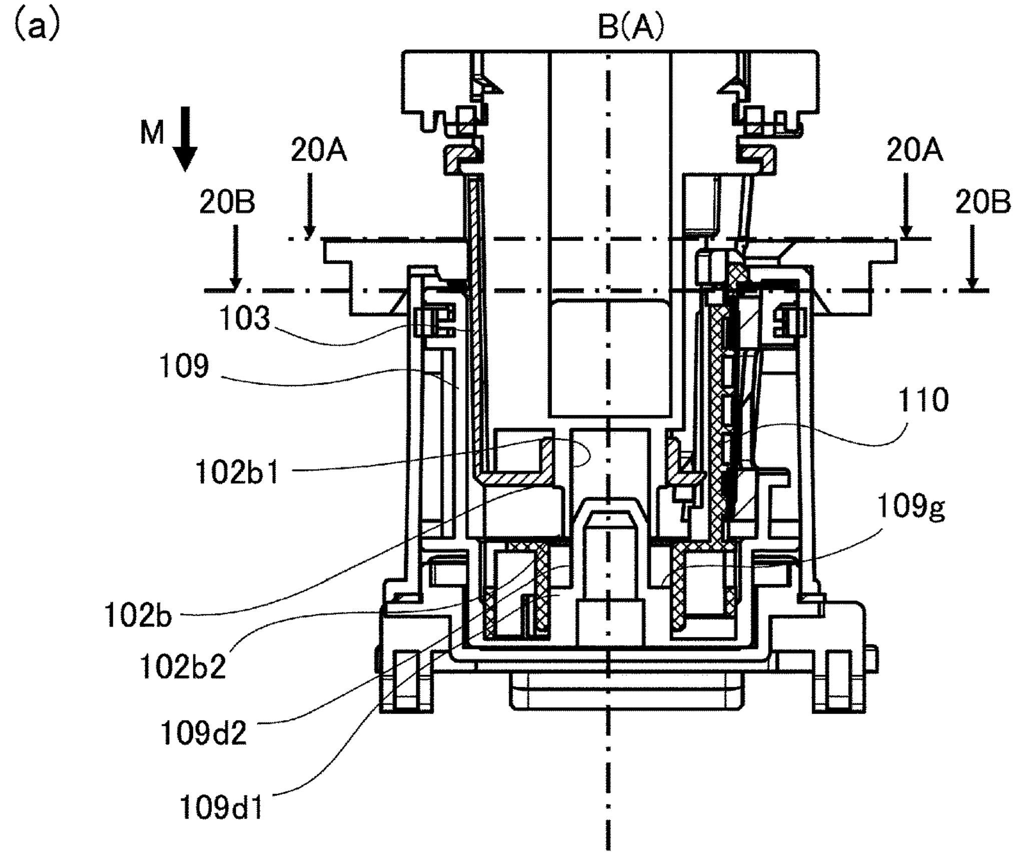
Figure 19:
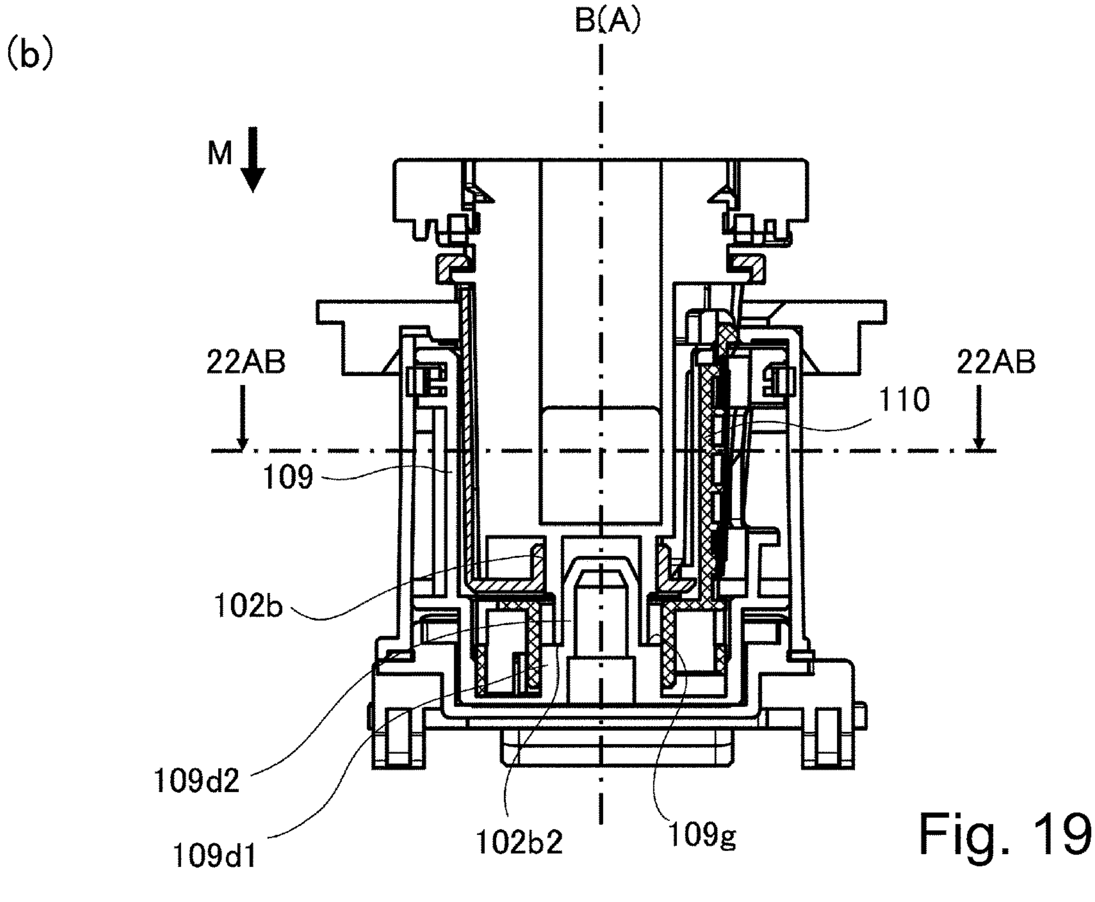

Part (a) of FIG. 19 is a sectional view showing the state in which the toner pack is being mounted toward the mounting portion, and part (b) of FIG. 19 is a sectional view showing a state in which the mounting of the toner pack on the mounting portion is completed.

Figure 20:
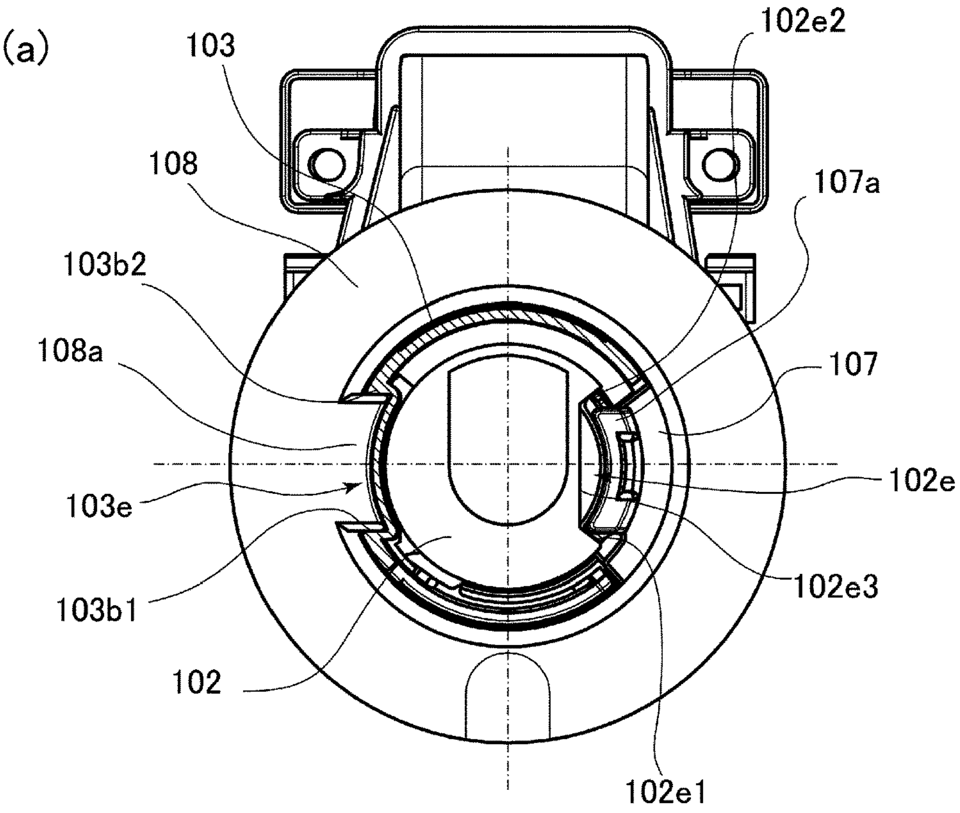
Figure 20:
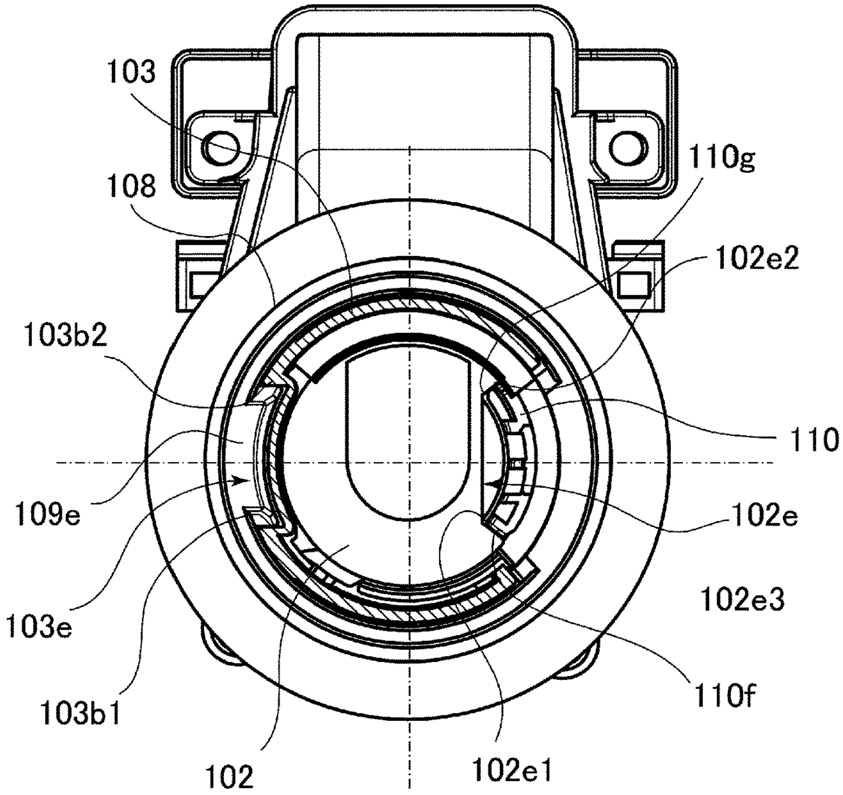

Part (a) of FIG. 20 is a sectional view showing a 20A-20A cross section of part (a) of FIG. 19, and part (b) of FIG. 20 is a sectional view showing a 20B-20B cross section of part (a) of FIG. 19.

Figure 21:
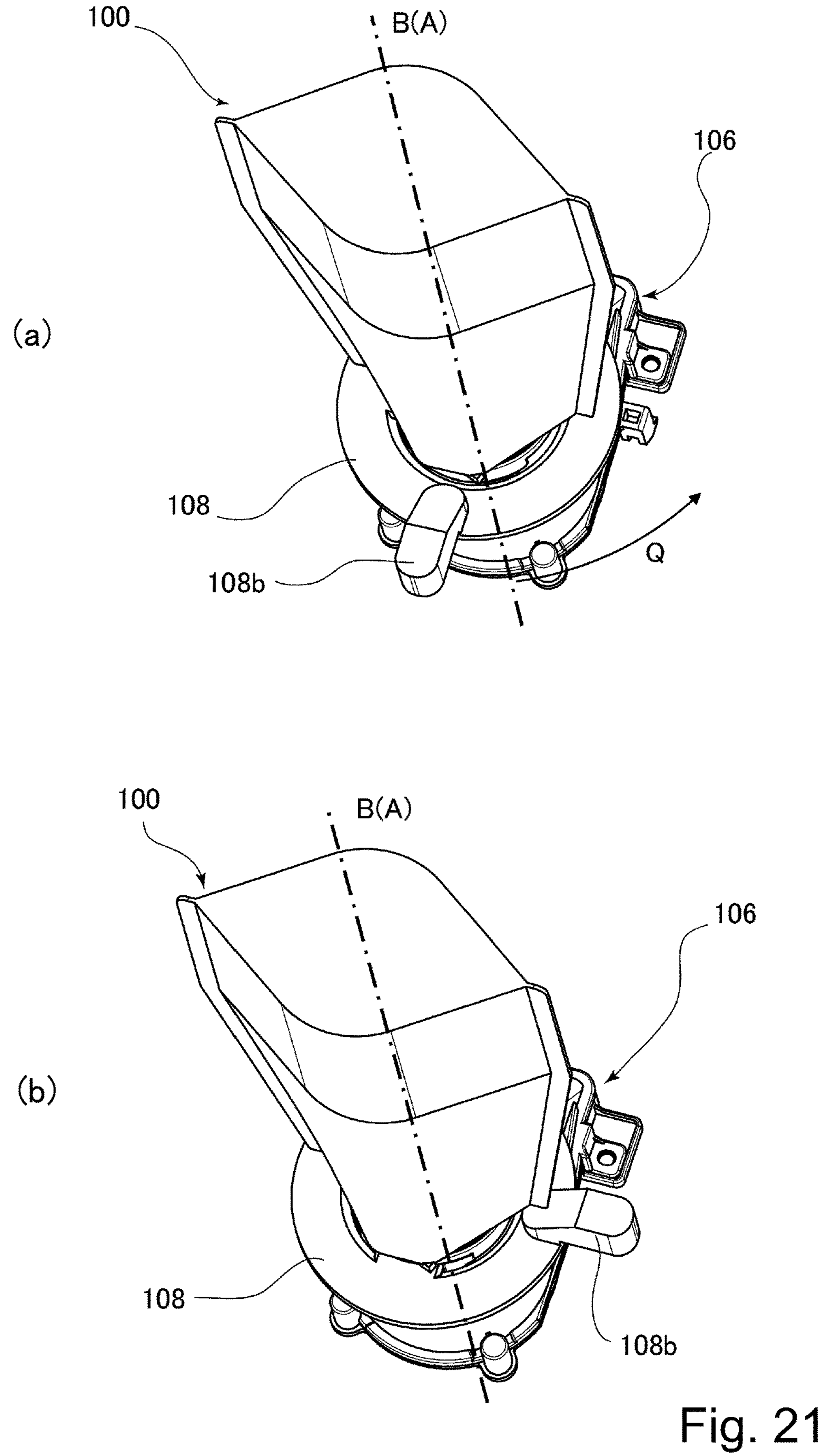

Part (a) of FIG. 21 is a perspective view showing the operating lever positioned in closed position and the toner pack, and part (b) of FIG. 12 is a perspective view showing the operating lever positioned in the open position and the toner pack.

Figure 22:
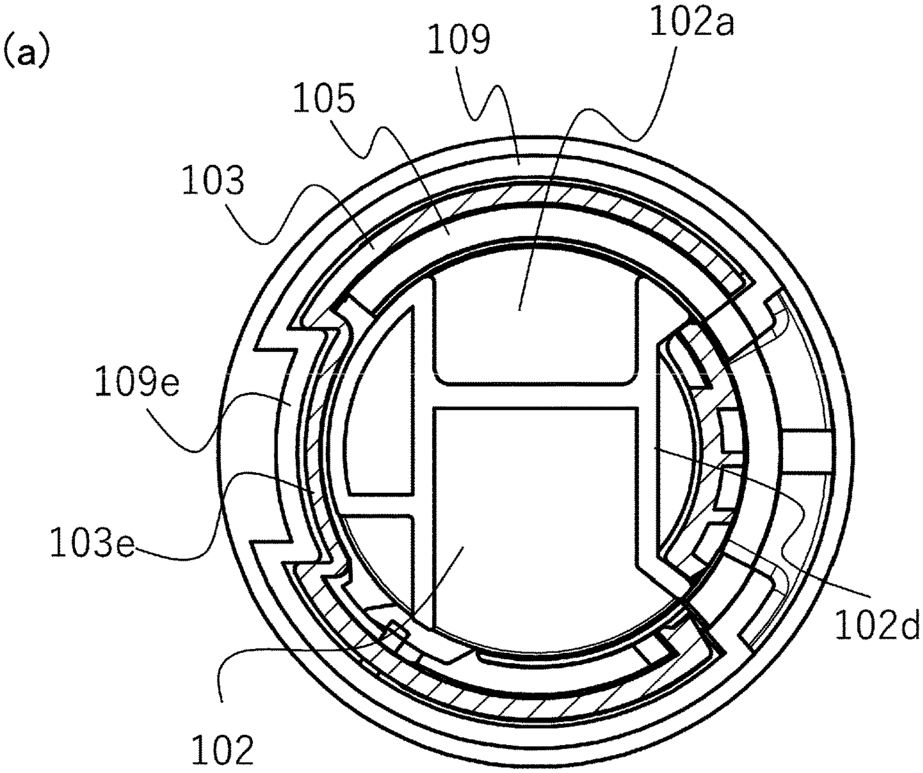
Figure 22:
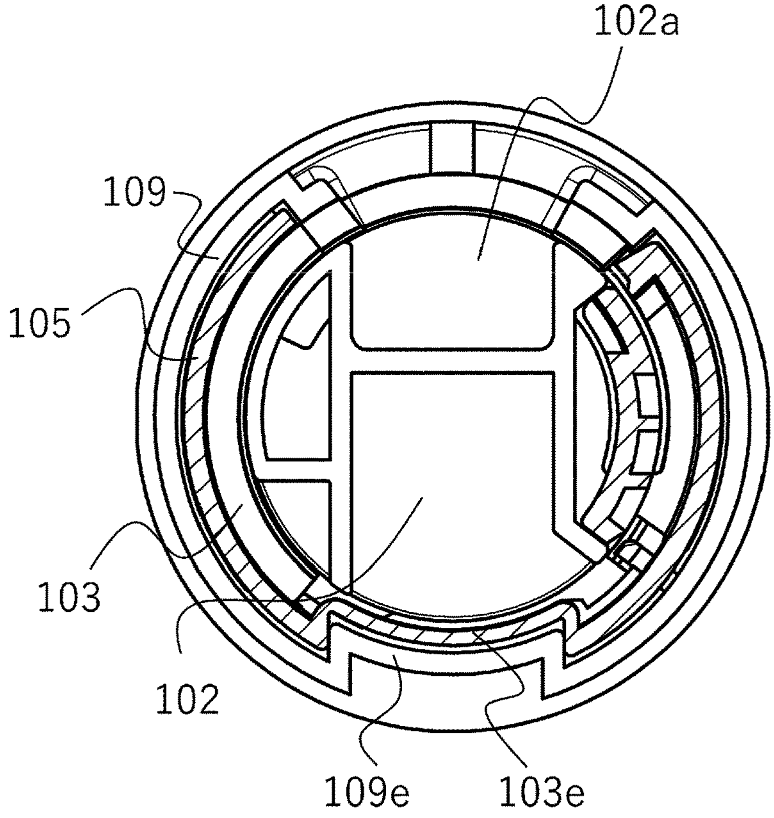

Part (a) of FIG. 22 is a sectional view showing a 22AB-22AB cross section of part (b) of FIG. 19 when both the apparatus-side shutter and the pack-side shutter are in the shielding positions, and part (b) of FIG. 22 is a sectional view showing the 22AB-22AB cross section of part (b) of FIG. 19 when both the apparatus-side shutter and the pack-side shutter are in the open positions.

Figure 23:
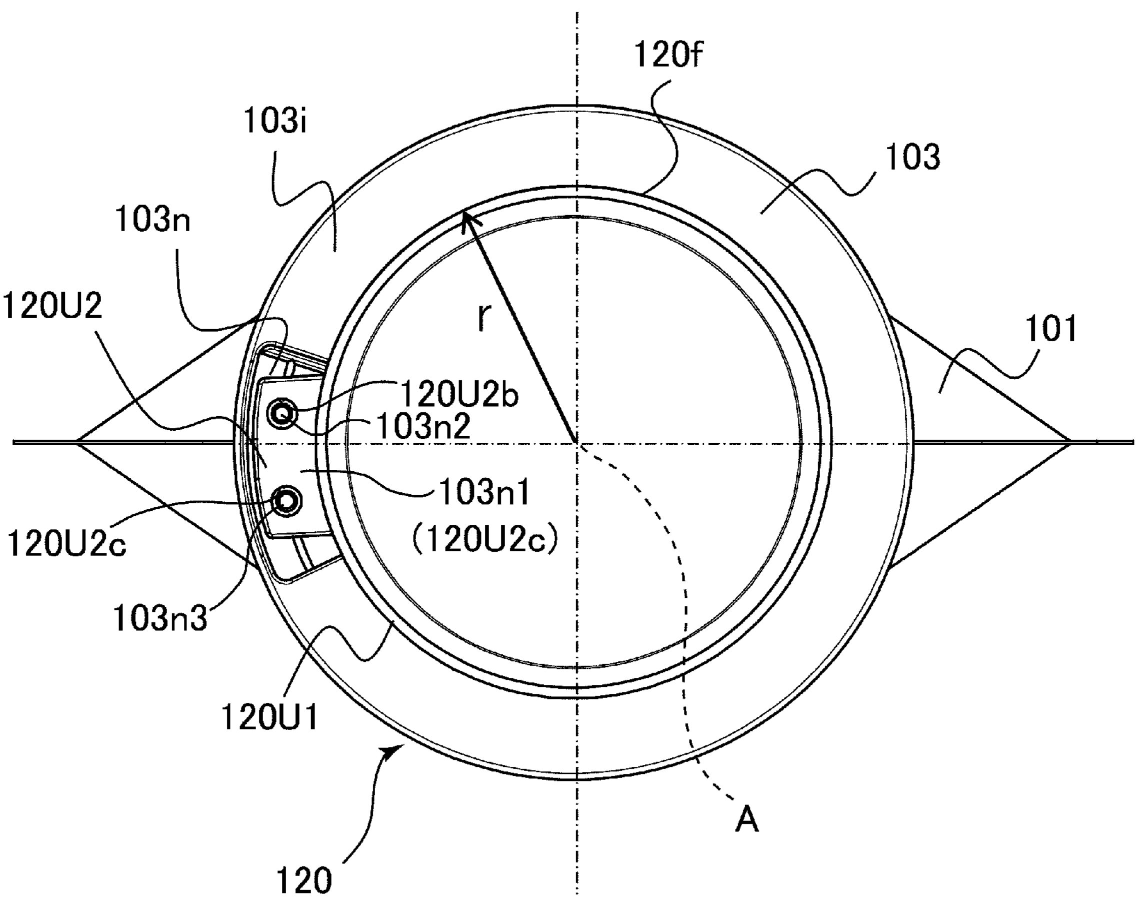

FIG. 23 is a schematic view of the toner pack as viewed in a dismounting direction.

Figure 24:
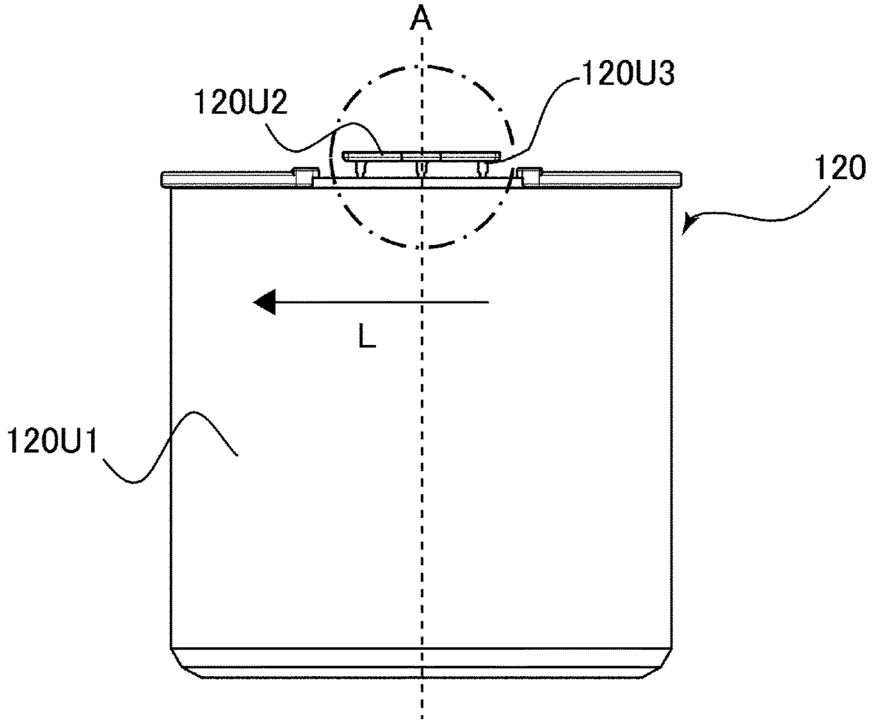
Figure 24:
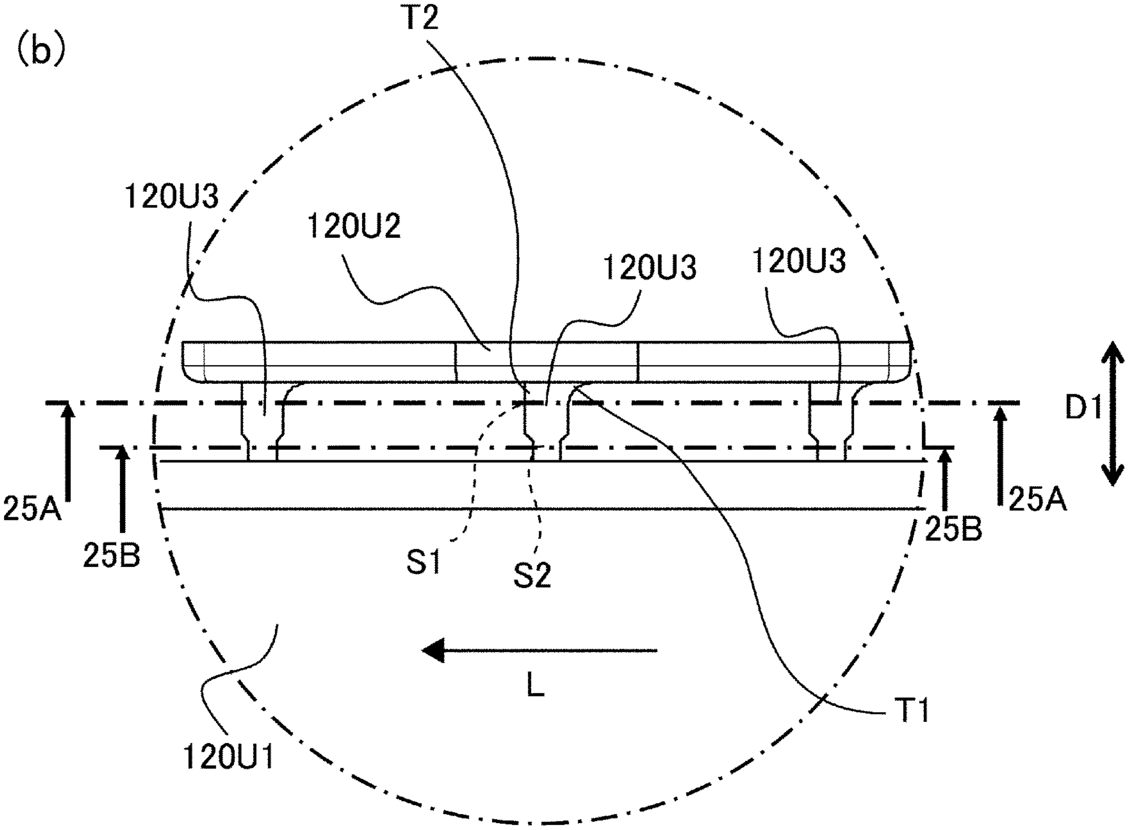

Part (a) of FIG. 24 is a front view showing the cap, and part (b) of FIG. 24 is an enlarged view showing a region enclosed by a chain line of part (a) of FIG. 24.

Figure 25:
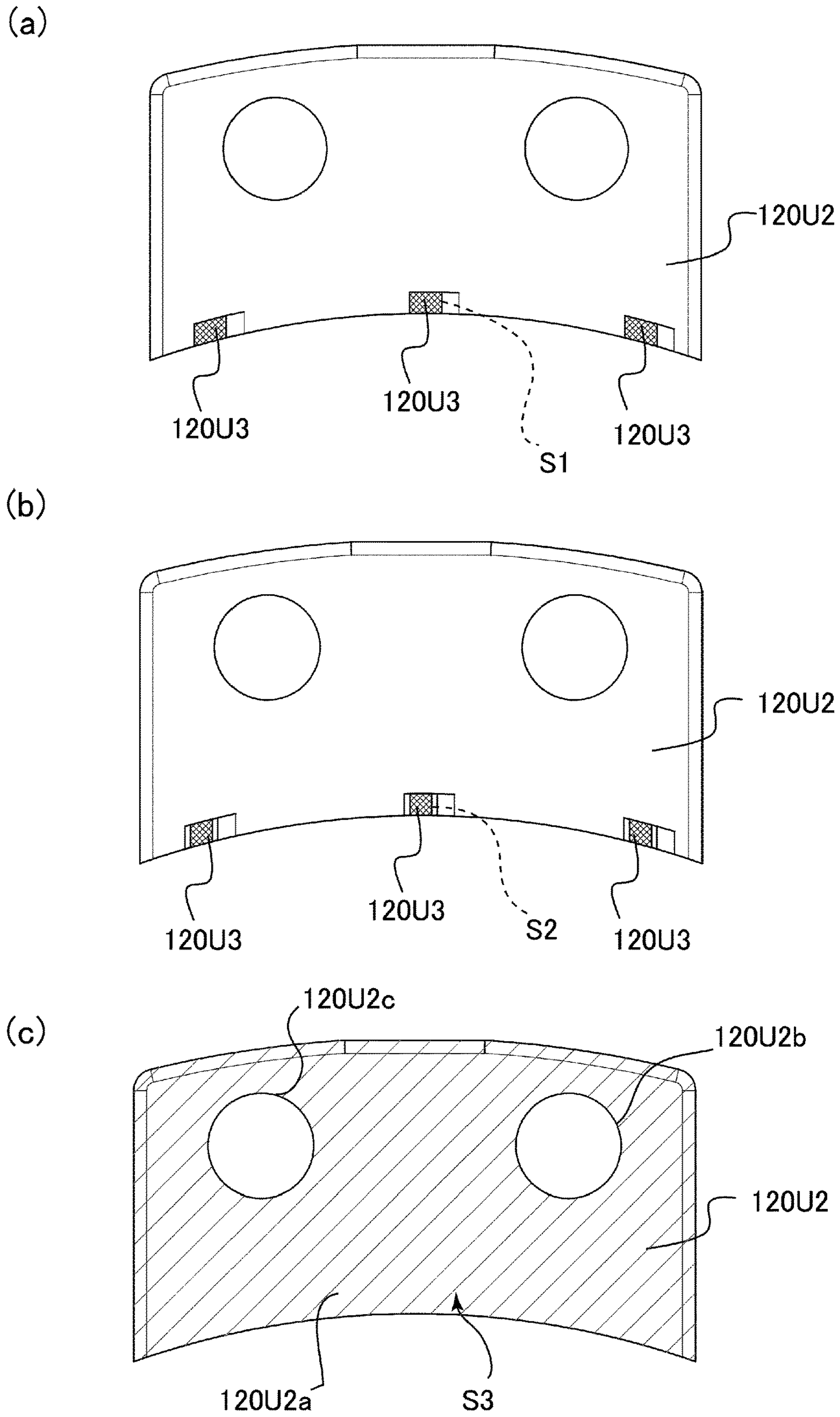

Part (a) of FIG. 25 is a sectional view showing a 25A-25A cross section of part (b) of FIG. 24, part (b) of FIG. 25 is a sectional view showing a 25B-25B cross section of part (b) of FIG. 24, and part (c) of FIG. 25 is a schematic view showing an area of a flat surface portion.

Figure 26:
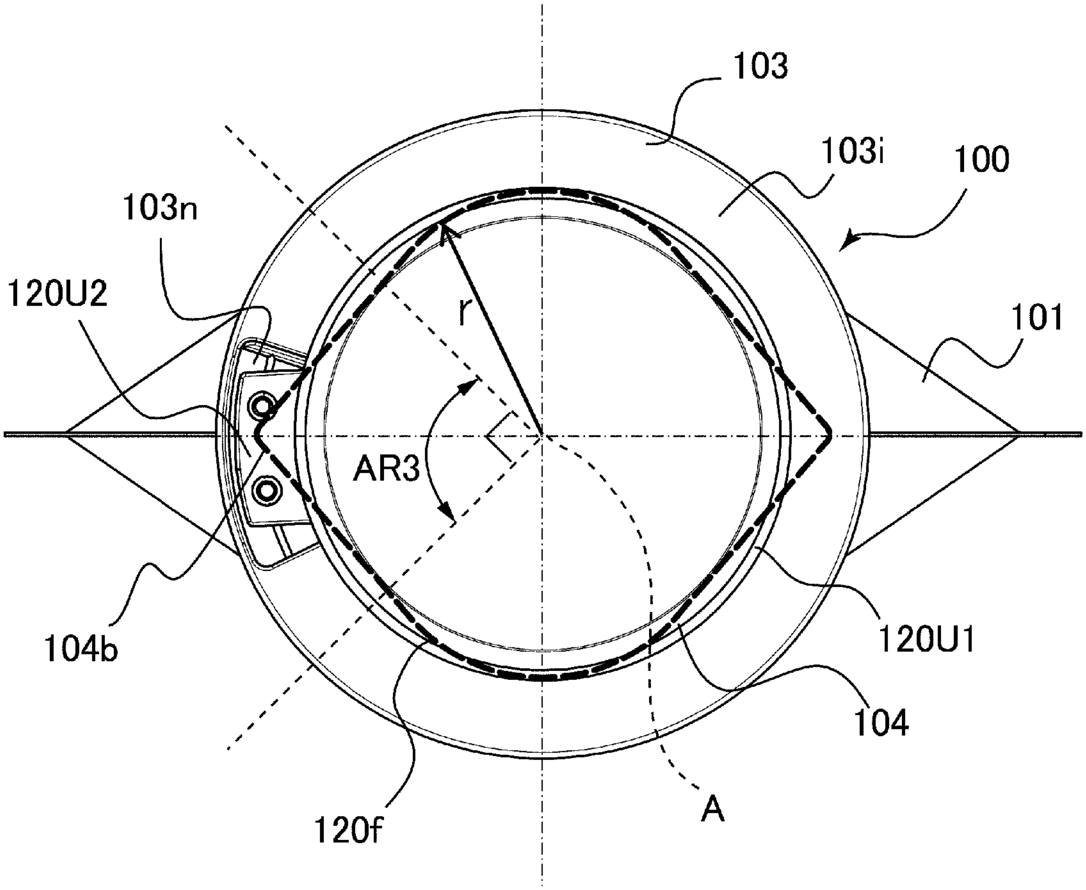

FIG. 26 is a schematic view showing a positional relationship between an extended portion and a fixing tab of an opening member.

Figure 27:
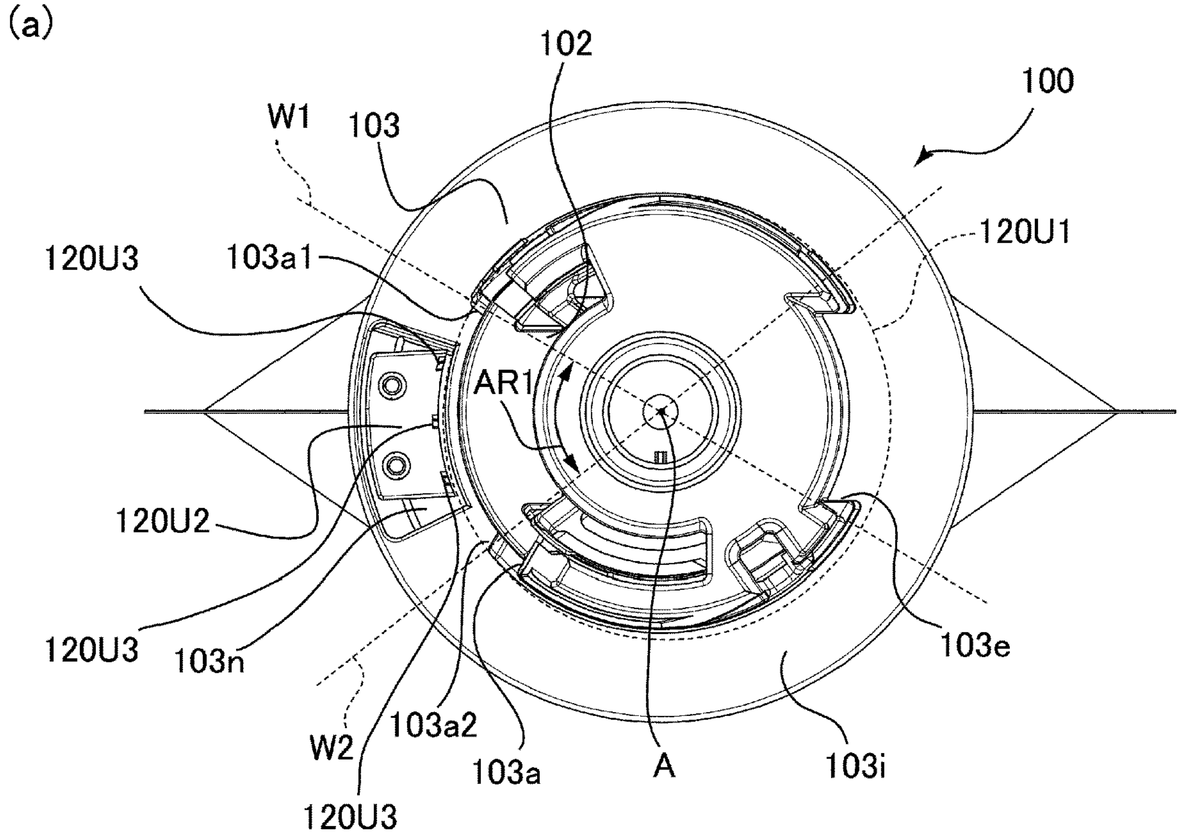
Figure 27:
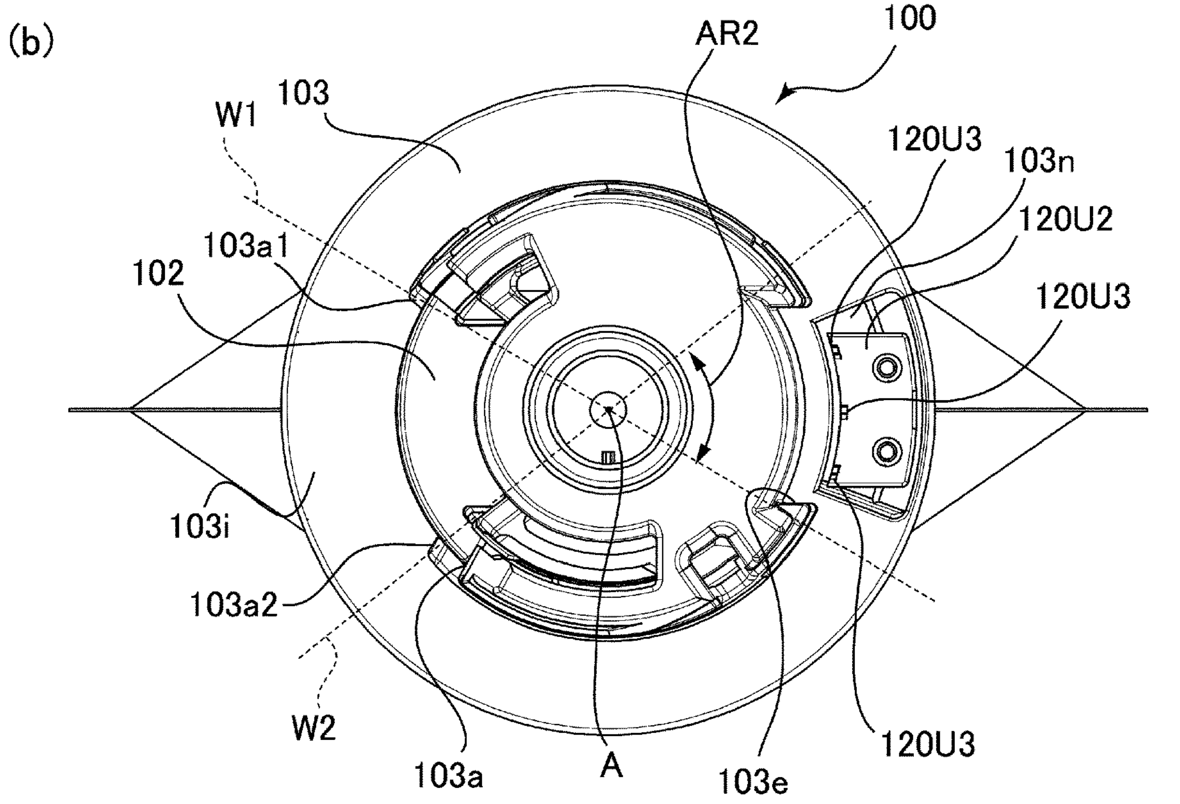

Part (a) of FIG. 27 is a bottom view of the toner pack showing a positional relationship between the fixing tab and an opening of the pack-side shutter, and part (b) of FIG. 27 is a bottom view of a toner pack in a modified embodiment.

Figure 28:
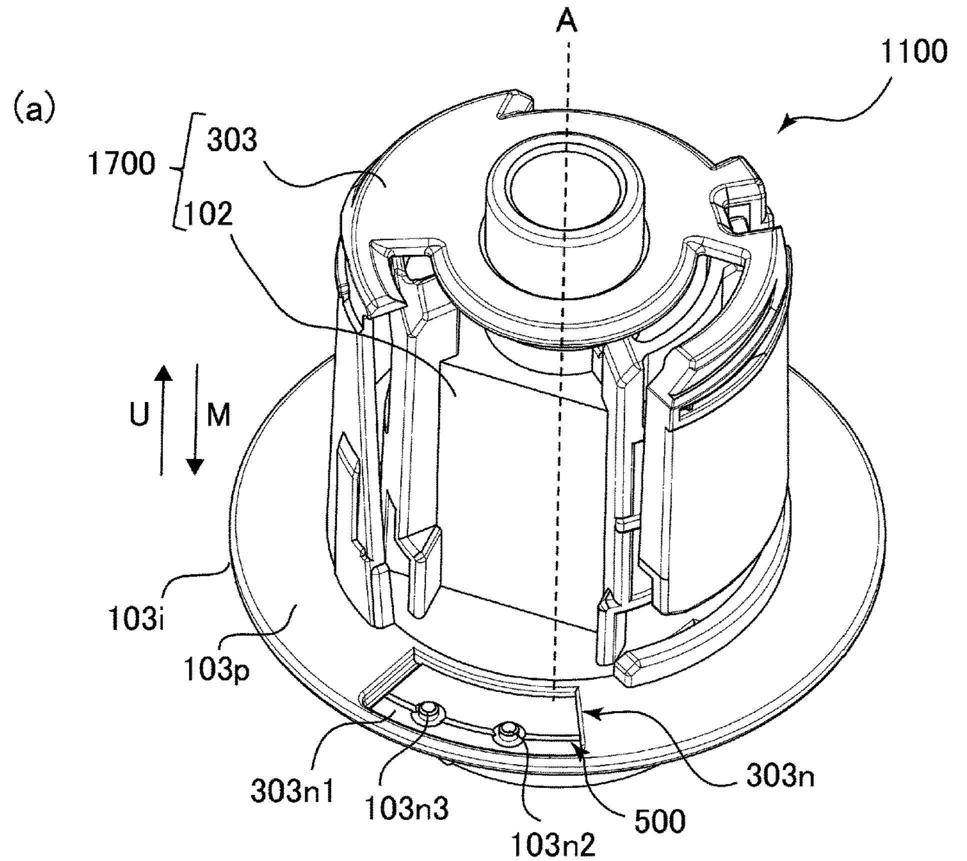
Figure 28:
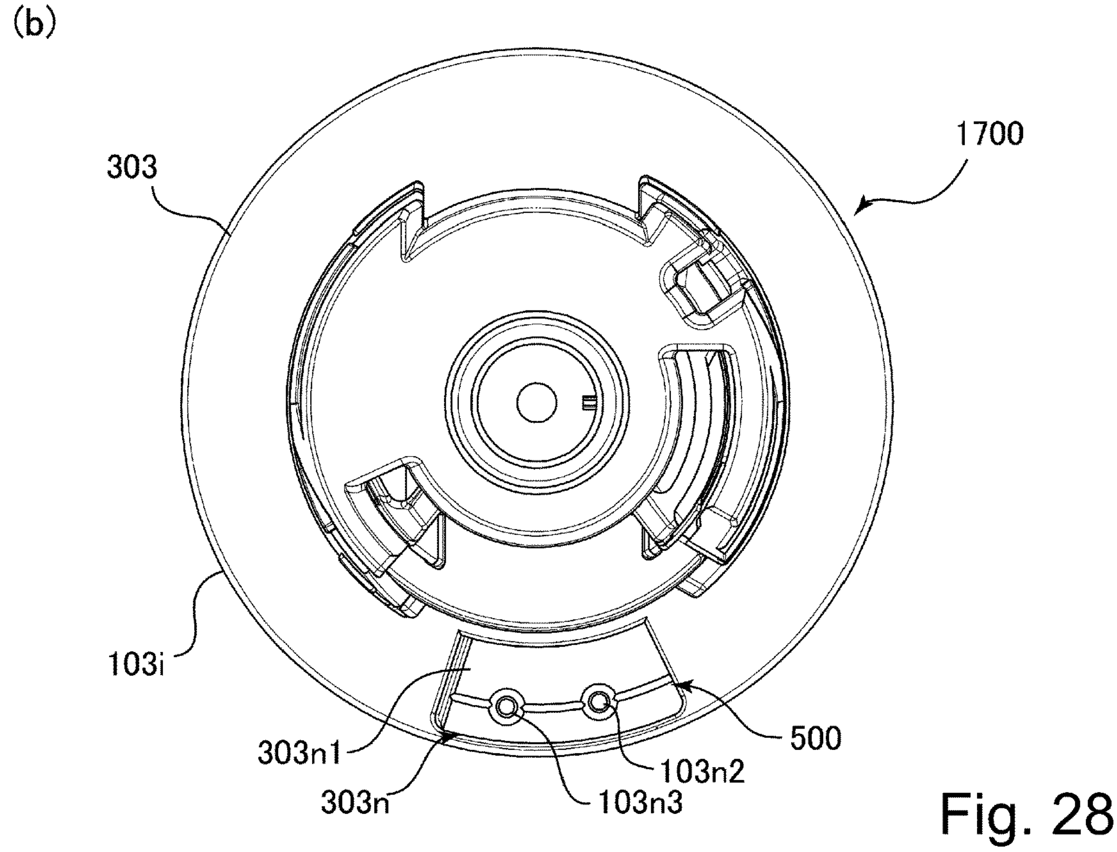

Part (a) of FIG. 28 is a perspective view showing a portion-to-be-mounted of a toner pack in a second embodiment, and part (b) of FIG. 28 is a schematic view of the portion-to-be-mounted as viewed in a dismounting direction.

Figure 29:
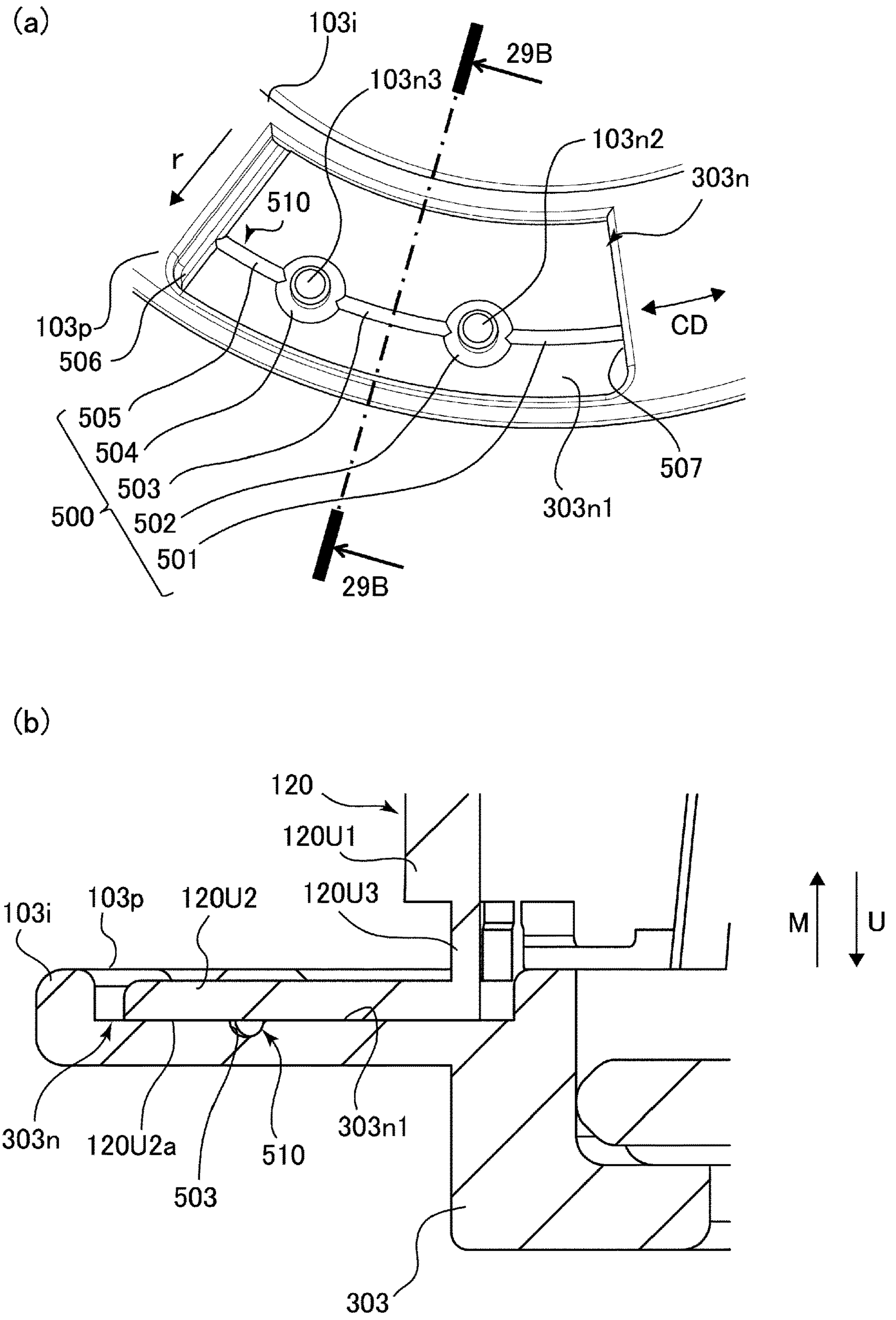

Part (a) of FIG. 29 is a perspective view of a cap fixing portion, and part (b) of FIG. 29 is a sectional view of a 29B-29B cross section of part (a) of FIG. 29.

Figure 30:
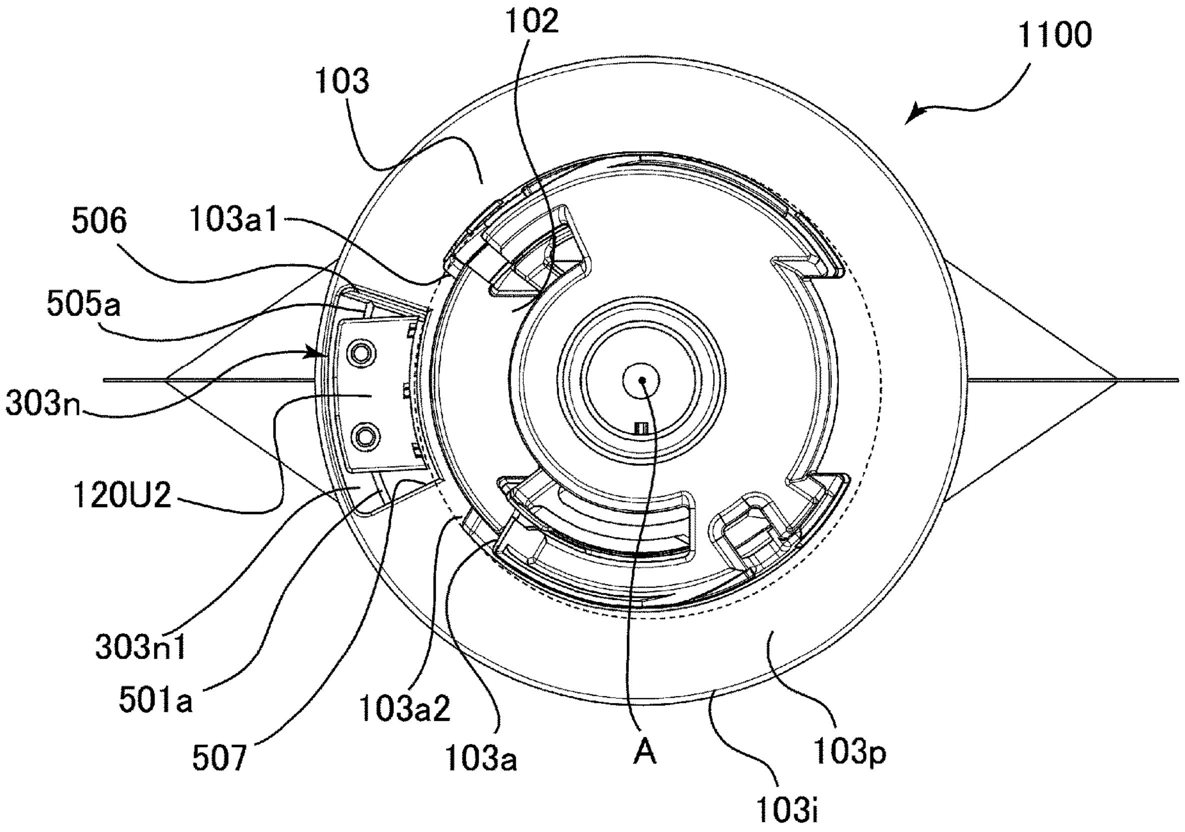

FIG. 30 is a schematic view showing the toner pack in a state in which a cap is mounted as viewed in a dismounting direction U.

DESCRIPTION OF THE EMBODIMENTS

First Embodiment

In the following, exemplary embodiments for carrying out the present invention will be described while making reference to the drawings.

Figure 1:
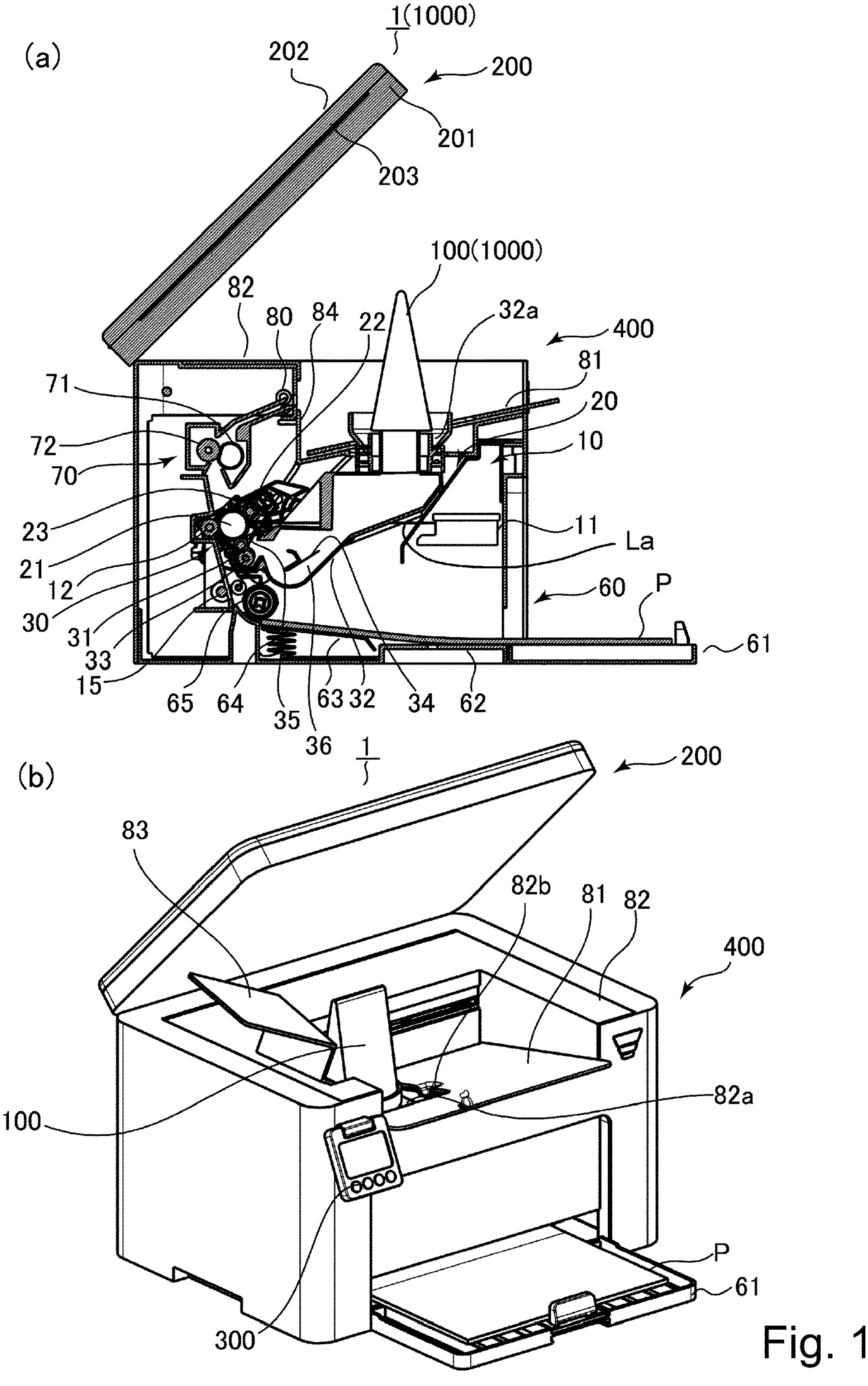
Figure 2:
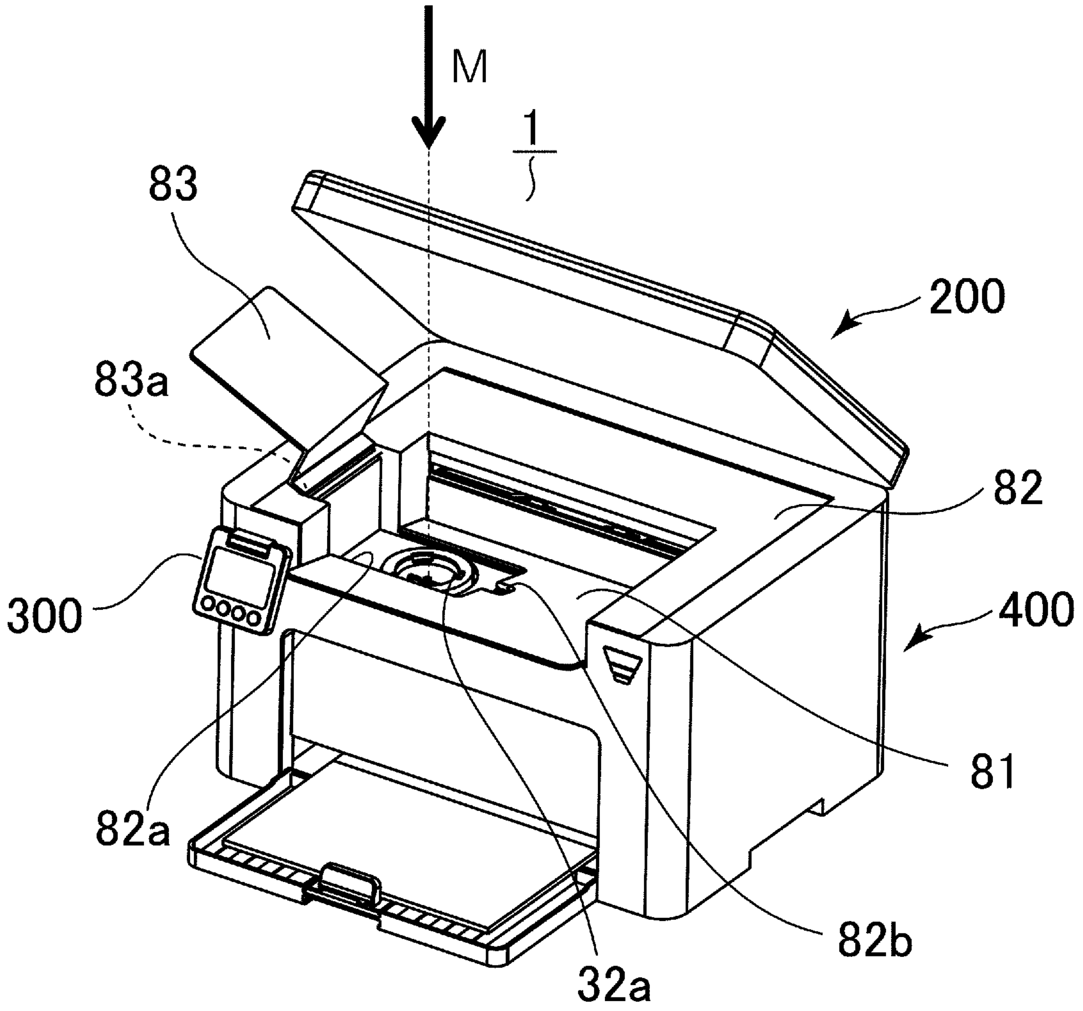
FIG. 2 is a perspective view showing an openable member and a supplying opening (port).

Part (a) of FIG. 1 is a schematic view showing a structure of an image forming apparatus 1 according to a first embodiment. Part (b) of FIG. 1 is a perspective view showing the structure of the image forming apparatus 1. FIG. 2 is a perspective view showing an openable member 83 and a supplying port 32*a*.

The image forming apparatus 1 is a monochromatic printer for forming an image on a recording material P on the basis of image information inputted from an external device. In the recording material P, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 1, an apparatus main assembly 400, a reading device 200 supported so as to be openable relative to the apparatus main assembly 400, and an operating portion 300 mounted to an outer casing surface of the apparatus main assembly 400. The apparatus main assembly 400 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10 includes a scanner unit 11, a process unit 20 of an electrophotographic type, and a transfer roller 12 for transferring the toner image, formed on a photosensitive drum 21 of the process unit 20, onto the recording material. The process unit 20 includes the photosensitive drum 21, a charging roller 22 disposed at a periphery of the photosensitive drum 21, a pre-exposure device 23, and a developing device 30 including a developing roller 31.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage power source, so that the charging roller 22 electrically charges a surface of the photosensitive drum 21 uniformly to a predetermined potential. In this embodiment, the photosensitive drum 21 is charged to a negative polarity by the charging roller 22. The pre-exposure device 23 discharges (removes) a surface potential of the photosensitive drum 21, at a position in front of the charging portion in order to generate stable electric discharge at the charging portion.

The scanner unit 11 irradiates the photosensitive drum 21, by using a polygonal mirror, with laser light La corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21 may be employed.

The developing device 30 includes the developing roller 31 for carrying a developer, a developing container 32 which is a casing for the developing device 30, and a supplying roller 33 capable of supplying the developer to the developing roller 31. The developing roller 31 and the supplying roller 33 are rotatably supported by the developing container 32. Further, the developing roller 31 is disposed at an opening of the developing container 32 so as to oppose the photosensitive drum 21. The supplying roller 33 rotatably contacts the developing roller 31, and toner as a content accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily be required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage power source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by being deposited on a surface region of the photosensitive drum 21 attenuated in charge amount by being exposed to light in an exposure step after being charged in a charging step.

Further, in this embodiment, the toner which is 6 μm in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing a magnetic component may also be used. Further, in the one-component developer, an additive (for example, wax or silica fine particles) for adjusting flowability and charging performance of the toner is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

The developing container 32 is provided with a toner accommodating portion 36 and a stirring member 34 provided inside the accommodating portion 36. The stirring member 34 is rotated by being driven by an unshown motor, and thus stirs the toner in the developing container 32 and sends the toner toward the developing roller 31 and the supplying roller 33 by being rotated. Further, the stirring member 34 has a function of circulating the toner, peeled off from the developing roller 31 without being used for the development, in the developing container 32 and of uniformizing the toner in the developing container 32. Incidentally, the stirring member 34 is not limited to a rotatable form. For example, a stirring member in a swingable form may also be employed.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 1, a front door 61 supported so as to be openable by the apparatus main assembly 400, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the apparatus main assembly 400, and supports the recording materials P together with the tray portion 62 and the intermediary plate 63 in a state in which the front door 61 is opened relative to the apparatus main assembly 400.

The fixing portion 70 is of a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to a registration roller pair 15 by the pick-up roller 65, and is abutted against a nip of the registration roller pair 15, so that oblique movement of the recording material P is corrected. Then, the registration roller pair 15 is driven by being timed to a transfer timing of the toner image, and is conveyed toward a transfer nip formed by a transfer roller 12 and the photosensitive drum 21.

To the transfer roller 12, a transfer voltage power is applied from a high transfer voltage source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, toner particles are melted and are thereafter fixed, so that the toner image is fixed on the recording material P. The recording material P passed through the fixing portion 70 is discharged to an outside of the image forming apparatus 1

(outside of the printer) by a discharging roller pair 80, so that the discharged recording materials P are stacked on a discharge tray 81 formed at an upper portion of the apparatus main assembly 400.

The discharge tray 81 is inclined upward toward a downstream in a discharging direction of the recording material P, and the recording material P discharged on the discharge tray 81 slides down on the discharge tray 81, so that a trailing end of the recording material is aligned by a restricting surface 84.

The reading device 200 includes a reading unit 201 in which an unshown reading portion is built, and a platen (pressure plate) 202 supported by the reading unit 201 so as to be openable (closable). At an upper surface of the reading unit 201, an original supporting platen glass 203 which permits transmission of light emitted from the reading portion and on which an original is to be placed.

In the case where a user intends to cause the reading device 200 to read an image of the original, the user places the original on the original supporting platen glass 203 in a state in which the platen 202 is opened. Then, the platen 202 is closed and a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

At an upper portion of the apparatus main assembly 2, a top cover 82 is provided, and at an upper surface of the top cover 82, the discharge tray 81 is formed. As shown in part (b) of FIG. 1 and FIG. 2, the openable member 83 is supported by the top cover 82 so as to be openable (closable) about a rotation shaft 83*a* extending in the front-rear direction. On the discharge tray 81 of the top cover 82, an opening 82*a* which opens upward is formed.

The openable member 83 is constituted so as to be movable between a closed position where the openable member 83 covers a supplying port 32*a* so that a toner pack 100 cannot be mounted on the developing container 32 and an open position where the supplying port 32*a* is exposed so that the toner pack 100 can be mounted on the developing container 32. In a state in which the openable member 83 is positioned in the open position, the toner pack 100 is moved in a mounting direction M and is mounted on the supplying port 32*a*.

The openable member 83 functions as a part of the discharge tray 81 in the closed position. The openable member 83 and the opening 82*a* are formed on a left(-hand) side of the discharge tray 81. Further, the openable member 83 is opened in a left(-hand) direction by being hooked with user's finger(s) from a groove portion 82*b* provided on the top cover 82. The openable member 83 is formed in a substantially L-shape along a shape of the top cover 82.

The opening 82*a* of the discharge tray 81 opens so that the supplying port 32*a* for toner supply formed at the upper portion of the developing container 32 is exposed, and the openable member 83 is opened, so that the user can access to the supplying port 32*a*. Incidentally, in this embodiment, a type (direct supply type) in which the user supplies the toner from the toner pack 100 (see, parts (a) and (b) of FIG. 1), filled with the toner for supply, to the developing device 30 kept in a state in which the developing device 30 is mounted in the image forming apparatus 1 is employed. The toner pack 100 is exposed to the outside at least at a part thereof in a state in which the toner pack 100 is mounted on the mounting portion 106 (see, parts (a) and (b) of FIG. 22).

For this reason, in the case where a remaining toner amount of the process unit 20 becomes small, an operation in which the process unit 20 is taken out of the apparatus main assembly 400 and is exchanged with a new process unit becomes unnecessary, so that usability can be improved. Further, the toner can be supplied to the developing container 32 more inexpensively than exchange of entirety of the process unit 20. Incidentally, the direct supply type can be reduced in cost since there is no need to exchange various rollers and gears, and the like even when compared with the case where only the developing device 30 of the process unit 20 is exchanged. Incidentally, the image forming apparatus 1 and the toner pack 100 constitute an image forming system 1000.

[Mounting Portion]

Next, using part (a) of FIG. 3 to part (b) of FIG. 7, a constitution (structure) of the mounting portion 106 on which the toner pack 100 is mounted will be described. In this embodiment, the mounting portion 106 is a unit for mounting the toner pack 100 including the supplying part 32*a* and is provided in the image forming apparatus 1 (see, FIG. 2). Part (a) of FIG. 3 is an exploded perspective view of the mounting portion 106. Part (b) of FIG. 3 is an exploded perspective view of the mounting portion 106 as viewed from a direction different from the direction in part (a) of FIG. 3. Part (a) of FIG. 4 and part (a) of FIG. 5 are a perspective view showing an outer appearance of the mounting portion 106 and a schematic view of the mounting portion 106 as viewed in the mounting direction M, respectively, when an operating lever 108 is in a closed position. Part (b) of FIG. 4 and part (b) of FIG. 5 are a perspective view showing an outer appearance of the mounting portion 106 and a schematic view of the mounting portion 106 as viewed in the mounting direction M, respectively, when the operating lever 108 is in an open position.

Part (a) of FIG. 6 is a perspective view of an apparatus-side shutter 109 as viewed from an upstream side of the mounting direction M. Part (b) of FIG. 6 is a perspective view of the apparatus-side shutter 109 different in point of view from part (a) of FIG. 6. Part (a) of FIG. 7 is a perspective view of a cover 110 as viewed from a downstream side of the mounting direction M. Part (b) of FIG. 7 is a perspective view of the cover 110 as viewed from an upstream side of the mounting direction M.

As shown in part (a) of FIG. 3 to part (b) of FIG. 4, the mounting portion 106 includes a main body base portion 2, and the main body base portion 2 includes a first frame 107, a second frame 117, and the cover 110. The cover 110 and the second frame 117 are fixed to the first frame 107. As shown in parts (a) and (b) of FIG. 7, the cover 110 includes a portion-to-be-engaged 110*h* engaged with a positioning portion 107*a* of the first frame 107 so as not to be rotated about a rotational axis B relative to the first frame 107. Further, with respect to the mounting portion M, on a side downstream of the cover 110, i.e., on a bottom side, a cut-away portion 110*k* is provided, and the cut-away portion 110*k* is provided with a first restricting surface 110*c* and a second restricting surface 110*d*. The first restricting surface 110*c* and the second restricting surface 110*d* are provided so as to oppose each other with respect to a circumferential direction about the rotational axis B.

Incidentally, the first frame 107, the cover 110, and the second frame 117 may be integrally constituted, not as separate members. As shown in parts (a) and (b) of FIG. 3, the second frame 117 is provided with an apparatus-side opening 117*a*, and the apparatus-side opening 117*a* communicates with a toner accommodating portion 36 (see, part (a) of FIG. 1) of the developing container 32.

Each of the operating lever 108 and the apparatus-side shutter 109 is mounted on the main body base portion 2 so as to be rotatable about the rotational axis B. The first frame 107 is provided with the positioning portion 107*a*. The positioning portion 107*a* projects inward from an inner peripheral surface about the rotational axis B of the first frame 107 in a radial direction r of a phantom circle (virtual circle) VC about the rotational axis B.

Further, the operating lever 108 as an open positioning portion is provided with a drive transmitting portion 108*a* and an open positioning portion 108*b*. A user is capable of rotating the operating lever 108 about the rotational axis B relative to the main body base portion 2 by open positioning the open positioning portion 108*b*.

The drive transmitting portion 108*a* is a projected portion projected inward from an inner peripheral surface about the rotational axis B of the operating lever 108 in the radial direction r of the phantom circle VC about the rotational axis B.

As shown in parts (a) and (b) of FIG. 6, the apparatus-side shutter 109 as a main apparatus shutter includes an inner peripheral surface 109*h*, a receiving port (opening) 109*a* provided in the inner peripheral surface 109*h* and for receiving the toner from the toner pack 100, and a bottom 109*b*. The apparatus-side shutter 109 further includes a center boss 109*d* provided on the bottom 109*b*, a pack contact surface 109*g*, a rib-to-be-restricted 109*c*, and a portion 109*e* to which drive is transmitted and which is provided on the inner peripheral surface 109*h*. The portion 109*e* to which drive is transmitted is a projected portion projected inward in the radial direction r of the phantom circle VC about the rotational axis B as shown in part (b) of FIG. 6. To the inner peripheral surface 109*h*, an apparatus-side seal 111 is applied so as to surround the receiving port 109*a* (see, part (b) of FIG. 4).

The apparatus-side shutter 109 is constituted so as to take a shielding position and an open position relative to the main body base portion 2. Specifically, the apparatus-side shutter 109 is, as shown in parts (a) and (b) of FIG. 6, rotated in an arrow K direction from the shielding position toward the open position and rotated in an arrow L direction from the open position toward the shielding position. Incidentally, these arrow K direction and arrow L direction are similar to arrow K direction and arrow L direction, respectively, of the pack-side shutter 103. As regards the apparatus-side shutter 109, in the shielding position, the receiving port 109*a* is shielded by the apparatus-side seal 111 and the cover 110, and in the open position, the receiving port 109*a* is opened without being covered by the cover 110. That is, the receiving port 109*a* does not communicate with the apparatus-side opening 117*a* of the second frame 117 when the apparatus-side shutter 109 is positioned in the shielding position, and communicates with the apparatus-side opening 117*a* of the second frame 117 when the apparatus-side shutter 109 is positioned in the open position.

In part (a) of FIG. 4 and part (a) of FIG. 5, the apparatus-side shutter 109 is positioned in the shielding position, and at this time, the receiving port 109*a* of the apparatus-side shutter 109 does not communicate with the apparatus-side opening of the second frame 117. Further, in part (b) of FIG. 4 and part (b) of FIG. 5, the apparatus-side shutter 109 is positioned in the open position, and at this time, the receiving port 109*a* of the apparatus-side shutter 109 communicates with the apparatus-side opening of the second frame 117. The apparatus-side shutter 109 is moved to the open position, whereby the toner can be supplied (replenished) from the toner pack 100 to the toner accommodating portion 36 of the developing container 32 through the receiving port 109*a*.

Incidentally, the operating lever 108 and the apparatus-side shutter 109 are not drive-connected to each other, and therefore, even when the operating lever 108 is open positioned in a state in which the toner pack is not mounted, the apparatus-side shutter 109 is not rotated.

As shown in part (a) of FIG. 6 to part (b) of FIG. 7, the apparatus-side shutter 109 is constituted so as to be rotatable about the center boss 109*d* by engaging a large-diameter portion 109*d*1 of the center boss 109*d* with a cylindrical portion 110*j* of the cover 110. Here, the rib-to-be-restricted 109*c* provided on the bottom 109*b* of the apparatus-side shutter 109 is positioned between the first restricting surface 110*c* and the second restricting surface 110*d* of the cover 110. For this reason, the apparatus-side shutter 109 is rotatable only in movable range of the rib-to-be-restricted 109*c* between the first restricting surface 110*c* and the second restricting surface 110*d*. In other words, the apparatus-side shutter 109 is restricted in rotation range between the shielding position and the open position by the first restricting surface 110*c* and the second restricting surface 110*d* of the cover 110. For example, in a state in which the rib-to-be-restricted 109*d* contacts the first restricting surface 110*c*, the apparatus-side shutter 109 positioned in the shielding position cannot be rotated in the arrow L direction, i.e., a direction opposite to a direction toward the open position.

[Structure of Accommodating Container]

Next, using part (a) of FIG. 8 to part (b) of FIG. 9, a basic structure of an accommodating container 800 including the toner pack 100 will be described. The toner pack 100 is mounted on the above-described mounting portion 106. Part (a) of FIG. 8 is a perspective view showing the accommodating container 800. Part (b) of FIG. 8 is an exploded perspective view showing the accommodating container 800. Part (a) of FIG. 9 is side view of the toner pack 100 when the pack-side shutter 103 is in the shielding position. Part (b) of FIG. 9 is a side view of the toner pack 100 when the pack-side shutter 103 is in the open position.

The accommodating container 800 as a container includes, as shown in parts (a) and (b) of FIG. 8, the toner pack 100, and a cap 120. Incidentally, the accommodating container 800 and the image forming apparatus 1 constitute an image forming system 1000 (see, part (a) of FIG. 1). The toner pack 100 includes a pouch 101 for accommodating a content such as the toner, an opening member 104 connected to an opening 101*a* of the pouch 101, a portion-to-be-mounted 700 mounted on the mounting portion 106. The portion-to-be-mounted 700 as a top end portion includes a nozzle 102 connected to the opening member 104, and includes the pack-side shutter 103. The cap 120 is detachably mounted on the portion-to-be-mounted 700 but will be specifically described later.

The pouch 101 as an accommodating portion has flexibility, and is provided on one end side of the toner pack 100 with respect to an axial direction D1 which is a direction of a rotational axis A of the pack-side shutter 103. The rotational axis A coincides with the rotational axis B of the apparatus-side shutter 109 when the toner pack 100 is mounted on the mounting portion 106, and therefore, in the following, both the directions of the rotational axis A and the rotational axis B are referred to as the axial direction D1.

The nozzle 102 and the pack-side shutter 103 are provided on the other end side of the toner pack 100 with respect to the axial direction D1. The pouch 101 is formed by subjecting, for example, a flexible polypropylene sheet to pouch processing, and has a bag shape such that one end portion thereof opens through the opening 101*a*. Incidentally, the pouch 101 may also be a bottle made of a resin material or a container made of paper or a vinyl resin material.

The opening member 104 as an intermediary member is an annular resin member provided with a through hole 104*a* and is fixed to the opening 101*a* of the pouch 101. In this embodiment, the opening member 104 is formed of a polypropylene resin material and is larger in thickness than the pouch 101 which is the flexible sheet, and this has high rigidity. In other words, the pouch 101 has first rigidity, and the opening member 104 has second rigidity higher than the first rigidity. By this, even the flexible pouch 101 is capable of maintaining a state in which the opening 101*a* opens.

Further, the opening member 104 is connected to the nozzle 102 and is provided with the through hole 104*a*. That is, the opening member 104 connects the pouch 101 with the portion-to-be-mounted 700 so that the pouch 101 and the portion-to-be-mounted 700 including the nozzle 102 communicate with each other.

Further, the opening member 104 includes a pair of extended portions 104*b* extended so as to be spaced from the rotational axis A with respect to the radial direction r of the phantom circle VC about the rotational axis A. The pair of extended portions 104*b* are disposed at phases which are different from each other by 180 degrees with respect to a circumferential direction about the rotational axis A. Thus, outer peripheral surface of the opening member 104 is not a uniform circumferential surface about the rotational axis A, and therefore, the user is capable of stably holding the opening member 104 by grasping the extended portions 104*b*. That is, the extended portions 104*b* function as non-slip portions so that user's hands do not slip with respect to a rotational direction about the rotational axis A.

Incidentally, the nozzle 102 as a discharging portion is connected to the opening member 104, but a connecting method may be any method. For example, as the connecting method, a method using various adhesives such as a hot-melt adhesive, a method in which the through hole 104*a* of the opening member 104 is thermally welded to an outer periphery of the nozzle 102, and the like method may be used. A connecting method of the pouch 101 with the opening member 104 may be any method.

The nozzle 102 includes a side surface 102*c* as an outer surface extending along the rotational axis A, and the side surface 102*c* is provided with a discharging port 102*a* constituted so as to communicate with an inside of the pouch 101 and provided with a recessed portion 102*e*. The recessed portion 102*e* is provided in a position different from the discharging port 102*a* with respect to a rotational direction of the pack side shutter 103. The toner accommodated in the pouch 101 is constituted so as to be discharged to an outside of the toner pack 100 through for discharging port 102*a* by being compressed (squeezed) by the user and thus by being decreased in volume of the pouch 101. That is, inside the nozzle 102, a passage (see, part (a) of FIG. 19) constituted so that the toner (content) passes toward a discharge opening (discharging port) 102*a* along the passage is formed.

Incidentally, the nozzle 102 may be constituted integrally with the opening member 104. Further, a constitution in which a seal is provided between the pouch 101 and the discharge opening 102*a* of the nozzle 102 and in which the pouch 101 and the discharge opening 102*a* communicate with each other in the case where the seal is removed may be employed.

Outside the side surface 102*c* of the nozzle 102, the pack-side shutter 103 as a shielding member is disposed. The pack-side shutter 103 is provided rotatably about the rotational axis A extending in the direction along the axial direction D1 and is provided with an opening 103*a*. Specifically, an inner peripheral surface 103*m* of the pack-side shutter 103 is slidably supported by an annular rib 104*m* of the opening member 104. The pack-side shutter 103 is provided outside the side surface 102*c* with respect to the radial direction r of the phantom circle VC about the rotational axis A and is capable of shielding the discharge opening 102*a*. An arcuate surface of the side surface 102*c* is a curved surface projected toward an outside with respect to the radial direction r.

An inside surface of the pack-side shutter 103, i.e., a surface opposing the side surface 102*c* is a curved surface extending along the side surface 102*c* of the nozzle 102, and a rectangular pack-side seal 105 is mounted on the curved surface.

The pack-side shutter 103 is constituted so as to be rotatable between a shielding position (position shown in part (a) of FIG. 9) where the pack-side seal 105 shields the discharging port 102*a* of the nozzle 102 and an open position (position shown in part (b) of FIG. 9) where the discharging port 102*a* is open. When the pack-side shutter 103 is in the open position, the discharging port 102*a* of the nozzle 102 is exposed from an opening 103*a* provided in the pack-side shutter 103. That is, the pack-side shutter 103 is provided with the opening 103*a* so as to open the discharging port 102*a* when the pack-side shutter 103 is in the open position.

When the pack-side shutter 103 positioned in the shielding position as a first shielding position shown in part (a) of FIG. 9 is rotated about the rotational axis A in an arrow K direction, the pack-side shutter 103 reaches the open position as a first open position shown in part (b) of FIG. 9. On the contrary, when the pack-side shutter 103 positioned in the open position is rotated in an arrow L direction, the pack-side shutter 103 reaches the shielding position. That is, the arrow K direction as a first rotational direction is a direction from the shielding position toward the open position with the rotational axis as a center, and the arrow L direction as a second rotational direction is a direction from the open position toward the shielding position with the rotational axis A as the center.

In a rotating operation of the pack-side shutter 103, the pack-side shutter 103 slides on the side surface 102*c* of the nozzle 102 through the pack-side seal 105.

Next, using part (a) of FIG. 8 to part (b) of FIG. 10, a detailed structure of the nozzle 102 and the pack-side shutter 103 will be described. Part (a) of FIG. 10 is a perspective view showing the portion-to-be-mounted 700 when the pack-side shutter is positioned in the shielding position. Part (b) of FIG. 10 is another perspective view showing the portion-to-be-mounted 700 when the pack-side shutter 103 is in the shielding position.

As shown in part (a) of FIG. 8 to part (b) of FIG. 10, the nozzle 102 includes a portion-to-be-positioned 102*d* including surfaces opposing each other with respect to a circumferential direction about the rotational axis A. The portion-to-be-positioned 102*d* engages with the positioning portion 107*a* (see, part (a) of FIG. 4) of the first frame 107 when the toner pack 100 is mounted on the mounting portion 106. By this, a position of the nozzle 102 relative to the first frame 107 (main body base portion 2) with respect to a rotational direction about the rotational axis A is determined.

With respect to the direction of the rotational axis A, on a side downstream of the portion to be positioned with respect to the mounting direction M, each of a surface 102*e*1 and a surface 102*e*2 is provided. A side surface 102*e*3 is provided between the surface 102*d*1 and the surface 102*d*2 and between the surface 102*e*1 and the surface 102*e*2. The side surface 102*e*3 is recessed inward from the side surface 102*c* with respect to the radial direction r. The portion to be positioned 102*d*, the surface 102*e*1, the surface 102*e*2, and the side surface 102*e*3 form the recessed portion 102*e*.

Further, the pack-side shutter 103 has a side surface 103*d* provided with the opening 103*a*. The side surface 103*d* extends along the rotational axis A. As shown in part (a) of FIG. 10, when the pack-side shutter 103 is positioned in the shielding position, at least a part of the recessed portion 102*e* of the nozzle 102 is exposed from the opening 103. This is because when the toner pack 100 is mounted on the mounting portion 106 in the state in which the pack-side shutter 103 is positioned in the shielding position, the portion-to-be-positioned 102*d* of the recessed portion 102*e* is engaged with the positioning portion 107*a*.

Further, the pack side shutter 103 is provided with a portion 103*e* to which drive is transmitted on a side opposite from the opening 103*a* with respect to the rotational axis A. In the case where the pack side shutter 103 is positioned in the shielding position, the portion 103*e* to which drive is transmitted is provided on a side opposite from the recessed portion 102*e* of the nozzle with respect to the rotational axis A. The portion 103*e* to which drive is transmitted includes a surface 103*b*1, a surface 103*b*2, and a side surface 103*b*3, and is capable of engaging with the drive transmitting portion 108*a*. The side surface 103*b*3 is provided between the surface 103*b*1 and the surface 103*b*2, and is recessed inward from the side surface 103*d* with respect to the radial direction r. Further, at an upstream end portion of the pack side shutter 103 with respect to the mounting direction M, a flange portion 103*i* extended from the side surface 103*d* on an outside of the side surface with respect to the radial direction r, i.e., in a direction spaced from the rotational axis A is provided. The flange portion 103*i* is provided with a cap fixing portion 103*n* as a fixing portion described later.

Next, a projected portion 102*b* of the nozzle 102 will be specifically described. As shown in parts (a) and (b) of FIG. 9, the toner pack 100 is directed to an attitude such that a first end portion side (the pouch 101 side) and a second end portion side (the nozzle 102 side) of the toner pack 100 are positioned so that the second end portion side is below the first end portion side. Or, the toner pack 100 is directed so that at least a part of the nozzle 102 is positioned below the pouch 101 and so that the rotational axis A is parallel to a vertical direction VD. This attitude is an attitude when the toner pack 100 is mounted on the mounting portion 106 of the image forming apparatus 1. At this time, in part (a) of FIG. 9 to part (b) of FIG. 10, the mounting direction M is a downward direction, and a dismounting direction U is an upward direction.

The pack side shutter 103 has an end surface 103*c* which is a lower end portion with respect to the vertical direction VD and constituting a bottom of the pack side shutter. The nozzle 102 includes the projected portion 102*b* projected toward a downstream of the end surface 103*c* of the pack side shutter 103 with respect to the mounting direction M, i.e., projected below the end surface 103*c*. The projected portion 102*b* is a cylindrical portion (portion having a cylindrical shape) about the rotational axis A. The projected portion 102*b* has a projected portion end surface 102*b*2 which is a lower end surface. The projected portion end surface 102*b*2 is provided with a hole defined by an inner peripheral surface 102*b*1 about the rotational axis A. Further, as shown in part (b) of FIG. 8, the projected portion 102*b* is projected downward more than the lower end surface 102*b*2 of the nozzle 102 is. Incidentally, in this embodiment, the end surface 103*c* and the end surface 102*j* of the nozzle 102 are end surfaces perpendicular to the rotational axis A, but the present invention is not limited thereto. These surfaces may only be required to be surfaces extending in a direction crossing the rotational axis A as viewed in a direction perpendicularly to the rotational axis A. Further, the projected portion 102*b* is not necessarily be provided on the nozzle 102.

Here, as shown in FIG. 11, the nozzle 102 of the toner pack 100 is provided with a claw portion 102*f* as a locking mechanism so that the pack-side shutter 103 is not rotated relative to the nozzle 102 when the toner pack 100 is transported or is treated alone by the user. The pack-side shutter 103 is held in the shielding position by the claw portion 102*f*, so that the toner which is the content in the toner pack 100 can be prevented from leaking out to the outside.

FIG. 11 is a perspective view showing the claw portion 102*f* provided on the nozzle 102. Part (a) of FIG. 12 is a front view showing the claw portion 102*f* Part (b) of FIG. 12 is a sectional view showing a 12B-12B cross section of part (a) of FIG. 12. Part (a) of FIG. 13 is a front view showing the claw portion 102*f* Part (b) of FIG. 13 is a sectional view showing a 13B-13B cross section of part (a) of FIG. 13. Part (a) of FIG. 14 is a perspective view showing a state when the toner pack 100 is being mounted on (in) the apparatus-side shutter 109. Incidentally, in part (a) of FIG. 14, the pouch 101 and the pack-side shutter 103 of the toner pack 100 are omitted from illustration, and only the nozzle 102 and the opening member 104 are illustrated. Part (b) of FIG. 14 is a sectional view showing the 13B-13B cross section of part (a) of FIG. 13 in a state in which the mounting of the toner pack 100 on the mounting portion 106 is completed.

The claw portion 102*f* as a second restricting portion includes, as shown in FIG. 11 to part (b) of FIG. 12, an arm portion 102*f*3, an inclined releasing surface 102*f*1, and an abutting portion 102*f*2. The claw portion 102*f*2 is movable in the radial direction r of the phantom circle VC about the rotational axis by elastic deformation of the arm portion 102*f*3. Specifically, the claw portion 102*f* is movable to a restricting position shown in part (b) of FIG. 12 and a non-restricting position which is an inside position than the restricting position with respect to the radial direction r and which is shown in part (b) of FIG. 14.

The abutting portion 102*f*2 opposes a restricting portion 103*h* of the pack side shutter 103 positioned in the shielding position when the claw portion 102*f* is positioned in the restricting position as shown in part (b) of FIG. 12 with respect to the circumferential direction about the rotational axis A. At this time, a gap s is provided between the abutting portion 102*f*2 and the restricting portion 103*h*. Rotation of the pack side shutter 103 in the arrow K direction is restricted by abutment of the restricting portion 103*h* against the abutting portion 102*f*2. Incidentally, a size of the gap s may be set arbitrarily, a rotation range in which the pack side shutter 103 is rotatable within a range of the gap s is regarded as the shielding position. That is, the rotation of the pack side shutter 103 from the shielding position in the arrow K direction is restricted by the claw portion 102*f* positioned in the restricting position.

Further, when the claw portion 102*f* is positioned in the non-restricting position, the abutting portion 102*f*2 is positioned inside the restricting portion 103*h* of the pack-side shutter 103 with respect to the radial direction r of the phantom circle VC about the rotational axis A. For this reason, the pack-side shutter 103 is capable of being rotated about the rotational axis A without interfering with the abutting portion 102*f*2.

As shown in part (a) of FIG. 6 and part (b) of FIG. 14, the apparatus-side shutter 109 is provided with a restriction releasing rib 109*j* extending in the axial direction D1. The restriction releasing rib 109*j* is contactable to the inclined releasing surface 102*f*1 of the claw portion 102*f* when the toner pack 100 is mounted on the mounting portion 106. Incidentally, as shown in part (a) of FIG. 10 and part (b) of FIG. 14, the pack-side shutter 103 is provided with an opening 103*j* extends from the end surface (bottom) 103*c* to the side surface 103*d* of the pack-side shutter 103. The restriction releasing rib 109*j* provided in the apparatus-side shutter 109 penetrates through the opening 103*j* and is capable of contacting the inclined releasing surface 102*f*1 of the claw portion 102*f* disposed inside the pack-side shutter 103.

The inclined releasing surface 102*f*1 is inclined with respect to the mounting direction M (axial direction D1) so as to extend inward in the radial direction r toward a downstream of the mounting direction M. Further, when the toner pack 100 is mounted on the mounting portion 106, the inclined releasing surface 102*f*1 converts a direction of a force received from the restrict releasing rib 109*j* by the claw portion 102*f* into an inward direction with respect to the radial direction r. By this, the claw portion 102*f* is moved inward from the restricting position to the non-restricting position in the radial direction r by pressing the inclined releasing surface 102*f*1 by the restriction releasing rib 109*j*. In other words, when the toner pack 100 is mounted on the mounting portion 106, the claw portion 102*f* is moved from the restricting position to non-restricting position by being pressed by the mounting portion 106.

The above-described abutting portion 102*f*2 of the claw portion 102*f* abuts against the restricting portion 103*h* of the pack-side shutter 103 and thus restricts rotation of the pack-side shutter 103 in the arrow K direction. Next, a constitution in which rotation of the pack-side shutter 103 in the arrow L direction opposite to the arrow K direction will be described.

As shown in part (b) of FIG. 13, the pack side shutter 103 includes a rotation restricting rib 103*k*, and the nozzle 102 includes a rotation restricting surface 102*k* as a first restricting portion opposing the rotation restricting rib 103*k* with respect to the circumferential direction about the rotational axis A. When the pack side shutter 103 is positioned in the shielding position, the rotation restricting rib 103*k* opposes the rotation restricting surface 102*k* with a small gap therebetween. Then, when the pack side shutter positioned in the shielding position is intended to be rotated in the arrow L direction, the rotation restricting rib 103*k* abuts against the rotation restricting surface 102*k*, so that the rotation of the pack side shutter 103 in the arrow L direction is restricted.

As shown in parts (a) and (b) of FIG. 13, the claw portion 102*f* is disposed downstream of the rotation restricting surface 102*k* and the rotation restricting rib 103*k* with respect to the mounting direction M. This is because the claw portion 102*f* is disposed in a position where the claw portion 102*f* is easily pressed by the restriction releasing rib 109*j* of the apparatus-side shutter 109 when the toner pack 100 is mounted on the mounting portion 106. By this, the size of the opening 103*j* provided in the pack-side shutter 103 can be made small, so that it is possible to not only ensure rigidity of the pack-side shutter 103 but also suppress access to the claw portion 102*f* by the user. Incidentally, arrangement of the claw portion 102*f*, the rotation restricting surface 102*k*, and the rotation restricting rib 103*k* is not limited thereto, but may also be arbitrarily changed.

As described above, in a state in which the toner pack 100 is mounted on the mounting portion 106, the rotation of the pack-side shutter 103 in each of the arrow K direction and the arrow L direction is restricted, so that the pack-side shutter 103 is easily held at the shielding position. When the pack-side shutter 103 is rotated in the arrow K direction in a state in which the toner pack 100 is mounted on the mounting portion 106 and in which the claw portion 102*f* is positioned in the non-restricting position, the discharging port 102*a* of the nozzle 102 is exposed as shown in part (b) of FIG. 9.

Further, as shown in part (b) of FIG. 8 and parts (a) and (b) of FIG. 10, the pack-side shutter 103 is provided with three radial direction positioning portions 103*f* These radial direction positioning portions 103*f* project toward an outside from the side surface 103*d* in the radial direction r. Each of the radial direction positioning portions 103*f* is disposed on an upstream side of the pack-side shutter 103 with respect to the mounting direction M.

[Cap]

Next, a cap 120 mounted on the toner pack 100 will be described using parts (a) and (b) of FIG. 8 and part (a) of FIG. 15 to part (c) of FIG. 17. Part (a) of FIG. 15 is a perspective view showing the toner pack 100 in a state in which the cap 120 is mounted on the toner pack 100. Part (b) of FIG. 15 is a perspective view showing a state in which the cap 120 is dismounted from the toner pack 100. Part (a) of FIG. 16 is a front view showing the cap 120. Part (b) of FIG. 16 is a perspective view showing the cap 120. Part (a) of FIG. 17 is a perspective view showing a state in which the cap 120 is mounted on the pack-side shutter 103. Part (b) of FIG. 17 is a perspective view showing a process in which the cap 120 is being dismounted from the pack-side shutter 103. Part (c) of FIG. 17 is a perspective view showing a state in which the cap 120 is dismounted from the toner pack 100. Incidentally, in parts (a) and (b) of FIG. 17, an outer configuration of the cap 120 is indicated by a dotted line.

As shown in parts (a) and (b) of FIG. 8 and part (a) of FIG. 15 to part (b) of FIG. 16, the cap 120 is mounted on the portion-to-be-mounted 700 constituted by the nozzle 102 and the pack-side shutter 103 of the toner pack 100. The cap 120 is mounted on the portion-to-be-mounted 700, and covers at least a part of the portion-to-be-mounted 700. Specifically, a cap main body portion 120U1 described later of the cap 120 surrounds at least a part of the side surface 103*d* as an outer side surface of the pack-side shutter 103. In this embodiment, the cap 120 is mounted on the pack-side shutter 103 by being engaged with a recessed screw portion 103*g* as a container shutter-side screw portion provided on the side surface 103*d* of the pack-side shutter 103.

The cap 120 includes the cap main body portion 120U1 as a main body portion, a fixing tab 120U2 as a fixing portion, and a connecting portion 120U3 connecting the cap main body portion 120U1 and the fixing tab 120U2. In this embodiment, the cap main body portion 120U1 is formed in a cylindrical shape extending in the axial direction of the rotational axis A, but is not limited thereto. That is, the cap main body portion 120U1 may only be constituted in the cylindrical shape extending in the axial direction of the rotational axis A, and may also be constituted in a polygonal cylindrical shape, for example.

The cap main body portion 120U1 includes a cap opening 120*a*, a bottom 120*b*, an inner peripheral surface 120*c*, an annular rib 120*d*, a projected screw portion 120*e*, and a cap outer surface 120*f* The cap opening 120*a* as an opening is provided at one end of the cap main body portion 120U1 with respect to the axial direction D1 of the rotational axis A. The annular rib 120*d* extends from a surface 120*g*, opposite from the bottom 120*b*, toward a downstream side, i.e., upward with respect to the dismounting direction U. The surface 120*g* opposes the end surface 103*c* of the pack side shutter 103 and the projected portion 102*b* of the nozzle 102. The projected screw portion 120*e* as a cap side screw portion is provided on the inner peripheral surface 120*c* extending along the rotational axis A and projects from the inner peripheral surface 120*c* toward the inside in the radial direction r. The projected screw portion 120*e* is capable of engaging with the recessed screw portion 103*g* of the pack side shutter 103 by rotating the cap main body portion 120U1 in the arrow K direction. The projected screw portion 120*e* is engaged with the recessed screw portion 103*g*, so that the cap main body portion 120U1 is mounted on the pack side shutter 103. Incidentally, the inner peripheral surface 120*c* of the cap 120 is constituted so as to surround at least a part of the side surface 103*d* of the pack side shutter 103, and surrounds entirety of the side surface 103*d* in this embodiment.

Here, the case where the accommodating container 800 including the toner pack 100 and the cap 120 is directed so that the rotational axis thereof is parallel to the vertical direction VD and so that the nozzle 102 is positioned below the pouch 101 will be considered. Such an attitude of the accommodating container 800 is similar to an attitude when the toner pack 100 is mounted on the mounting portion 106. At this time, the annular rib 120*d* extends upward from the surface 120*g*. Further, the bottom 120*b* is a surface which is an end surface of the cap 120 with respect to the mounting direction M and which is perpendicular to the rotational axis A, and constitutes the bottom of the accommodating container 800 in the state in which the cap 120 is mounted on the toner pack 100. Further, the bottom 120*b* extends in the horizontal direction when the accommodating container 800 is in the attitude shown in part (a) of FIG. 16. For this reason, the accommodating container 800 is constituted so as to be capable of being self-standing by contact of the bottom 120*b* with an installation surface.

The cap 120 is mounted on the pack side shutter 103 of the portion to be mounted 700 so as to cover the portion to be mounted 700 of the toner pack 100. At this time, the annular rib 120*d* of the cap 120 is provided outside the projected portion 102*b* of the nozzle 102 with respect to the radial direction r and is provided so as to surround the projected portion 102*b*. In other words, the annular rib 120*d* as a projected cap portion is disposed so as not to overlap with the projected portion 102*b* as viewed in the vertical direction (the dismounting direction or the mounting direction M).

For this reason, even when the cap 120 is shocked externally during transportation or the like, the cap 120 is capable of protecting the projected portion 102*b*. A projected portion end surface 102*b*2 of the projected portion 102*b* is, as described later, abutted against a pack contact surface

109*g* (see, part (a) of FIG. 6) of the apparatus side shutter 109 when the toner pack 100 is mounted on the mounting portion 106, and performs positioning of the toner pack 100 with respect to the mounting direction M. Accordingly, the projected portion end surface 102*b*2 is protected by the cap 120, so that positioning accuracy of the toner pack 100 relative to the mounting portion 106 with respect to the mounting direction M can be improved.

Further, as shown in part (b) of FIG. 8 and parts (a) and (b) of FIG. 15, in the state in which the cap 120 is mounted on the toner pack 100, the cap opening 120*a* is disposed downstream of the portion to be positioned 102*d* and the portion 103*e* to which drive is transmitted with respect to the dismounting direction U. That is, the portion to be positioned 102*d* and the portion 103*e* to which drive is transmitted are covered and protected by the cap outer surface 120*f* as an outer surface of the cap 120. Incidentally, the portion to be positioned 102*d* is used for positioning the nozzle 102 relative to the first frame 107 (the main apparatus base portion 2) with respect to the rotational direction about the rotational axis A. The portion 103*e* to which drive is transmitted is used in a rotational operation of the pack side shutter 103 by the operating lever 108 by being engaged with the drive transmitting portion 108*a* of the operating lever 108.

Further, portions of the portion to be mounted 700 of the toner pack 100 other than the recessed screw portion 103*g* are spaced from the inner peripheral surface 120*c* of the cap 120. By this, the respective portions of the portion to be mounted 700 are protected from the shock by the cap 120.

Further, in the state in which the cap 120 is mounted on the portion to be mounted 700 of the toner pack 100, even when the toner leaks out through the discharging port 102*a* of the nozzle 102, the cap 120 receives the leaked toner. For this reason, the user is capable of reducing a degree of deposition of the toner on user's hand(s) or the like without touching the leaked toner. Incidentally, in the case where the content accommodated in the toner pack 100 is a liquid, the toner leaked out onto the cap 120 is dried on the cap 120 with a lapse of time. By this, it is possible to reduce a degree of deposition of the content on the user's hand(s) or the like.

The fixing tab 120U2 of the cap 120 is connected to the cap opening 120*a* of the cap main body portion 120U1 through the connecting portion 120U3. In a state in which the cap 120 is not dismounted once from the portion-to-be-mounted 700 and the toner pack 100 is unused, the fixing tab 120U2 is fixed to the cap fixing portion 103*n* provided on the flange portion 103*i* of the pack-side shutter 103. That is, the fixing tab 120U2 is fixed only to a part of the flange 103*i* with respect to the circumferential direction of the phantom circle VC about the rotational axis A. Specifically, as shown in FIG. 26, as viewed in the direction of the rotational axis A, the fixing tab 120U2 is provided within a region AR3 of 90 degrees in circumferential angle about the phantom circle VC about the rotational axis A. Incidentally, the region of the fixing tab 120U2 is not limited to the region AR3, but the fixing tab 120U2 may be provided within a region of which angle of circumference about the rotational axis is, for example, 60 degrees, 120 degrees, or 180 degrees.

As shown in part (a) of FIG. 17, the projected screw portion 120*e* of the cap 120 engages (threadably engages) with the recessed screw portion 103*g* of the pack-side shutter 103. The cap fixing portion 103*n* includes, as shown in part (a) of FIG. 10, a flat surface portion 103*n*1 and two projected portions 103*n*2 and 103*n*3 which project from the flat surface portion 103*n*1 in the mounting direction M along the rotational axis A. The projected portions 103*n*2 and

103$n$3 as second engaging portions are provided side by side with a spacing with respect to the circumferential direction of the phantom circle VC about the rotational axis A. The flat surface portion 103$n$1 extends along a flat surface perpendicular to the rotational axis A.

The fixing tab 120U2 includes, as shown in part (b) of FIG. 12, a flat surface portion 120U2$a$ as an adhesive surface extending along a flat surface perpendicular to the rotational axis A and includes two holes 120U2$b$ and 120U2$c$ provided in the flat surface portion 120U21. The hole 120U2$b$ and 120U2$c$ as first engaging portions extend along the rotational axis A and may be through holes or bottomed holes each provided with a bottom at a lower end portion with respect to the mounting direction M. In the holes 120U2$b$ and 120U2$c$, the projected portions 103$n$2 and 103$n$3 of the cap fixing portion 103 and engageable, respectively. Further, the fixing tab 120U2 is connected to the cap main body portion 120U1 through the connecting portion 120U3, so that the cap 120 is fixed to the pack side shutter 103 so as not to move relative to the pack side shutter 103. A fixing method of the fixing tab 120U2 to the cap fixing portion 103$n$ will be described later.

When the cap 120 is dismounted from the toner pack 100, as shown in part (b) of FIG. 17, the user rotates the cap 120, mounted on the toner pack 100, in the arrow L direction. By this, the cap 120 is guided by the recessed screw portion 103$g$ and the projected screw portion 120$e$, and thus is moved toward a downstream side of the axial direction D1, specifically the mounting direction M relative to the portion-to-be-mounted 700.

Then, when the cap 120 means toward the downstream side of the mounting direction M, the connecting portion 120U3 connecting the fixing tab 120U2 and the cap main body portion 120U1 is broken. The breakage of the connecting portion 120U3 is made in a state in which the fixing tab 120U2 is fixed to the cap fixing portion 103$n$, whereby the cap main body portion 120U1 is separated from the fixing tab 120U2.

Then, as shown in part (c) of FIG. 17, the cap main body portion 120U1 is further rotated in the arrow L direction, and thus engagement between the recessed screw portion 103$g$ and the projected screw portion 120$e$ is eliminated, so that the cap main body portion 102U1 is dismounted from the portion-to-be-mounted 700 of the toner pack 100. At this time, even when the pack-side shutter 103 is rotated together with the cap 120 in the along L direction friction between the recessed screw portion 103$g$ and the projected screw portion 120$e$, the rotation restricting rib 103$k$ and the rotation restricting surface 102$k$ abut against each other (see, part (b) of FIG. 13). By this, the rotation of the pack-side shutter 103 in the arrow L direction is restricted, so that relative to the pack-side shutter 103 at rest, only the cap main body portion 120U1 can be rotated in the along L direction.

[Mounting of Toner Pack on Mounting Portion]

Next, using part (a) of FIG. 18 to part (b) of FIG. 20, a state when the toner pack 100 is mounted on the mounting portion 106 will be described. Part (a) and (b) of FIG. 18 are perspective views each showing a state in which the toner pack 100 is being mounted onto the mounting portion 106 as viewed in a different angle. Part (a) of FIG. 19 is a sectional view showing a state in which the toner pack 100 is being mounted onto the mounting portion 106. Part (b) of FIG. 19 is a sectional view showing a state in which mounting of the toner pack 100 on the mounting portion 106 is completed.

Part (a) of FIG. 20 is a sectional view showing a 20A-20A cross section of part (a) of FIG. 19. Part (b) of FIG. 20 is a sectional view showing a 20B-20B cross section of part (a) of FIG. 19. Incidentally, for ease of view, in part (a) of FIG. 19 to part (b) of FIG. 20, cut surfaces of the pack-side shutter 103 and the cover 110 are hatched.

When the toner pack 100 is mounted on the mounting portion 106, first, the user dismounts the cap main body portion 120U1 from the portion-to-be-mounted 700 of the toner pack 100 in the above-described procedure. By this, the portion 103$e$ to which drive is transmitted, the projected portion 102$b$, and the portion-to-be-positioned 120$d$ of the portion-to-be-mounted 700 (see, parts (a) and (b) of FIG. 10) are exposed. The portion-to-be-mounted 700 of the toner pack 100 is mountable on the mounting portion 106 of the image forming apparatus 1 in a state in which the cap main body portion 120U1 is dismounted. Incidentally, the cap main body portion 120U1 can be mounted again on the portion-to-be-mounted 700 of the toner pack 100.

Then, the user mounts, as shown in parts (a) and (b) of FIG. 18, the toner pack 100 onto the mounting portion 106 being in a state in which the apparatus-side shutter 109 is positioned in the shielding position, by moving the toner pack 100, being in a state in which the pack-side shutter 103 is positioned in the shielding position, in the mounting direction M. At this time, the user positionally aligns the recessed portion 102$e$ of the nozzle 102 and the opening 103$a$ of the pack-side shutter 103 with the positioning portion 107$a$ of the first frame 107. At the same time, the user also aligns the portion 103$e$, to which drive is transmitted, of the pack-side shutter 103 with the drive transmitting portion 108$a$ of the operating lever 108.

After such positional alignment of the toner pack 100 with the mounting portion 106, the user gradually mounts the toner pack 100 onto the mounting portion 106 by moving the toner pack 100 in the mounting direction M. Then, as shown in part (b) of FIG. 19, with the inner peripheral surface 102$b$1 of the projected portion 102$b$ of the nozzle 102, a small-diameter portion 109$d$2 of the center boss 109$d$ of the apparatus-side shutter is engaged. By this, a position of the nozzle 102 relative to the apparatus-side shutter 109 with respect to the radial direction r is determined.

At this time, the drive transmitting portion 109$a$ of the operating lever 108 and the portion 103$e$ to which drive is transmitted of the pack-side shutter 103 engage with each other as shown in part (a) of FIG. 20. At the same time, as shown in part (b) of FIG. 20, the side surfaces 110$f$ and 110$g$ of the cover 110 come close to or engage with the surfaces 102$e$1 and 102$e$2, respectively, forming the recessed portion 102$e$ of the nozzle 102. Further, as shown in parts (a) and (b) of FIG. 20, the portion 103$e$, to which the drive is transmitted, of the pack-side shutter 103 engages with the portion 109$b$, to which the drive is transmitted, of the apparatus-side shutter 109 and the drive transmitting portion 108$a$ of the operating lever 108. By this, the rotational axis A of the pack-side shutter 103 and the rotational axis B of the apparatus-side shutter 109 are substantially coaxial with each other.

Further, the surfaces 102$e$1 and 102$e$2 of the recessed portion 102$e$ of the nozzle 102 engage with the surfaces 110$f$ and 110$g$, respectively, of the cover 110, so that the nozzle 102 of the toner pack 100 does not rotate relative to the main body base portion 2 including the cover 110. In other words, when the toner pack 100 is mounted on the image forming apparatus 1, the recessed portion 102$e$ engages with the cover 110, and thus restricts rotation of the nozzle 102 relative to the image forming apparatus 1. Then, the operating lever 108, the pack-side shutter 103, and the apparatus-side shutter 109 are rotatable relative to the main body base portion 2 and the nozzle 102 substantially integral about the rotational axis B.

Specifically, when the operating lever 108 is rotated, the drive transmitting portion 108*a* presses the surface 103*b*1 or 103*b*2 of the pack-side shutter 103, so that the pack-side shutter 103 is rotated. Thereafter, the surface 103*b*1 or 103*b*2 constituting the portion 103*e* to which drive is transmitted of the pack-side shutter presses the portion 109*e* to which drive is transmitted of the apparatus-side shutter 109, so that the apparatus-side shutter 109 is rotated.

In a state in which the mounting of the toner pack 100 on the mounting portion 106 is completed, the three radial direction positioning portions 103*f* (see, part (b) of FIG. 8 and parts (a) and (b) of FIG. 10) of the pack-side shutter 103 contact the inner peripheral surface 109*h* (see, part (a) of FIG. 6) of the apparatus-side shutter 109. By this, a position, with respect to the radial direction r, of the toner pack 100 on an upstream side of the mounting direction M is determined.

Further, as shown in part (b) of FIG. 19, the projected portion end surface 102*b*2 of the projected portion 102*b* of the nozzle 102 abuts against the pack contact surface 109, so that a position of the toner pack 100 with respect to the mounting direction M is determined. Incidentally, as regards the positioning of the projected portion 102*b* of the nozzle 102, a constitution in which the outer peripheral surface of the projected portion 102*b* is engaged with the cylindrical portion 110*j* (see, parts (a) and (b) of FIG. 7) may be employed.

Further, the portion-to-be-positioned 102*d* provided on the nozzle 102 engages with the positioning portion 107*a* of the first frame 107. By this, rotation of the nozzle 102 of the toner pack 100 relative to the first frame 107 (main assembly base portion 2) is restricted.

Further, as shown in parts (a) and (b) of FIG. 14, when the toner pack 100 is mounted on the mounting portion 106, as described above, the claw portion 102*f* provided on the nozzle 102 is moved from the restricting position to the non-restricting position (position shown in part (b) of FIG. 14). Specifically, the claw portion 102*f* is moved inward from the restricting position toward the non-restricting position with respect to the radial direction r by pressing of the inclined releasing surface 102*f*1 by the restriction releasing rib 109*j*. By this, rotation restriction of the pack-side shutter 103 in the arrow K direction is released.

[Operation of Operating Lever]

Parts (a) of FIG. 21 is a perspective view showing the operating lever 108 positioned in the closed position and the toner pack 100. Part (b) of FIG. 21 is a perspective view showing the operating lever 108 positioned on the open position and the toner pack 100. Part (a) of FIG. 22 is a sectional view showing a 22AB 22AB cross section of part (b) of FIG. 19 when both the apparatus side shutter 109 and the pack side shutter 103 are positioned in the shielding positions. Part (b) of FIG. 22 is a sectional view showing the 22AB 22AB cross section of part (b) of FIG. 19 when both the apparatus side shutter 109 and the pack side shutter 103 are positioned in the open positions.

As described above, in the state in which the toner pack 100 is mounted on the mounting portion 106, the operating lever 108, the pack-side shutter 103, and the apparatus-side shutter 109 are integrally rotatable about the rotational axis B relative to the main assembly base portion 2 and the nozzle 102. In a state in which the toner pack 100 is mounted on the mounting portion 106 and in which the operating lever 108 is positioned in the closed position, as shown in part (a) of FIG. 22, the discharging port 102*a* is shielded by the pack-side shutter 103, the peak-side seal 105, and the apparatus-side shutter 109. For this reason, the toner in the pouch 101 is constituted so that the toner cannot reach the apparatus-side opening 117*a* of the second frame 117.

As shown in parts (a) and (b) of FIG. 21, when the operating lever 108 is rotated from the closed position to the open position in an arrow Q direction in the state in which the toner pack 100 is mounted on the mounting portion 106, the pack-side shutter 103 and the apparatus-side shutter 109 are rotated from the shielding positions to the open positions.

Specifically, the drive transmitting portion 108*a* presses the surface 103*b*1 of the pack-side shutter 103. By this, the pack-side shutter 103 is rotated together with the operating lever 108 from the shielding position to the open position. In other words, the pack-side shutter 103 is rotated from the shielding position to the open position in interrelation with the rotation of the operating lever 108 through engagement between the drive transmitting portion 108*a* and the surface 103*b*1. Further, the surface 103*b* of the pack-side shutter 103 rotated from the shielding position to the open position presses, the portion 109*e*, to which the drive is transmitted, of the apparatus-side shutter 109. By this, the apparatus-side shutter 109 is rotated together with the pack-side shutter 103 from the shielding position to the open position. In other words, the apparatus-side shutter 109 is rotated from the shielding position to the open position in interrelation with the rotation of the operating lever 108 through engagement between the surface 103*b*2 and the portion 109*e* to which drive is transmitted.

Then, as shown in part (b) of FIG. 22, the discharging port 102*a* of the nozzle 102 is opened by movement of the pack-side shutter 103, the pack-side seal 105, and the apparatus-side shutter 109. That is, the pouch 101 of the toner pack 100 and the toner accommodating portion 36 communicate with each other through the discharging port 102*a*, the receiving port 109*a*, and the apparatus-side opening 117*a*. The toner in the pouch 101 is supplied together with the air to the toner accommodating portion 36 of the developing container 32 through the discharging port 102*a*, the receiving port 109*a*, and the apparatus-side opening 117*a* by compression of the pouch 101 by the user.

The user rotates the operating lever 108 from the open position to the closed position when the supply of the toner from the toner pack 100 to the developing container 32 is completed. When the operating lever 108 is rotated from the open position to the closed position, the drive transmitting portion 108*a* of the operating lever 108 presses the surface 103*b*2 of the pack-side shutter 103. By this, the pack-side shutter 103 is rotated together with the operating lever 108 from the open position to the shielding position. Further, the portion 103*b*1 of the pack-side shutter 103 rotated from the open position to the shielding position presses, the portion 109*e*, to which the drive is transmitted, of the apparatus-side shutter 109. By this, the apparatus-side shutter 109 is rotated together with the pack-side shutter 103 from the open position to the shielding position.

In this state, by pulling out the toner pack 100 from the mounting portion 106, a supplying operation of the toner is completed. On the toner pack 100 after the supplying operation is completed, the user may mount the cap main body portion 120U1 or may separately dispose of the cap main body portion 120U1 and the toner pack 100.

[Detailed Structure of Connecting Portion and Fixing Tab]

Next, using FIG. 23 to part (b) of FIG. 27, detailed structures of the connecting portion 120U3 and the fixing tab 120U2 will be described. FIG. 23 is a schematic view of the toner pack 100 as viewed in the dismounting direction U. Part (a) of FIG. 24 is a front view showing the cap 120. Part (b) of FIG. 24 is an enlarged view showing a region enclosed by a chain line in part (a) of FIG. 24. Part (a) of FIG. 25 is a sectional view showing a 25A-25A cross section of part (b) of FIG. 24. Part (b) of FIG. 25 is a sectional view showing a 25B-25B cross section of part (b) of FIG. 24. Part (c) of FIG. 25 is a schematic view showing an area of the flat surface portion 120U2*a*. FIG. 26 is a schematic view showing a positional relationship between the extended portion 104*b* of the opening member 104 and the fixing tab 120U2. Part (a) of FIG. 27 is a bottom view of the toner pack 100, showing a positional relationship between the fixing tab 120U2 and the opening 103*a* of the pack-side shutter 103. Part (b) of FIG. 27 is a bottom view of a toner pack 100 according to a modified embodiment.

As shown in FIG. 23, the fixing tab 120U2 is disposed in a position spaced from the rotational axis A more than the cap outer surface 120*f* of the cap main body portion U1 with respect to the radial direction r. Further, the fixing tab 120U2 is adhesively bonded and fixed to the cap fixing portion 103*n* provided on the flange portion 103*i* of the pack-side shutter 103. At this time, in the holes 120U2*b* and 120U2*c* of the fixing tab 120U2, the projected portions 103*n*2 and 103*n*3 of the cap fixing portion 103*n* and engaged, respectively. Further, the flat surface portion 120U2 of the fixing tab 120U2 adhesively bonded to the flat surface portion 103*n*1 of the cap fixing portion 103*n*. Incidentally, a positional relationship of the holes 102U2*b* and 102*u*2*c* with the projected portions 103*n*2 and 103*n*3 may be reversed, and the numbers, sizes, and shapes of these holes and projected portions are not limited to those described above. Here, the fixing tab 120U2 may preferably be fixed with strength such that the fixing tab 120U2 is not readily peeled off from the cap fixing portion 103*n*. Further, the fixing tab 120U2 may desirably have fixing strength stronger than the strength of the material of the cap 120.

That is, when the cap main body portion 120U1 is dismounted from the toner pack 100, it is desirable that the cap main body portion 120U1 and the fixing tab 120U2 are separated from each other earlier than elimination of the fixing between the fixing tab 120U2 and the cap fixing portion 103*n*. For that reason, in this embodiment, as shown in parts (a) and (b) of FIG. 24, the connecting portions 120U3 constituted so as to be broken earlier than the elimination of the fixing between the fixing tab 120U2 and the cap fixing portion 103*n* are provided. In this embodiment, three connecting portions 120U3 are provided, but one connecting portion 120U3, two connecting portions 120U3, or four or more connecting portions 120U3 may be provided.

The three connecting portions 102U3 are constituted substantially in the same shape and are disposed in positions different from each other with respect to the circumferential direction about the rotational axis A. Each of the three connecting portions 120U3 is a cylindrical rib which extends along the rotational axis A and which connects the cap main body portion 120U1 and the fixing tab 120U2. Further, in a cross section perpendicular to the rotational axis A, a cross-sectional area of each of the connecting portions 120U3 is made smaller than a cross-sectional area of the fixing tab 120U2. Incidentally, a total cross-sectional area of the three connecting portions 120U3 is also made smaller than the cross-sectional area of the fixing tab 120U2. In part (c) of FIG. 25, an area S3 of the flat surface portion 120U2*a* which does not include the holes 120U2*b* and 120U2*c* corresponds to the cross-sectional area of the fixing tab 120U2. This area S3 is larger than a first area S1 and a second area S2 which are described later.

Further, each of the connecting portions 120U3 has a shape such that the cross-sectional area thereof is not uniform between the cap main body portion 120U1 and the fixing tab 120U2 and changes intermittently. For example, as shown in part (b) of FIG. 24 and parts (a) and (b) of FIG. 25, the cross-sectional area of the connecting portion 120U3 in the 25A-25A cross section as a first cross section is referred to as the first area S1. Further, the cross-sectional area of the connecting portion 120U3 in the 25B-25B as a second cross section is referred to as the second area S2. In this case, the second area S2 is smaller than the first area S1. Incidentally, in the axial direction D1 of the rotational axis A, a part of the connecting portion 120U3 having the first area S1 is longer than a part of the connecting portion 120U3 having the second area S2. The 25A-25A cross section and the 25B-25B cross section are perpendicular to the rotational axis A. The 25B-25B cross section is positioned in a position different from the position of the 25A-25A cross section, and specifically is positioned in the position closer to the cap main body portion 120U1 than the 25A-25A cross section is. Thus, the cross section of the connecting portion 120U3 in this embodiment is large on a side close to the fixing tab 120U2 and is small on a side close to the cap main body portion 120U1.

Further, the connecting portion 120U3 includes an upstream corner portion T1 and a downstream corner portion T2 with respect to the arrow L direction in an end portion on a side where the connecting portion 120U3 is connected to the fixing tab 120U2. The corner portion T1 is smoothly connected to the fixing tab 120U2 at curvature smaller than curvature of the corner portion T2. That is, the corner portion T1 is connected to the fixing tab 120U2 in an area larger than the corner portion T2 is.

Thus, the cross-sectional area of the connecting portion 120U3 becomes small on the side close to the cap main body portion 120U1, and therefore, the connecting portion 120 U3 is easily broken on the side closer to the cap main body portion 120U1. Further, the corner portion T1 is formed at the curvature smaller than the curvature of the corner portion T2, and therefore, when the cap main body portion 120U1 is rotated in the arrow L direction, the corner portion T2 is bent easier than the corner portion T1, and the corner portion T1 is stronger in bending stress than the corner portion T2. For this reason, a part of the connecting portion 120U3 close to the cap main body portion 120U1 is broken before a part of the connecting portion 120U3 which includes the corner portions T1 and T2 connected to the fixing tab 120U2 and which is close to the fixing tab 120U2. For this reason, a residue of the connecting portion 120U3 remaining on the cap main body portion 120U1 side after the breaking can be made small in amount, so that when the user takes charge of the removed cap main body portion 120U1, the residue is not readily caught, and thus usability can be improved.

Incidentally, in this embodiment, a constitution in which the cross-sectional area of the connecting portion 120U3 is made large on the side close to the fixing tab 120U2 and is made small on the side close to the cap main body portion 120U1 was employed, but the present invention is not limited thereto. The connecting portion 120U3 may preferably be provided with a part, at any place between the cap main body portion 120U1 and the fixing tab 120U2, where the cross-sectional area thereof is small so as to be easily broken.

Further, in this embodiment, as materials of the cap 120 and the pack-side shutter 103, a polypropylene resin material is used. The fixing tab 120U2 and the cap fixing portion 103*n* are adhesively bonded to each other in such a manner that a primer principally comprising hexane and an amine compound is applied onto their flat surface portions 120U2*a* and the 103*n*1 and then an instant adhesive of a cyanoacrylate type is applied onto the flat surface portions. Adhesive strength between the fixing tab 120U2 and the cap fixing portion 103*n* bonded to each other in such a manner is higher than strength of the connecting portion 120U3. Thus, the flat surface portions 120U2*a* and 103*n*1 are adhesively bonded to each other, and therefore, movement of the fixing tab 120U2 relative to the pack-side shutter 103 in the axial direction D1 of the rotational axis A is restricted. Further, in the holes 120U2*b* and 120U2*c*, the projected portions 103*n*2 and 103*n*3 are engaged, respectively, and therefore, movement of the fixing tab 120U2 relative to the pack-side shutter 103 in the rotational direction of the cap main body portion 120U1 is restricted. That is, the fixing tab 120U2 is fixed to the portion-to-be-mounted 700 so as to restrict the movement of the cap main body portion 120U1 relative to the portion-to-be-mounted 700 including the pack-side shutter 103 in both of the axial direction D1 and the rotational direction of the cap main body portion 120U1.

For this reason, when the cap main body portion 120U1 of the cap 120 is dismounted from the toner pack 100, the connecting portions 120U3 are broken without eliminating the adhesive bonding between the fixing tab 120U2 and the cap fixing portion 103*n*. By this, the cap main body portion 120U1 is separated from the fixing tab 120U2, so that the cap main body portion 120U1 can be dismounted from the toner pack 100.

Thus, the cap 120 of which connecting portions 120U3 are broken can be discriminated from an outer appearance thereof as that the cap 120 has already been used (up), so that it is possible to reduce an opportunity to supply the toner with use of the toner pack 100 used up. By this, toner supply efficiency can be improved.

Next, using FIG. 26, a positional relationship between the extended portion 104*b* of the opening member 104 and the fixing tab 120U2 will be described. FIG. 26 is a schematic view of the toner pack 100 and the cap 120 as viewed in the dismounting direction U (the axial direction D1). In FIG. 26, an outer configuration of the opening member 104 is indicated by a broken line.

As shown in FIG. 26, in the case where the fixing tab 120U2 is viewed in the axial direction D1, at least a part thereof is disposed so as to overlap with the extended portion 104*b* of the opening member 104. The extended portion 104*b* is projected outward in the radial direction r than the cap outer surface 120*f* is.

When the cap main body portion 120U1 is dismounted from the toner pack 100, the user applies a force, for rotating the cap main body portion 120U1, to the cap main body portion 120U1. At this time, the user is easy to exert the force on the cap main body portion 120U1 by gripping the extended portion 104*b* with user's hand opposite to the other hand used for rotating the cap main body portion 120U1. That is, the extended portion 104*b* functions as a non slip portion so that the user's hand does not slip with respect to the rotational direction about the rotational axis A, so that an operating property can be improved.

The extended portion 104*b* and the fixing tab 120U2 fixing the cap 120 to the toner pack 100 with respect to the rotational direction are disposed in positions which overlap with each other as viewed in the axial direction D1, and therefore, the user can easily observe states of the fixing tab 120U2 and the connecting portion 120U3. For this reason, the user is capable of easily discriminating whether the toner pack 100 is not used or used (up), so that usability can be improved.

Next, using part (a) of FIG. 10, FIG. 26, and part (a) of FIG. 27, a positional relationship between the fixing tab 120U2 and the opening 103*a* of the pack-side shutter 103 will be described. Parts (a) and (b) of FIG. 27 are schematic views of the toner pack 100 as viewed in the dismounting direction U (see, part (b) of FIG. 15) along the rotational axis A.

As shown in part (a) of FIG. 10 and part (a) of FIG. 27, the fixing tab 120U2 and the cap fixing portion 103*n* are provided in the same phase as the phase of the opening 103*a* with respect to the circumferential direction of the phantom circle VC about the rotational axis A. The cap fixing portion 103*n* may be provided in another place of the flange portion 103*i*, but in the position in this embodiment where the cap fixing portion 103*n* is provided in the same phase as the phase of the opening 103*a*, the cap fixing portion 103*n* can be easily disposed, so that the pack-side shutter 103 can be easily manufactured. Further, as in the modified embodiment shown in part (b) of FIG. 27, the fixing tab 120U2 and the cap fixing portion 103*n* may also be provided in the same phase as a phase of the portion 103*e* to which drive is transmitted, formed in the recessed shape.

Further, as shown in part (a) of FIG. 10 and part (a) of FIG. 27, with respect to the circumferential direction of a phantom circle about the rotational axis A as viewed in the direction (the axial direction D1) of the rotational axis A, a rectilinear line passing through one-side edge 103*a*1 of the opening 103*a* and the rotational axis A is referred to as a first rectilinear line W1. Further, a rectilinear line passing through the other-side edge 103*a*2 of the opening 103*a* and the rotational axis A is referred to as a second rectilinear line W2. At this time, as viewed in the direction (the axial direction D1) of the rotational axis A, the fixing tab 120U2 and the cap fixing portion 103*n* are disposed in a region AR1, containing the opening 103*a*, between the first rectilinear line W1 and the second rectilinear line W2. Incidentally, the edges 103*a*1 and 103*a*2 through which the first rectilinear line W1 and the second rectilinear line W2 pass, respectively, are connecting portions to the flange portion 103*i*, and are positioned at an upstream end portion of the side surface 103*d* of the pack-side shutter 103 with respect to the mounting direction M. In the case of a modified embodiment shown in part (b) of FIG. 27, as viewed in the direction of the rotational axis A, the fixing tab 120U2 and the cap fixing portion 103*n* are disposed in a region AR2, opposite from the region arrow 1 containing the opening 103*a*, between the first rectilinear line W1 and the second rectilinear line W2.

As described above, according to this embodiment, it is possible to provide one form of the accommodating container 800 mountable on the image forming apparatus 1. Especially, when the cap 120 is dismounted from the toner pack 100, the cap main body portion 120U1 is separated from the fixing tab 120U2, and thus the user easily discriminates whether the toner pack is not used or used (up), so that the usability can be improved. Further, the cap 120 is mounted on the portion-to-be-mounted 700 of the toner pack 100, so that the portion-to-be-mounted 700 can be protected. Particularly, the cap 120 is capable of protecting the portion 103*e* to which drive is transmitted, the projected portion 120*b*, and the portion-to-be-positioned 102*d*. The portion 103*e* to which drive is transmitted, the projected portion 102*b*, and the portion-to-be-positioned 120*d* are used for positioning of the toner pack 100 (the nozzle 102) relative to the mounting portion 106 and for the rotational operation of the pack-side shutter 103 by the operating lever 108. For this reason, the portion 103*e* to which drive is transmitted, the projected portion 102*b*, and the portion-to-be-positioned 102*d* are prevented from being broken by an external shock (impact), or the like before the toner supply, so that the toner supply from the toner pack 100 toward the developing container 32 can be appropriately performed.

Second Embodiment

Next, although a second embodiment of the present invention will be described, in the second embodiment, the constitution of the filter portion 140 in the first embodiment is changed. For this reason, constituent elements similar to those in the first embodiment will be omitted from illustration or will be described by adding the same reference numerals or symbols to the figures.

Part (a) of FIG. 28 is a perspective view showing a portion-to-be-mounted 1700 of a toner pack 1100 according to a second embodiment. Part (b) of FIG. 26 is a schematic view in which the portion-to-be-mounted 1700 is viewed in the dismounting direction U (see, part (a) of FIG. 28). Part (a) of FIG. 29 is a perspective view showing a cap fixing portion 303*n*. Part (b) of FIG. 29 is a sectional view of a 28B-28B cross section of part (a) of FIG. 29. FIG. 30 is a schematic view of the toner pack 1100 as viewed in the dismounting direction U in a state in which the cap 120 is mounted on the toner pack 1100.

As shown in parts (a) and (b) of FIG. 28, the portion-to-be-mounted 1700 of the toner pack 1100 according to the second embodiment includes the nozzle 102 and a pack-side shutter 303. The pack-side shutter 303 has the same constitution as the pack-side shutter 103 in the first embodiment except for the cap fixing portion 303*n* described later. The pack-side shutter 303 includes the flange 103*i*, and on a surface 103*p* of the flange portion 130*i*, the cap fixing portion 303*n* is provided. The surface 103*p* extends along a direction perpendicular to the mounting direction M of the toner pack 1100, i.e., along the radial direction r.

The cap fixing portion 303*n* includes a flat surface portion 303*n*1 and two projected portions 103*n*2 and 103*n*3 projected from the flat surface portion 303*n*1 toward the mounting direction M along the rotational axis A. Each of the projected portions 103*n*2 and 103*n*3 is a boss formed in a substantially cylindrical shape.

The flat surface portion 303*n*1 is provided in a position recessed from the surface 103*p* of the flange portion 103 in the dismounting direction U. By this, as shown in part (b) of FIG. 29 and FIG. 30, in a state in which the fixing tab 120U2 of the cap 120 is fixed to the cap fixing portion 303*n*, the fixing tab 120U2 is accommodated in the cap fixing portion 303*n*. That is, the fixing tab 120U2 is positioned downstream of the surface 103*p* of the flange portion 103*i* with respect to the dismounting direction U.

Incidentally, in a state in which the portion-to-be-mounted 1700 of the toner pack 1100 is mounted on the mounting portion 106, as shown in part (b) of FIG. 9, the projected portion end surface 102*b*2 of the nozzle 102 abuts against the pack contact surface 109*g* of the pack-side shutter 109. By this, a position of the toner pack 1100 with respect to the mounting direction M is determined. For this reason, before the projected portion end surface 102*b*2 abuts against the pack contact surface 109*g*, the fixing tab 120U2 in a state in which the surface 103*p* of the flange portion 103*i* and the connecting portions 120U3 are broken is required not to contact an upper surface of the operating lever 108.

In this embodiment, as described above, not only the flat surface portion 303*n*1 is provided so discriminates to be recessed from the surface 103*p* in the dismounting direction U, but also the fixing tab 120U2 is disposed downstream of the surface 103*p* of the flange portion 103*i* with respect to the dismounting direction U. For this reason, when the portion to be mounted 1700 of the toner pack 1100 is mounted on the mounting portion 106, the fixing tab 120U2 fixed to the flange portion 103*i* does not contact the upper surface of the operating lever 108, so that positioning of the toner pack 1100 with respect to the mounting direction M can be performed with accuracy. Therefore, it is possible to suppress, scattering of the toner caused due to that the toner pack 1100 is not appropriately mounted on the mounting portion 106.

As shown in part (a) of FIG. 29, the flat surface portion 303*n*1 of the cap fixing portion 303*n* is provided with a groove portion 500 and a storing portion 506 capable of storing an adhesive. The groove portion 500 includes a first groove portion 501, a second groove portion 502, a third groove portion 503, a fourth fixing portion 504 and a fifth groove portion 505, and these groove portions are provided so as to positioned downstream of and recessed from the flat surface portion 303*n*1 with respect to the dismounting direction U.

Similarly as in the case of the groove portion 500, the storing portion 506 is also provided so as to be positioned downstream of and recessed from the flat surface portion 303*n*1 with respect to the dismounting direction U. The storing portion 506 is provided at one end portion of the flat surface portion 303*n*1 with respect to the circumferential direction CD about the rotational axis A (see, part (a) of FIG. 28) and extends in the radial direction r of the phantom circle VC (see, part (b) of FIG. 8) about the rotational axis A.

The second groove portion 502 is formed in a circular shape along the outer peripheral surface of the projected portion 103*n*2, and the fourth groove portion 504 is formed in a circular shape along the outer peripheral surface of the projected portion 103*n*3. The first groove portion 501 extends along the circumferential direction CD over from an end portion 507 of the cap fixing portion 303*n*, opposite from the storing portion 506 with respect to the circumferential direction CD, to the second groove portion 502. The third groove portion 503 extends along the circumferential direction CD so as to connect the second groove portion 502 and the third groove portion 503. The fifth groove portion 505 extends along the circumferential direction CD so as to connect the fourth groove portion 504 and the storing portion 506. Thus, the first groove portion 501, the second groove portion 502, the third groove portion 503, the fourth groove portion 504, and the fifth groove portion 505 of the groove portion 500, and the storing portion 506 are formed continuously. Further, the groove portion 500 is formed over a full length of the flat surface portion 303*n*1 with respect to the circumferential direction CD.

[Assembling of Cap]

Next, a procedure of assembling the cap 120 onto the toner pack 1100 will be described. When the cap 120 is assembled onto the toner pack 1100 in a fresh (new) state, i.e., in a state in which the connecting portions 120U3 are not broken, an operator (user) rotates the cap 120 in the arrow K direction (see, part (a) of FIG. 17) in a state in which the cap 120 is mounted on the toner pack 1100. By this, the projected screw portion 120*e* of the cap 120 engages with the recessed screw portion 103*g* of the pack-side shutter 103.

In this state, the operator fixes the fixing tab 120U2 of the cap 120 to the cap fixing portion 303*n* as shown in parts (a) and (b) of FIG. 29 and FIG. 30. Specifically, the operator first applies, onto the flat surface portions 1200U2 and 303*n*1, a primer principally comprising hexane and an amine compound. The primer is applied for improving an adhesive property between the flat surface portions 120U2 and 303*n*1. Incidentally, the primer may be applied before the cap 120 is mounted on the toner pack 1100 or before the projected screw portion 120*e* is engaged with the recessed screw portion 103*g*. Further, the primer may also be applied over an entire region of a bonding portion between the fixing tab 120U2 and the cap fixing portion 303*n*, including, for example, the projected portions 103*n*2 and 103*n*3 and the holes 120U2*b* and 120U2*c* without limiting the bonding portion to the flat surface portions 120U2*a* and 303*n*1.

Next, the operator engages the projected portions 103*n*2 and 103*n*3 of the cap fixing portion 303*n* with the holes 120U2*b* and 120U2*c* of the fixing tab 120U2, respectively. Further, at this time, the flat surface portion 120U2*a* of the fixing tab 120U2 contacts the flat surface portion 303*n*1 of the cap fixing portion 303*n*. Further, as shown in FIG. 30, a projection area of the fixing tab 120U2 as viewed in the dismounting direction U is smaller than an area of the flat surface portion 303*n*1 of the cap fixing portion 303*n*. For this reason, a part of the flat surface portion 303*n*1, a part 501*a* of the first groove portion 501, a part 505*a* of the fifth groove portion 505, and the storing portion 506 are not covered with the flat surface portion 120U2 of the fixing tab 120U2, and are exposed to the outside. The part 501*a* as one end portion of the first groove portion 501 is connected to the storing portion 506, and the part 505*a* of the fifth groove portion 505 is provided on a side opposite from the part 501*a* as the one end portion of the first groove portion 501 with respect to the circumferential direction.

Next, the operator injects, for example, the adhesive of the cyanoacrylate type into, for example, the part 501*a* of the first groove portion 501 by a certain amount. Here, in a state in which the flat surface portion 120U2*a* and the flat surface portion 303*n*1 are in contact with each other, as shown in part (b) of FIG. 27, a flow passage 510 is formed by the flat surface portion 120U2*a*, the first groove portion 501, the second groove portion 502, the third groove portion 503, the fourth groove portion 504, and the fifth groove portion 505. The flow passage 510 is sufficiently small in cross-sectional area, so that the adhesive injected into the part 501*a* of the first groove portion 501 is sucked into the flow passage 510 by the capillary phenomenon. In other words, the flow passage is constituted so that the adhesive injected into the groove portion 500 flows by the capillary phenomenon. Incidentally, the adhesive may also be injected through the part 505*a* of the fifth groove portion 505.

By this, the adhesive flows through the first groove portion 501, the second groove portion 502, the third groove portion 503, the fourth groove portion 504, and the fifth groove portion 505 in a named order. Further, the groove portion 500 is formed over a full length of the flat surface portion 303*n*1 with respect to the circumferential direction CD. Therefore, the adhesive flowed through the first groove portion 501, the second groove portion 502, the third groove portion 503, the fourth groove portion 504, and the fifth groove portion 505 bleeds out to an entire region of the flat surface portion 303*n*1. For this reason, the flat surface portion 303*n*1 of the cap fixing portion 303*n* and the flat surface portion 120U2*a* of the fixing tab 120U2 can be firmly bonded to each other by the adhesive. Further, the adhesive extends over the second groove portion 502 and the fourth groove portion 504 formed at peripheries of the projected portion 103*n*2 and the projected portion 103*n*3, respectively, so that the holes 120U2*b* and 120U2*c* and the projected portions 103*n*2 and 103*n*3 can also be bonded to each other by the adhesive.

As described above, the operator injects the adhesive into, for example, the part 501 of the first groove portion 501, so that the operator can easily cause the adhesive to flow into the first groove portion 501, the second groove portion 502, the third groove portion 503, the fourth groove portion 504, and the fifth groove portion 505. By this, the cap fixing portion 303*n* and the fixing tab 120U2 can be firmly bonded to each other.

Further, the operator can confirm that the adhesive flowed through the entire region of the groove portion 505 by observation of the adhesive caused to flow along the first groove portion 501, the second groove portion 502, the third groove portion 503, the fourth groove portion 504, and the fifth groove portion 505 and to flow out to the part 505*a* of the fifth groove portion 505. Further, the part 505*a* of the fifth groove portion 505 is connected to the storing portion 506, and therefore, the adhesive flowed out of the part 505*a* of the fifth groove portion 505 can be stored in the storing portion 506. By this, it is possible to reduce a degree of overflow of the adhesive toward an outside of the cap fixing portion 303*n*. Incidentally, the storing portion 506 is not necessarily required to store the adhesive, and it is preferable that the adhesive is extended over the entire region of the groove portion 500 without a flow of the adhesive through the storing portion 506.

Further, in this embodiment, the adhesive is injected into the storing portion 506 after the fixing tab 120U2 of the cap 120 is engaged with the cap fixing portion 303*n*. In the case where the adhesive is applied onto the cap fixing portion 303*n* or the fixing tab 120U2 before the fixing tab 120U2 of the cap 120 is engaged with the cap fixing portion 303*n*, there is a liability that an operation of assembling the cap 120 to the toner pack 1100 becomes hard to be performed. For example, during an operation in which the cap 120 is rotated and the fixing tab 120U2 is engaged with the cap fixing portion 303*a*, there is a liability that the adhesive applied onto the cap fixing portion 303*n* in advance adheres to a place other than the flat surface portion 120U2*a* of the fixing tab 120U2 or to an operator's hand, or the like.

On the other hand, in this embodiment, after the fixing tab 120U2 of the cap 120 is engaged with the cap fixing portion 303*n*, the adhesive is injected into the groove portion 500, so that the adhesive is hard to adhesive to the place other than the flat surface portion 120U2*a* of the fixing tab 120U2 or to the operator's hand, or the like. Therefore, an operating property in an adhesive bonding operation can be improved.

Other Embodiments

Incidentally, in either of the embodiments described above, the cap 120 is mounted on the pack-side shutter 103, but the present invention is not limited thereto. For example, the cap 120 may be mounted on the nozzle 102. Further, if the cap is capable of protecting the portion-to-be-mounted of the toner pack, the cap may also be mounted on any member of the toner pack without limiting the portion-to-be-mounted to the nozzle or the pack-side shutter.

Further, in the first embodiment, the fixing tab 120U2 and the cap fixing portion 103*n* are bonded by the primer and the adhesive, but the present invention is not limited thereto. For example, the fixing tab 120U2 and the cap fixing portion 103*n* may be fixed by (thermal) welding, a double-side tape, or the like. Further, materials of the cap 120 and the portion-to-be-mounted 700 and a shape of the connecting portion 120U3 may be changed arbitrarily.

Further, in either of the above-described embodiments, the toner is applied in the pouch 101 of the toner pack 100, but the present invention is not limited thereto. For example, as the content accommodated in the pouch 101, other than the toner, ink may be used, and powder or a liquid is capable of being accommodated in the pouch 101. Further, the powder accommodatable in the pouch 101 is not limited to the toner. In the case where the ink is accommodated in the pouch 101, the toner pack 100 may be mounted on an image forming apparatus of an ink jet type.

Further, in either of the above-described embodiments, the pack-side shutter 103 and the apparatus-side shutter 109 are constituted so as to be rotatable about the rotational axes A and B between the shielding position and the open position, but the present invention is not limited thereto. For example, the pack-side shutter 103 and the apparatus-side shutter 109 may be constituted so as to be movable between the open position by being linearly moved parallel to the mounting direction M Further, in either of the above-described embodiments, the pack-side shutter 103 is constituted so as to open the discharging port 102*a* of the nozzle 102 only in the open position, but the present invention is not limited thereto. For example, the pack-side shutter 103 may be a rotatable member which opens the discharging port 102*a* of the nozzle 102 irrespective of a rotation position. At that time, the discharging port 102*a* of the nozzle 102 may employ a constitution in which the discharging port 102*a* is closed by a seal when the toner pack 100 is not yet mounted on the mounting portion 106 and then the seal is removed by a mounting operation onto the mounting portion 106 or after the mounting. Further, a constitution in which the pack-side shutter 103 of the toner pack 100 is omitted may be employed.

Further, in either of the above-described embodiments, the pack-side shutter 103 is provided with the recessed screw portion 103*g* which is a female screw, and the cap 120 is provided with the projected screw portion 120*e* which is a male screw, but the present invention is not limited thereto. For example, the pack-side shutter 103 may be provided with the male screw, and the cap 120 may be provided with the female screw.

Incidentally, in either of the above-described embodiments, the cap main body portion 120U1 and the fixing tab 120U2 were connected by the connecting portions 120U3, but the present invention is not limited thereto. For example, the fixing tab 120U2 may be directly fixed to the cap main body portion 120U1 by bonding, snap-fitting, a magnet, or the like. In this case, it is preferable that fixing strength of the cap main body portion 120U1 and the fixing tab 120U2 is set so as to be weaker than above-described strength of the fixing tab 120U2 and the cap fixing portion 103*n*.

According to the present invention, it is possible to provide a form of the container for accommodating the content of power or a liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2021-158543 filed on Sep. 28, 2021, and 2021-205885 filed on Dec. 20, 2021, which are hereby incorporated by reference herein in their entirety.

What is claimed is:

1. A container for use with an image forming apparatus and for accommodating a content of powder or a liquid, said container comprising:

an accommodating portion configured to accommodate the content;

an end portion including a discharging portion and a shielding member, wherein said discharging portion includes a discharge opening for discharging the content to an outside of said container and a passage for permitting passing of the content toward said discharge opening, and said shielding member shields said discharge opening; and a cap detachably mounted to said end portion, wherein said cap includes a main body portion covering at least a part of said end portion and a fixing portion fixed to said end portion and connected to said main body portion, and wherein said main body portion of said cap is configured so as to be separated from said fixing portion by being rotated about a rotational axis thereof relative to said end portion.

2. A container according to claim 1, wherein said main body portion of said cap is separated from said fixing portion of said cap, in a state in which said fixing portion of said cap is fixed to said end portion, by being rotated relative to said end portion.

3. A container according to claim 1, wherein said fixing portion is fixed to said end portion so that movement of said main body portion relative to said end portion is restricted in both of a direction of the rotational axis and a rotational direction of said main body portion about the rotational axis.

4. A container according to claim 1, wherein said discharging portion includes an outer surface which extends along the rotational axis and is provided with said discharge opening.

5. A container according to claim 1, wherein said cap includes a connecting portion configured to connect said main body portion and said fixing portion, and wherein when said main body portion of said cap is rotated relative to said end portion, said main body portion of said cap is configured so as to be separated from said fixing portion by said connecting portion being broken.

6. A container according to claim 5, wherein said connecting portion is provided between said main body portion and said fixing portion with respect to the direction of the rotational axis and extends along the rotational axis.

7. A container according to claim 5, wherein said fixing portion of said cap has an adhesive surface fixed to said end portion by being adhesively bonded to said end portion, wherein said main body portion of said cap is moved relative to said end portion in the direction of the rotational axis by being rotated about the rotational axis relative to said end portion, and wherein on a cross section perpendicular to the rotational axis, a cross-sectional area of the connecting portion is smaller than a cross-sectional area of the adhesive surface.

8. A container according to claim 7, wherein the cross-sectional area of said connecting portion includes a first area in a first cross section perpendicular to the rotational axis and a second area smaller than the first area in a second cross section perpendicular to the rotational axis in a position different from a position of the first cross section with respect to the direction of the rotational axis, and wherein with respect to the direction of the rotational axis, the second cross section is closer to said main body portion than the first cross section is.

9. A container according to claim 1, wherein with respect to a radial direction of a phantom circle about the rotational axis, said fixing portion is in a position spaced from the rotational axis than an outside surface of said main body portion is.

10. A container according to claim 1, wherein said accommodating portion has first rigidity, wherein said container further comprises an intermediary member which has second rigidity larger than the first rigidity and which connects said accommodating portion and said end portion so as to establish communication between said accommodating portion and said end portion, wherein said intermediary member includes an extended portion extended so as to be spaced from the rotational axis with respect to a radial direction of a phantom circle about the rotational axis, and wherein said fixing portion is disposed so that at least a part thereof overlaps with said extended portion as viewed in the direction of the rotational axis.

11. A container according to claim 1, wherein said accommodating portion has a bag shape such that one end portion thereof opens.

12. A container according to claim 11, wherein said accommodating portion is formed of polypropylene and has flexibility.

13. A container according to claim 1, wherein said shielding member is rotatable about the rotational axis relative to said discharging portion between a shielding position where said shielding member shields said discharge opening and an open position where said shielding member opens said discharge opening.

14. A container according to claim 13, wherein said shielding member includes an outside surface which extends along the rotational axis and at least a part of which is surrounded by said main body portion of said cap, and includes a flange portion extending from the outside surface in a direction which is a radial direction of a phantom circle about the rotational axis and which is a direction in which said flange portion is spaced from the rotational axis, and wherein said flange portion of said shielding member includes a fixed portion to which said fixing portion of said cap is fixed.

15. A container according to claim 14, wherein said fixing portion of said cap includes a first engaging portion, and wherein said fixed portion of said shielding member includes a second engaging portion which engages with said first engaging portion.

16. A container according to claim 15, wherein said flange portion of said cap includes a surface extending in the radial direction, wherein said fixed portion of said shielding member includes a flat surface portion which is provided in a recessed position from said surface of said flange portion in the direction of the rotational axis and which contacts said fixing portion of said cap, and includes a groove portion formed in said flat surface portion, and wherein said groove portion of said fixed portion and said fixing portion constitute a flow passage along which an adhesive flows in a state in which said fixing portion contacts said flat surface portion.

17. A container according to claim 16, wherein said groove portion is formed over a full length of said flat surface portion with respect to a circumferential direction of the phantom circle about the rotational axis.

18. A container according to claim 16, wherein said second engaging portion of said fixed portion of said shielding member is a projected portion projected from said flat surface portion along the rotational axis, and wherein at least a part of said groove portion is formed along a periphery of said projected portion.

19. A container according to claim 16, wherein said fixed portion of said shielding member includes a storage portion which is formed to communicate with said groove portion and which is capable of storing the adhesive.

20. A container according to claim 19, wherein said groove portion includes one end portion connected to said storage portion and an other end portion provided on a side opposite from the one end portion with respect to a circumferential direction of the phantom circle about the rotational axis, and wherein the other end portion is exposed to an outside in a state in which said fixing portion contacts said flat surface portion.

21. A container according to claim 16, wherein said flow passage is configured so that the adhesive injected into said groove portion is caused to flow by a capillary phenomenon.

22. A container according to claim 14, wherein said fixing portion is provided in a region in which an angle of circumference about the rotational axis is 90 degrees as viewed in the direction of the rotational axis.

23. A container according to claim 13, wherein said shielding member includes an opening provided so as to open said discharge opening when said shielding member is positioned in the open position, wherein as viewed in the direction of the rotational axis, in a case that with respect to a circumferential direction of a phantom circle about the rotational axis, a rectilinear line passing through an edge on one side of said opening and the rotational axis is a first rectilinear line and a rectilinear line passing through an edge on the other side of said opening and the rotational axis is a second rectilinear line, said fixing portion of said cap is provided in a region which is positioned between the first rectilinear line and the second rectilinear line and which includes said opening as viewed in the direction of the rotational axis.

24. A container according to claim 13, wherein said main body portion of said cap is formed in a cylindrical shape extending in the direction of the rotational axis and includes an opening at one end thereof, and wherein said fixing portion is connected to said opening.

25. A container according to claim 13, wherein said shielding member is rotatable about the rotational axis in a first rotational direction from the shielding position toward the open position and a second rotational direction opposite to the first rotational direction, wherein said discharging portion includes a first restricting portion for restricting said shielding member to rotate in the second rotational direction from the shielding position, and wherein said main body portion of said cap is mounted to said shielding member and is configured so as to be dismounted from said shielding member by being rotated about the rotational axis relative to said shielding member in the second rotational direction.

26. A container according to claim 25, wherein said discharging portion includes a second restricting portion movable to a restricting position where said second restricting portion restricts said shielding member to rotate in the first rotational direction from the shielding position to a non-restricting position where said second restricting portion does not restrict said shielding member to rotate in the first rotational direction from the shielding position.

27. A container according to claim 26, wherein said end portion of said container is detachably mountable to a mounting portion of the image forming apparatus in a state in which said cap is dismounted, and wherein said second restricting portion is moved from the restricting position to the non-restricting position by being pressed by the mounting portion when said container is mounted on the mounting portion of the image forming apparatus.

* * * * *